US012612474B2

(12) United States Patent
Hagadorn et al.

(10) Patent No.: US 12,612,474 B2
(45) Date of Patent: Apr. 28, 2026

(54) BIS(HETEROCYCLIC-OLATE) LEWIS BASE CATALYSTS AND METHODS THEREOF

(71) Applicant: ExxonMobil Chemical Patents Inc., Baytown, TX (US)

(72) Inventors: John R. Hagadorn, Houston, TX (US); Irene C. Cai, Webster, TX (US); Jo Ann M. Canich, Houston, TX (US); Hua Zhou, Missouri City, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 525 days.

(21) Appl. No.: 18/044,171

(22) PCT Filed: Sep. 21, 2021

(86) PCT No.: PCT/US2021/051310
§ 371 (c)(1),
(2) Date: Mar. 6, 2023

(87) PCT Pub. No.: WO2022/072180
PCT Pub. Date: Apr. 7, 2022

(65) Prior Publication Data

US 2025/0353939 A1 Nov. 20, 2025

Related U.S. Application Data

(60) Provisional application No. 63/085,766, filed on Sep. 30, 2020.

(51) Int. Cl.

| | |
|---|---|
| ***C08F 4/64*** | (2006.01) |
| ***C07F 7/00*** | (2006.01) |
| ***C08F 10/02*** | (2006.01) |
| ***C08F 10/06*** | (2006.01) |

(52) U.S. Cl.
CPC ................ *C08F 10/02* (2013.01); *C07F 7/00* (2013.01); *C08F 4/64158* (2013.01); *C08F 10/06* (2013.01); *C08F 4/64* (2013.01)

(58) Field of Classification Search
CPC .................................................. C08F 4/64158
See application file for complete search history.

(56) References Cited

U.S. PATENT DOCUMENTS 5,041,584 A 8/1991 Crapo et al. .................. 556/179
5,153,157 A 10/1992 Hlatky et al. ................. 502/117
5,447,895 A 9/1995 Marks et al. .................. 502/117
5,453,410 A 9/1995 Holthammer et al. ........ 502/155
6,175,409 B1 1/2001 Nielsen et al. ............... 356/337
6,211,105 B1 4/2001 Holtcamp ..................... 502/103
6,260,407 B1 7/2001 Petro et al. .................. 73/61.52
6,294,388 B1 9/2001 Petro .................................. 436/8
6,406,632 B1 6/2002 Safir et al. .................... 210/656
6,436,292 B1 8/2002 Petro ............................ 210/656
6,454,947 B1 9/2002 Safir et al. .................... 210/656
6,461,515 B1 10/2002 Safir et al. .................... 210/656
6,475,391 B2 11/2002 Safir et al. .................... 210/656
6,491,816 B2 12/2002 Petro .......................... 210/198.2
6,491,823 B1 12/2002 Safir et al. .................... 210/656
6,825,296 B2 * 11/2004 Chi-Wang Chan ..... C08F 10/00 526/171
7,030,256 B2 4/2006 Boussie et al. ................. 556/54
7,847,099 B2 * 12/2010 Agapie ..................... C07F 7/28 502/103
8,404,880 B2 3/2013 Kaji et al. ..................... 556/179
8,519,070 B2 * 8/2013 Carpentier ............ C07F 7/0812 526/170
8,658,556 B2 2/2014 Stewart ......................... 502/202
8,975,209 B2 3/2015 Kaji et al. ..................... 502/439
9,340,630 B2 5/2016 Kaji et al. ............. C08F 110/02
9,394,387 B2 * 7/2016 Hlavinka ............. C07D 213/30
11,041,029 B2 6/2021 Holtcamp et al. ............ 502/154
11,214,634 B2 * 1/2022 Goryunov ................. C07F 7/00
11,248,070 B2 * 2/2022 Goryunov ............. C08F 210/16

(Continued)

FOREIGN PATENT DOCUMENTS

EP 0 573 120 11/1998 .............. C08F 10/00
KR 2018/022137 3/2018 ........... C07D 213/06

(Continued)

OTHER PUBLICATIONS

U.S. Appl. No. 62/972,936, filed Feb. 11, 2020, Jiang, P. et al.
U.S. Appl. No. 62/972,943, filed Feb. 11, 2020, Jiang, P. et al.
U.S. Appl. No. 62/972,953, filed Feb. 11, 2020, Canich, J. et al.
U.S. Appl. No. 62/972,962, filed Feb. 11, 2020, Xie, R. et al.
*Chemical And Engineering News,* v.63(5), p. 27, 1985.

(Continued)

*Primary Examiner* — Rip A Lee
(74) *Attorney, Agent, or Firm* — Vorys, Sater, Seymour and Pease, LLP

(57) ABSTRACT

The present disclosure relates to bis(heterocyclic-olate) Lewis base catalysts. Catalysts, catalyst systems, and processes of the present disclosure can provide high temperature ethylene polymerization, propylene polymerization, or copolymerization as the bis(heterocyclic-olate) Lewis base catalysts, can be stable at high polymerization temperatures and have good activity at the high polymerization temperatures. The stable catalysts with good activity can provide formation of polymers having high molecular weights or polymers having low to very molecular weights, and the ability to make an increased amount of polymer in a given reactor, as compared to conventional catalysts. Hence, the present disclosure demonstrates highly active catalysts capable of operating at high reactor temperatures while producing polymers with controlled molecular weights and or robust isotacticity.

29 Claims, 2 Drawing Sheets

(56) References Cited

U.S. PATENT DOCUMENTS

| | | | | |
|---|---|---|---|---|
| 12,221,508 | B2 * | 2/2025 | Camelio | C08F 210/16 |
| 2019/0330139 | A1 | 10/2019 | Faler et al. | C07C 211/64 |
| 2019/0330392 | A1 | 10/2019 | Faler et al. | C08F 10/02 |
| 2020/0254431 | A1 | 8/2020 | Goryunov et al. | B01J 31/2295 |
| 2020/0255553 | A1 | 8/2020 | Goryunov et al. | C08F 10/02 |
| 2020/0255555 | A1 | 8/2020 | Goryunov et al. | C08F 10/14 |
| 2020/0255556 | A1 | 8/2020 | Goryunov et al. | C08F 10/14 |

FOREIGN PATENT DOCUMENTS

| | | | |
|---|---|---|---|
| WO | WO1994/007928 | 4/1994 | C08F 10/02 |
| WO | WO1995/014044 | 5/1995 | C08F 4/02 |
| WO | WO2002/038572 | 5/2002 | C07D 487/04 |
| WO | WO2016/172110 | 10/2016 | C07F 7/00 |
| WO | WO2018/236863 | 12/2018 | C08F 4/659 |
| WO | WO2018/236996 | 12/2018 | C08F 4/659 |
| WO | WO2020/131566 | 6/2020 | C08F 210/16 |
| WO | WO2020/132244 | 6/2020 | C08F 210/16 |
| WO | WO2020/167799 | 8/2020 | C08F 10/00 |
| WO | WO2020/167821 | 8/2020 | C08F 10/00 |

OTHER PUBLICATIONS

Baier, M. et al. (2014) “Post-Metallocenes in the Industrial Production of Poly-Polyefins,” *Angew. Chem. Int. Ed.*, v.53, pp. 9722-9744.

Castillo-Aguilera, O. et al., (2017) “Regioselective and efficient halogenation of 4,5-unsubstituted alkyl 3-hydroxypyrrole/3-hydroxythiophene-2-yl-carboxylates,” *Tetrahedron Letters,* v.58(26), pp. 2537-2541.

Girolami, G. S. (1994) “A Simple “Back of the Envelope” Method for Estimating the Densities and Molecular Volumes of Liquids and Solids,” *Journal of Chem. Edu.*, v.71(11), Nov. 1994, pp. 962-964.

Oliveira, J. V. et al. (2000) “High-Pressure Phase Equilibria for Polypropylene-Hydrocarbon Systems,” *Ind. Eng. Chem. Res.*, v.39, pp. 4627-4633.

Savitha, G. et al. (2011) “3-Alkoxy-4-Bromothiophenes: General Synthesis of Monomers and Regio-Selective Preparation of Two Dimers,” *Tetrahedron Letters,* v.52(12), pp. 1288-1291.

Sun, T. et al. (2001) “Effect of Short Chain Branching on the Coil Dimensios of Polyolefins in Dilute Solution,” *Macromolecules,* v.34, pp. 6812-6820.

Warren, T. et al. (2000) “1,3-Doubly Bridged Group 4 Metallocenes by Intramolecular Reductive Coupling of Pendant Olefins,” *Organometallics,* v.19(2), pp. 127-134.

* cited by examiner

BIS(HETEROCYCLIC-OLATE) LEWIS BASE CATALYSTS AND METHODS THEREOF

CROSS-REFERENCE TO RELATED APPLICATIONS

This application is a national stage filing of Patent Cooperation Treaty Application No. PCT/US2021/051310 filed Sep. 21, 2021, claiming priority to U.S. Provisional Application No. 63/085,766 filed Sep. 30, 2020, with the disclosure of U.S. Provisional Application No. 63/085,766 being incorporated herein by reference.

FIELD

The present disclosure relates to bis(heterocyclic-olate) Lewis base transition metal complexes, including bis(thiophen-3-olate) Lewis base transition metal complexes, and other related complexes, catalyst systems comprising such and polymerization processes using said catalyst systems to produce olefin polymers such as ethylene based polymers and/or propylene based polymers.

BACKGROUND

Olefin polymerization catalysts are of great use in industry and polyolefins are widely used commercially because of their robust physical properties. Hence, there is interest in finding new catalyst systems that increase the marketing value of the catalyst and allow the production of polymers having improved properties. Physical properties (such as transition temperature, viscosity, etc.) and mechanical properties (such as strength, stiffness, and toughness) are influenced by the molecular weight of the polymer, hence catalyst systems that modify molecular weight, among other things, are desirable.

Low molecular weight polyolefins, such as low-density polyethylene (LDPE) or ultra-low-molecular-weight polyethylene, such as polyethylene wax, are among the most versatile products in the chemical industry, useful in diverse products and applications, and widely used in hot-melt adhesives, as well as plasticizers, or for waxes and wax additives production. However, challenges remain for the development of highly active catalysts capable of operating at high reactor temperatures for the production of controllable molecular weight polyolefins of interest. On the other hand, polyolefins with high molecular weight, such as high-molecular-weight polyethylene (HMWPE) or ultra-high-molecular-weight polyethylene (UHMWPE), generally have valuable mechanical properties.

Additionally, pre-catalysts (neutral, unactivated complexes) should be thermally stable at and above ambient temperature, as they are often stored for significant time periods before being used. The performance of a given catalyst is closely influenced by the reaction conditions, such as the monomer concentrations and temperature. From this stance, the solution process, which benefits from being run at temperatures above 120° C., is particularly challenging for catalyst development. At such high reactor temperatures, it is often difficult to maintain high catalyst activity and high molecular weight capability as both attributes typically decline with an increase of reactor temperature. With a wide range of polyolefin products desired, from high density polyethylene (HDPE) to lower density materials such as low density polyethylene and elastomers (e.g., thermoplastic elastomers (TPE); ethylene-propylene-diene (EPDM)), many different catalyst systems may be needed, as it is unlikely that a single catalyst will be able to address all the needs for the production of these various polyolefin products. The demanding and variable set of requirements needed for the development and production of new polyolefin products makes the identification of suitable catalysts for a given product and production process a highly challenging endeavor.

There is a need for new and improved catalysts, catalyst systems, and processes for the polymerization of olefins in order to achieve polymer properties such as narrow (e.g., low) polydispersity indices, while controlling the molecular weight of the polymer (e.g., high molecular weight or low molecular weight according to the demand). Furthermore, there is still a need to develop highly active catalysts capable of operating at high reactor temperatures (e.g., catalysts with high stability and good activity at high polymerization temperatures) while producing polymers with controlled molecular weights. In the case of polypropylenes, there is further a need for catalysts and processes that provide isotactic polypropylenes having one or more of the aforementioned properties.

References of interest include: WO 2018/236863; WO 2018/236996; WO 2020/132244; WO 2020/167799; U.S. Pat. No. 7,030,256; US 2020/0255556; US 2020/0255555; US 2020/0254431; US 2020/0255553; Baier, M. et al. (2014) "Post-Metallocenes in the Industrial Production of Poly-Polyefins," Angew. Chem. Int. Ed., v. 53, pp. 9722-9744; KR 2018/022137; WO 2016/172110; U.S. Ser. No. 62/972,962, filed Feb. 11, 2020; U.S. Ser. No. 62/972,953, filed Feb. 11, 2020; U.S. Ser. No. 62/972,943, filed Feb. 11, 2020; U.S. Ser. No. 62/972,936, filed Feb. 11, 2020; Ser. No. 16/788,124, filed Feb. 11, 2020; and U.S. Ser. No. 15/744,478, filed Jan. 12, 2018.

SUMMARY

The present disclosure relates to catalyst compounds represented by Formula (I):

(I)

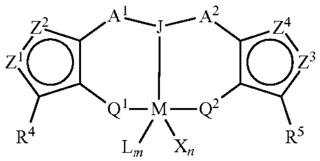

wherein:

M is a group 3, 4, or 5 metal;

each $A^1$ and $A^2$ is independently an aromatic, substituted aromatic, or alkenediyl group;

heterocyclic ring fragments —$(Z^1Z^2)$— and —$(Z^3Z^4)$— are independently selected from —$(Z^5Z^6)$— or —$(Z^6Z^5)$—, with $Z^5$ being selected from oxygen, sulfur, S(O), $S(O)_2$, and $N(R^{50})$, and $Z^6$ being selected from nitrogen and $C(R^{51})$, wherein each $R^{50}$ and $R^{51}$ is independently hydrogen, $C_1$-$C_{40}$ hydrocarbyl, $C_1$-$C_{40}$ substituted hydrocarbyl, a monovalent heteroatom, or a heteroatom-bonded monovalent group;

each of $R^4$ and $R^5$ is independently hydrogen, $C_1$-$C_{40}$ hydrocarbyl, $C_1$-$C_{40}$ substituted hydrocarbyl, a monovalent heteroatom, or a heteroatom-bonded monovalent group;

J is a heterocyclic Lewis base;

each $Q^1$ and $Q^2$ are independently selected from oxygen, sulfur, $N(R^{30})$, or $P(R^{30})$ wherein $R^{30}$ is $C_1$-$C_{40}$ hydrocarbyl, substituted $C_1$-$C_{40}$ hydrocarbyl, a monovalent heteroatom, or a heteroatom-bonded monovalent group;

L is a Lewis base, optionally any two L groups join together to form a bidentate Lewis base;

X is an anionic ligand, optionally an X group is joined to an L group to form a monoanionic bidentate group, or optionally, any two X groups are joined together to form a dianionic ligand;

n is 1, 2 or 3;

m is 0, 1, or 2; and n+m is not greater than 4, such as 1, 2, 3, or 4.

In yet another embodiment, the present disclosure provides a catalyst system comprising an activator and a catalyst of the present disclosure.

In still another embodiment, the present disclosure provides a polymerization process comprising a) contacting one or more olefin monomers with a catalyst system comprising: i) an activator and ii) a catalyst of the present disclosure.

In still another embodiment, the present disclosure provides a polyolefin formed by a catalyst system and or method of the present disclosure.

In another class of embodiments, the present disclosure provides for a process for the production of an ethylene alpha-olefin copolymer comprising polymerizing ethylene and at least one $C_3$-$C_{20}$ alpha-olefin by contacting the ethylene and the at least one $C_3$-$C_{20}$ alpha-olefin with a catalyst system of the present disclosure in at least one continuous stirred tank reactor or loop reactor.

In another class of embodiments, the present disclosure provides for a process for the production of a propylene alpha-olefin copolymer comprising polymerizing propylene and at least one ethylene and/or $C_4$-$C_{20}$ alpha-olefin by contacting the propylene and the at least one ethylene and/or at least one $C_4$-$C_{20}$ alpha-olefin with a catalyst system of the present disclosure in at least one continuous stirred tank reactor or loop reactor.

In at least one embodiment, the catalyst compound is represented by Formula (I) wherein the compound features a tridentate dianionic ligand that is coordinated to the metal to form a pair of 8-membered metallocycle rings. In at least one embodiment, the catalyst compounds represented by Formula (I) have a structure wherein the ring formed by M, $Q^1$, the ring containing $Z^1Z^2$, $A^1$, and J is an eight-membered ring; and the ring formed by M, $Q^2$, the ring containing $Z^3Z^4$, $A^2$ and, J is an eight-membered ring.

DETAILED DESCRIPTION

Figure 1:
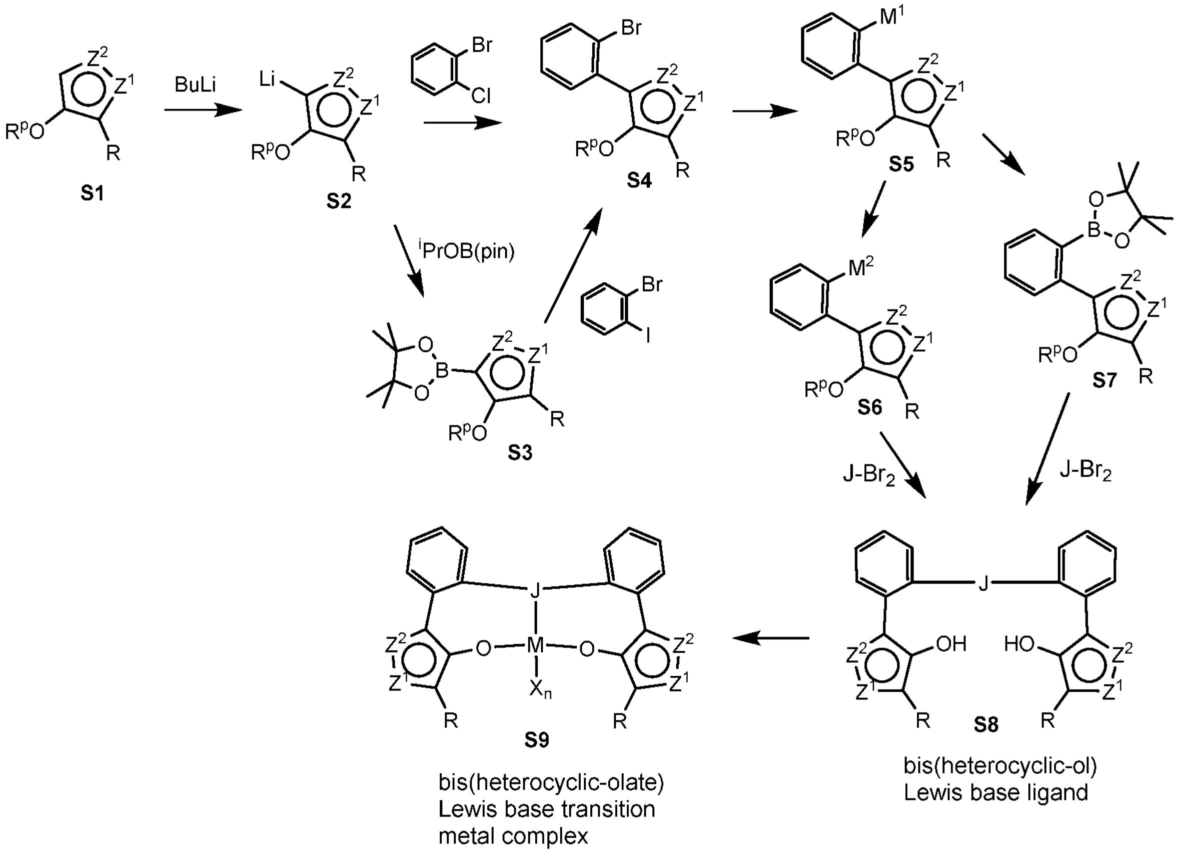
FIG. 1 (FIG. 1) shows a general synthetic route to the inventive bis(heterocyclic-ol) Lewis base ligands and bis (heterocyclic-olate) Lewis base complexes.
Figure 2:
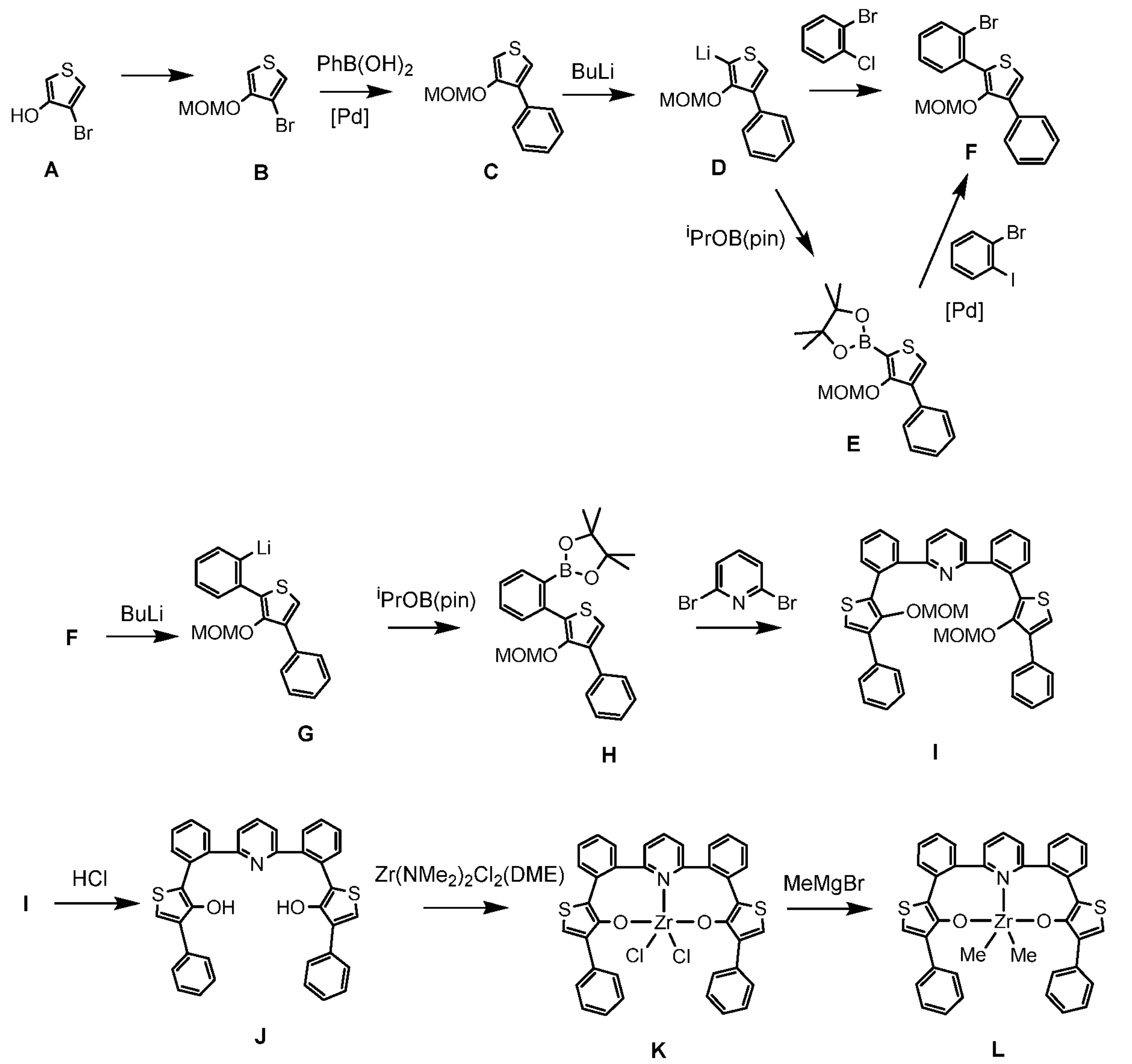
FIG. 2 (FIG. 2) shows a synthetic route to 2,2'-(pyridine-2,6-diylbis(2,1-phenylene))bis(4-phenylthiophen-3-ol) and transition metal complexes.

The present disclosure provides catalyst compounds including a bis(heterocyclic-olate) Lewis base tridentate ligand, which coordinates to a transition metal center, forming two eight-membered rings, catalyst systems including such catalyst compounds, and uses thereof. In at least one embodiment, the central Lewis base fragment (of the bis (heterocyclic-olate) Lewis base tridentate ligand) is a heterocyclic ring having 5 or 6 ring atoms which may include one or more heteroatoms, such as at least one of which is a nitrogen. The five-membered ring heterocycles can be azoles, for example. The six-membered ring heterocycles can be pyridine, for example.

Catalyst compounds of the present disclosure can be zirconium or hafnium-containing compounds having two heterocyclic-olates such as two thiophen-3-olates or substituted thiophen-3-olates linked with a central Lewis base. In another class of embodiments, the present disclosure is directed to polymerization processes to produce polyolefin polymers from catalyst systems including one or more olefin polymerization catalysts, at least one activator, and an optional support. Polyolefin polymers can beethylene containing polymers and/or propylene containing polymers and/or higher alpha-olefin containing polymers.

The bis(heterocyclic-olate) Lewis base tridentate ligand is a class of tridentate ligands that may use heterocycles (as a neutral Lewis base) such as an azole or pyridine group. These ligands coordinate to a transition metal in a "tridentate" fashion, which means that the ligand forms three different bonds to the metal center. A feature of the bis (heterocyclic-olate) Lewis base complexes, for example, is that the ligand binds in a tridentate fashion with the formation of two eight-membered metallocycle rings. With the ligand coordinated to the metal in this fashion, the complex is thought to be chiral (i.e., lacking a mirror plane of symmetry). Without being bound by theory, it is believed that when using these catalysts for the production of polypropylene and other polymers of $C_3$ and higher alpha olefins, the chirality is advantageous for the production of polyolefins having high isotacticity.

Catalysts, catalyst systems, and processes of the present disclosure can provide high temperature ethylene polymerization, propylene polymerization, ethylene alpha-olefin (e.g., ethylene-1-octene) copolymerization, or propylene alpha-olefin copolymerization as the Lewis base catalysts can be stable at high polymerization temperatures and have good activity at the high polymerization temperatures. The stable catalysts with good activity can provide formation of polymers and the ability to make an increased amount of polymer in a given reactor, as compared to conventional catalysts, because polymerizations in general occur at a higher rate at higher temperatures. Furthermore, the stable catalysts with good activity can also provide formation of polymers having low molecular weight (e.g., Mw of about 10,500 g/mol or less) to very low molecular weight (e.g., Mw of about 6,000 g/mol or less).

For the purposes of the present disclosure, the New numbering scheme for the Periodic Table Groups is used as described in *Chemical And Engineering News*, v. 63(5), pg. 27 (1985). Therefore, a "group 4 metal" is an element from group 4 of the Periodic Table, e.g., Hf, Ti, or Zr.

The following abbreviations may be used herein: Me is methyl, Et is ethyl, Ph is phenyl, Bn is benzyl, tBu is tertiary butyl, MAO is methylalumoxane, NMR is nuclear magnetic resonance, t is time, s is second, h is hour, psi is pounds per square inch, psig is pounds per square inch gauge, equiv is equivalent, A is angstroms, RPM is rotation per minute.

The specification describes transition metal complexes. The term complex is used to describe molecules in which an ancillary ligand is coordinated to a central transition metal atom. The ligand is bulky and stably bonded to the transition metal so as to maintain its influence during use of the catalyst, such as polymerization. The ligand may be coordinated to the transition metal by covalent bond and/or electron donation coordination or intermediate bonds. The transition metal complexes are generally subjected to activation to perform their polymerization or oligomerization function using an activator which, without being bound by theory, is believed to create a cation as a result of the removal of an anionic group, often referred to as a leaving group, from the transition metal.

As used herein, "olefin polymerization catalyst(s)" refers to any catalyst, such as an organometallic complex or compound that is capable of coordination polymerization addition where successive monomers are added in a monomer chain at the organometallic active center.

The terms "substituent," "radical," "group," and "moiety" may be used interchangeably.

"Conversion" is the amount of monomer that is converted to polymer product, and is reported as mol % and is calculated based on the polymer yield and the amount of monomer fed into the reactor.

"Catalyst productivity" is a measure of the mass of polymer produced using a known quantity of polymerization catalyst. Typically, "catalyst productivity" is expressed in units of (g of polymer)/(g of catalyst) or (g of polymer)/(mmols of catalyst) or the like. If units are not specified then the "catalyst productivity" is in units of (g of polymer)/(g of catalyst). For calculating catalyst productivity only the weight of the transition metal component of the catalyst is used (i.e. the activator and/or co-catalyst is omitted). "Catalyst activity" is a measure of the mass of polymer produced using a known quantity of polymerization catalyst per unit time for batch and semi-batch polymerizations. Typically, "catalyst activity" is expressed in units of (g of polymer)/(mmol of catalyst)/hour or (kg of polymer)/(mmols of catalyst)/hour or the like. If units are not specified then the "catalyst activity" is in units of (g of polymer)/(mmol of catalyst)/hour.

The term "heteroatom" refers to any group 13-17 element, excluding carbon. A heteroatom may include B, Si, Ge, Sn, N, P, As, O, S, Se, Te, F, Cl, Br, and I. The term "heteroatom" may include the aforementioned elements with hydrogens attached, such as BH, $BH_2$, $SiH_2$, OH, NH, $NH_2$, etc. The term "substituted heteroatom" describes a heteroatom that has one or more of these hydrogen atoms replaced by a hydrocarbyl or substituted hydrocarbyl group(s). The term "monovalent heteroatom" refers to non-carbon group 13-17 elements, which may (or may not) have hydrogens attached, that can form a single covalent bond, such as but not limited to —F, —Cl, —Br, —I, —OH, —SH, —$NH_2$, —$PH_2$, —$SiH_3$, —$GeH_3$, —$BH_2$. The term "heteroatom-bonded monovalent group" refers to partially substituted non-carbon group 13-16 elements that can form a single covalent bond, such as but not limited to —O(R*), —$OS(O)_2$(R*), —$OS(O)_2CF_3$, —S(R*), —$N(R^*)_2$, —NH(R*), —$P(R^*)_2$, —PH(R*), —$Si(R^*)_3$, —$SiH(R^*)_2$, —$SiH_2$(R*), —$Ge(R^*)_3$, —$B(R^*)_2$, —BH(R*) wherein R* is hydrocarbyl or substituted hydrocarbyl, such as, but not limited to, alkylaryl, alkylaryl, alkenyl, alkynyl, cycloalkyl, and the like, and wherein two or more adjacent R* may join together to form a cyclic or polycyclic structure.

An "olefin," alternatively referred to as "alkene," is a linear, branched, or cyclic compound of carbon and hydrogen having at least one double bond. For purposes of this specification and the claims appended thereto, when a polymer or copolymer is referred to as including an olefin, the olefin present in such polymer or copolymer is the polymerized form of the olefin. For example, when a copolymer is said to have an "ethylene" content of 35 wt % to 55 wt %, it is understood that the mer unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" is used to refer to mer units indicates that the mer units differ from each other by at least one atom or are different isomerically. Accordingly, the definition of copolymer, as used herein, includes terpolymers. An "ethylene polymer" or "ethylene copolymer" is a polymer or copolymer including at least 50 mol % ethylene derived units, a "propylene polymer" or "propylene copolymer" is a polymer or copolymer including at least 50 mol % propylene derived units, and so on. An "ethylene polymer" or "ethylene copolymer" is a polymer or copolymer including at least 50 mol % ethylene derived units, a "propylene polymer" or "propylene copolymer" is a polymer or copolymer including at least 50 mol % propylene derived units, and so on.

The term "alpha-olefin" refers to an olefin having a terminal carbon-to-carbon double bond in the structure thereof (($R^1R^2$)—C═$CH_2$, where $R^1$ and $R^2$ can be independently hydrogen or any hydrocarbyl group; such as $R^1$ is hydrogen and $R^2$ is an alkyl group). A "linear alpha-olefin" is an alpha-olefin defined above wherein $R^1$ is hydrogen, and $R^2$ is hydrogen or a linear alkyl group.

For the purposes of the present disclosure, ethylene shall be considered an alpha-olefin.

As used herein, and unless otherwise specified, the term "$C_n$" means hydrocarbon(s) having n carbon atom(s) per molecule, wherein n is a positive integer. The term "hydrocarbon" means a class of compounds containing hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different values of n. Likewise, a "$C_m$-$C_y$" group or compound refers to a group or compound comprising carbon atoms at a total number thereof in the range from m to y. Thus, a $C_1$-$C_{50}$ alkyl group refers to an alkyl group comprising carbon atoms at a total number thereof in the range from 1 to 50.

Unless otherwise indicated, (e.g., the definition of "substituted hydrocarbyl", "substituted aromatic", etc.), the term "substituted" means that at least one hydrogen atom has been replaced with at least one non-hydrogen group, such as a hydrocarbyl group, a heteroatom, or a heteroatom containing group, such as halogen (such as Br, Cl, F or I) or at least one functional group such as —$NR^*_2$, —OR*, —SeR*, —TeR*, —$PR^*_2$, —$AsR^*_2$, —$SbR^*_2$, —SR*, —$BR^*_2$, —$SiR^*_3$, —$GeR^*_3$, —$SnR^*_3$, —$PbR^*_3$, where each R* is independently a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

The term "substituted hydrocarbyl" means a hydrocarbyl radical in which at least one hydrogen atom of the hydrocarbyl radical has been substituted with at least one heteroatom (such as halogen, e.g., Br, Cl, F or I) or heteroatom-containing group (such as a functional group, e.g., —$NR^*_2$, —OR*, —SeR*, —TeR*, —$PR^*_2$, —$AsR^*_2$, —$SbR^*_2$, —SR*, —$BR^*_2$, —$SiR^*_3$, —$GeR^*_3$, —$SnR^*_3$, —$PbR^*_3$, where each R* is independently a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring. The term "hydrocarbyl substituted phenyl" means a phenyl group having 1, 2, 3, 4 or 5 hydrogen groups replaced by a hydrocarbyl or substituted hydrocarbyl group. For example, the "hydrocarbyl substituted phenyl" group can be represented by the formula:

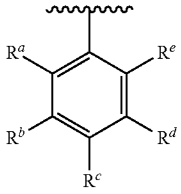

where each of $R^a$, $R^b$, $R^c$, $R^d$, and $R^e$ can be independently selected from hydrogen, $C_1$-$C_{40}$ hydrocarbyl or $C_1$-$C_{40}$ substituted hydrocarbyl, a heteroatom or a heteroatom-containing group (provided that at least one of $R^a$, $R^b$, $R^c$, $R^d$, and $R^e$ is not H), or two or more of $R^a$, $R^b$, $R^c$, $R^d$, and $R^e$ can be joined together to form a $C_4$-$C_{62}$ cyclic or polycyclic hydrocarbyl ring structure, or a combination thereof.

The term "substituted phenyl," mean a phenyl group having 1 or more hydrogen groups replaced by a hydrocarbyl, substituted hydrocarbyl, heteroatom or heteroatom containing group.

The term "substituted carbazole," means a carbazolyl group having 1 or more hydrogen groups replaced by a hydrocarbyl, substituted hydrocarbyl, heteroatom or heteroatom containing group.

The term "substituted naphthyl," means a naphthyl group having 1 or more hydrogen groups replaced by a hydrocarbyl, substituted hydrocarbyl, heteroatom or heteroatom containing group.

The term "substituted anthracenyl," means an anthracenyl group having 1 or more hydrogen groups replaced by a hydrocarbyl, substituted hydrocarbyl, heteroatom or heteroatom containing group.

The term "substituted fluorenyl" means a fluorenyl group having 1 or more hydrogen groups replaced by a hydrocarbyl, substituted hydrocarbyl, heteroatom or heteroatom containing group.

The term "substituted benzyl" means a benzyl group having 1 or more hydrogen groups replaced by a hydrocarbyl, substituted hydrocarbyl, heteroatom or heteroatom containing group, such as a substituted benzyl group is represented by the formula:

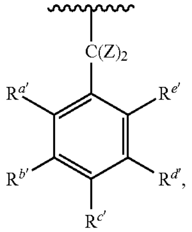

where each of $R^{a'}$, $R^{b'}$, $R^{c'}$, $R^{d'}$, and $R^{e'}$ and Z is independently selected from hydrogen, $C_1$-$C_{40}$ hydrocarbyl or $C_1$-$C_{40}$ substituted hydrocarbyl, a heteroatom or a heteroatom-containing group (provided that at least one of $R^{a'}$, $R^{b'}$, $R^{c'}$, $R^{d'}$, and $R^{e'}$ and Z is not H), or two or more of $R^{a'}$, $R^{b'}$, $R^{c'}$, $R^{d'}$, and $R^{e'}$ and Z may be joined together to form a $C_4$-$C_{62}$ cyclic or polycyclic ring structure, or a combination thereof.

The terms "alkoxy" and "alkoxide" mean an alkyl or aryl group bound to an oxygen atom, such as an alkyl ether or aryl ether group/radical connected to an oxygen atom and can include those where the alkyl/aryl group is a $C_1$ to $C_{10}$ hydrocarbyl. The alkyl group may be straight chain, branched, or cyclic. The alkyl group may be saturated or unsaturated. Examples of suitable alkoxy radicals can include methoxy, ethoxy, n-propoxy, iso-propoxy, n-butoxy, iso-butoxy, sec-butoxy, tert-butoxy, phenoxyl.

The term "alkenyl" means a straight-chain, branched-chain, or cyclic hydrocarbon radical having one or more double bonds. These alkenyl radicals may be optionally substituted. Examples of suitable alkenyl radicals can include ethenyl, propentyl, allyl, 1,4-butadienyl cyclopropentyl, cyclobutenyl, cyclopentenyl, cyclohexenyl, cycloctenyl, including their substituted analogues.

A cyclic tertiary hydrocarbyl group is defined as a tertiary hydrocarbyl group that forms at least one alicyclic (non-aromatic) ring. Cyclic tertiary hydrocarbyl groups are also referred to as alicyclic tertiary hydrocarbyl groups. When the hydrocarbyl group is an alkyl group, cyclic tertiary hydrocarbyl groups are also referred to as cyclic tertiary alkyl groups or alicyclic tertiary alkyl groups. Examples of cyclic tertiary hydrocarbyl groups include 1-adamantanyl, 1-methylcyclohexyl, 1-methylcyclopentyl, 1-methylcyclooctyl, 1-methylcyclodecyl, 1-methylcyclododecyl, bicyclo[3.3.1]nonan-1-yl, bicyclo[2.2.1]heptan-1-yl, bicyclo [2.3.3]hexan-1-yl, bicycle[1.1.1]pentan-1-yl, bicycle[2.2.2] octan-1-yl, and the like. Cyclic tertiary hydrocarbyl groups can be illustrated by formula B:

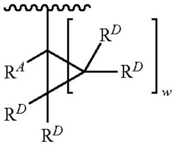 , wherein $R^A$ is a hydrocarbyl group or substituted hydrocarbyl group, each $R^D$ is independently hydrogen or a hydrocarbyl group or substituted hydrocarbyl group, w is an integer from 1 to about 30, and $R^A$, and one or more $R^D$, and or two or more $R^D$ may optionally be bonded to one another to form additional rings.

When a cyclic tertiary hydrocarbyl group contains more than one alicyclic ring, it can be referred to as polycyclic tertiary hydrocarbyl group or if the hydrocarbyl group is an alkyl group, it may be referred to as a polycyclic tertiary alkyl group.

The terms "alkyl radical," and "alkyl" are used interchangeably throughout this disclosure. For purposes of this disclosure, "alkyl radical" is defined to be $C_1$-$C_{100}$ alkyls that may be linear, branched, or cyclic. Examples of such radicals can include methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, including their substituted analogues. Substituted alkyl radicals are radicals in which at least one hydrogen atom of the alkyl radical has been substituted with at least a non-hydrogen group, such as a hydrocarbyl group, a heteroatom, or a heteroatom containing group, such as halogen (such as Br, Cl, F or I) or at least one functional group such as —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, or —PbR*$_3$, and each R* is independently a hydrocarbyl or halocarbyl radical, and two or more R* may join together to form a substituted or unsubstituted completely saturated, partially unsaturated, or aromatic cyclic or polycyclic ring structure), or where at least one heteroatom has been inserted within a hydrocarbyl ring.

The term "aryl" or "aryl group" means an aromatic ring and the substituted variants thereof, such as phenyl, 2-methyl-phenyl, xylyl, 4-bromo-xylyl. Likewise, heteroaryl means an aryl group where a ring carbon atom (or two or three ring carbon atoms) has been replaced with a heteroatom, such as N, O, or S.

As used herein, and unless otherwise specified, the term "aromatic" refers to unsaturated heterocycles or unsaturated cyclic hydrocarbons having a delocalized conjugated 21 system, and pseudoaromatic heterocycles which are heterocycles that have similar properties and structures (nearly planar) to aromatic heterocyclic ligands, but are not by definition (Hickle rule) aromatic. Preferred aromatics include unsaturated cyclic hydrocarbons, typically $C_6$ unsaturated cyclic hydrocarbons.

The term "substituted aromatic" means an aromatic group having 1 or more hydrogen groups replaced by a hydrocarbyl, substituted hydrocarbyl, monovalent heteroatom, or heteroatom-bonded monovalent group.

The term "alkenediyl" refers to a divalent —C($R^j$)═C($R^j$)— group, where each $R^j$ is independently selected from hydrogen, $C_1$-$C_{40}$ alkyls or substituted $C_1$-$C_{40}$ alkyls, $C_6$-$C_{40}$ aryls or substituted $C_6$-$C_{40}$ aryls, monovalent heteroatoms, heteroatom-bonded monovalent groups, and where adjacent $R^j$ groups may join to form a ring.

The term "arylalkyl" means an aryl group where a hydrogen has been replaced with an alkyl or substituted alkyl group. For example, 3,5'-di-tert-butyl-phenyl indenyl is an indene substituted with an arylalkyl group. When an arylalkyl group is a substituent on another group, it is bound to that group via the aryl.

The term "alkylaryl" means an alkyl group where a hydrogen has been replaced with an aryl or substituted aryl group. For example, phenethyl indenyl is an indene substituted with an ethyl group bound to a benzene group. When an alkylaryl group is a substituent on another group, it is bound to that group via the alkyl.

Where isomers of a named alkyl, alkenyl, alkoxide, or aryl group exist (e.g., n-butyl, iso-butyl, sec-butyl, and tert-butyl) reference to one member of the group (e.g., n-butyl) shall expressly disclose the remaining isomers (e.g., iso-butyl, sec-butyl, and tert-butyl) in the family. Likewise, reference to an alkyl, alkenyl, alkoxide, or aryl group without specifying a particular isomer (e.g., butyl) expressly discloses all isomers (e.g., n-butyl, iso-butyl, sec-butyl, and tert-butyl).

The term "ring atom" means an atom that is part of a cyclic ring structure. By this definition, a benzyl group has six ring atoms and tetrahydrofuran has 5 ring atoms.

A heterocyclic ring is a ring having a heteroatom in the ring structure as opposed to a heteroatom substituted ring where a hydrogen on a ring atom is replaced with a heteroatom. For example, tetrahydrofuran is a heterocyclic ring and 4-N,N-dimethylamino-phenyl is a heteroatom-substituted ring. Other examples of heterocycles may include pyridine, imidazole, and thiazole.

The term "azole" means a five-membered heterocyclic compound containing a nitrogen, at least one other non-carbon atom (e.g., nitrogen, sulfur, or oxygen) as part of the heterocyclic ring, and two double-bonds. An azole is an aromatic compound. Examples of azoles may include pyrazole, imidazole, thiazole, oxazole, isoxazole, and azaphosphole.

The terms "hydrocarbyl radical," "hydrocarbyl group," or "hydrocarbyl" may be used interchangeably and are defined to mean a group consisting of hydrogen and carbon atoms only. For example, a hydrocarbyl can be a $C_1$-$C_{100}$ radical that may be linear, branched, or cyclic, and when cyclic, aromatic or non-aromatic. Examples of such radicals may include, but are not limited to, alkyl groups such as methyl, ethyl, propyl (such as n-propyl, isopropyl, cyclopropyl), butyl (such as n-butyl, isobutyl, sec-butyl, tert-butyl, cyclobutyl), pentyl (such as iso-amyl, cyclopentyl) hexyl (such as cyclohexyl), octyl (such as cyclooctyl), nonyl, decyl (such as adamantyl), undecyl, dodecyl, tridecyl, tetradecyl, pentadecyl, hexadecyl, heptadecyl, octadecyl, nonadecyl, icosyl, henicosyl, docosyl, tricosyl, tetracosyl, pentacosyl, hexacosyl, heptacosyl, octacosyl, nonacosyl, or tricontyl, and aryl groups, such as phenyl, benzyl, and naphthyl.

Unless otherwise indicated, as used herein, "low comonomer content" is defined as a polyolefin having less than 8 wt % of comonomer based upon the total weight of the polyolefin. As used herein, "high comonomer content" is defined as a polyolefin having greater than or equal to 8 wt % of comonomer based upon the total weight of the polyolefin.

As used herein, Mn is number average molecular weight, Mw is weight average molecular weight, and Mz is z average molecular weight, wt % is weight percent, and mol % is mole percent. Molecular weight distribution (MWD), also referred to as polydispersity index (PDI), is defined to be Mw divided by Mn. Unless otherwise noted, all molecular weight units (e.g., Mw, Mn, Mz) are reported in g/mol.

Unless otherwise indicated, as used herein, "high molecular weight" is defined as a weight average molecular weight (Mw) value of 100,000 g/mol or more. "Low molecular weight" is defined as an Mw value of less than 100,000 g/mol, such as 10,500 g/mol or less. "Very low molecular weight" is defined as an Mw value of 6,000 g/mol or less.

Unless otherwise noted all melting points (Tm) are differential scanning calorimetry (DSC) second melt.

A "catalyst system" is a combination of at least one catalyst compound, at least one activator, an optional coactivator, and an optional support material. The terms "catalyst compound", "catalyst complex", "transition metal complex", "transition metal compound", "precatalyst compound", and "precatalyst complex" are used interchangeably. When "catalyst system" is used to describe such a pair before activation, it means the unactivated catalyst complex (precatalyst) together with an activator and, optionally, a coactivator. When it is used to describe such a pair after activation, it means the activated complex and the activator or other charge-balancing moiety. The transition metal compound may be neutral as in a precatalyst, or a charged species with a counter ion as in an activated catalyst system. For the purposes of the present disclosure and the claims thereto, when catalyst systems are described as comprising neutral stable forms of the components, it is well understood by one of ordinary skill in the art, that the ionic form of the component is the form that reacts with the monomers to produce polymers. A polymerization catalyst system is a catalyst system that can polymerize monomers to polymer. Furthermore, catalyst compounds and activators represented by formulae herein embrace both neutral and ionic forms of the catalyst compounds and activators.

In the description herein, the catalyst may be described as a catalyst, a catalyst precursor, a pre-catalyst compound, catalyst compound or a transition metal compound, and these terms are used interchangeably.

An "anionic ligand" is a negatively charged ligand which donates one or more pairs of electrons to a metal ion. A "Lewis base" is a neutrally charged ligand which donates one or more pairs of electrons to a metal ion. Examples of Lewis bases include ethyl ether, trimethylamine, pyridine, tetrahydrofuran, dimethylsulfide, and triphenylphosphine. The term "heterocyclic Lewis base" refers to Lewis bases that are also heterocycles. Examples of heterocyclic Lewis bases include pyridine, imidazole, thiazole, 1,3-azaphosphole, and furan.

The term "continuous" means a system that operates without interruption or cessation. For example a continuous process to produce a polymer would be one where the reactants are continually introduced into one or more reactors and polymer product is continually withdrawn.

Transition Metal Complexes

In at least one embodiment, the present disclosure relates to catalyst compounds having a bis(heterocyclic-olate) Lewis base tridentate ligand, such as a bis(thiophen-3-olate) tridentate ligand, which coordinates to a group 3, 4, or 5 transition metal center, forming two eight-membered rings.

A catalyst compound can be represented by Formula (I):

(I)

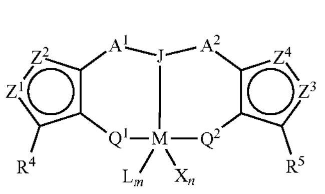

wherein:

- M is a group 3, 4, or 5 metal, preferably a group 4 metal;
- each $A^1$ and $A^2$ is independently an aromatic, substituted aromatic, or alkenediyl group;
- heterocyclic ring fragments —($Z^1Z^2$)— and —($Z^3Z^4$)— are independently selected from —($Z^5Z^6$)— or —($Z^6Z^5$)—, with $Z^5$ being selected from oxygen, sulfur, S(O), $S(O)_2$, and N($R^{50}$), and $Z^6$ being selected from nitrogen and C($R^{51}$), wherein each $R^{50}$ and $R^{51}$ is independently hydrogen, $C_1$-$C_{40}$ hydrocarbyl, $C_1$-$C_{40}$ substituted hydrocarbyl, a monovalent heteroatom, or a heteroatom-bonded monovalent group (such as F, Cl, Br, I, methyl, ethyl, propyl, butyl, pentyl, hexyl, heptyl, octyl, nonyl, decyl, undecyl, dodecyl, adamantyl, phenyl);
- each of $R^4$ and $R^5$ is independently hydrogen, $C_1$-$C_{40}$ hydrocarbyl, $C_1$-$C_{40}$ substituted hydrocarbyl, a monovalent heteroatom, or a heteroatom-bonded monovalent group, (such as F, Cl, Br, I, methyl, ethyl, propyl, butyl, pentyl, hexyl, heptyl, octyl, nonyl, decyl, undecyl, dodecyl, adamantyl, cyclohexyl, phenyl, carbazolyl);
- J is a heterocyclic Lewis base (such as pyridine);
- each $Q^1$ and $Q^2$ are independently selected from oxygen, sulfur, N($R^{30}$), or P($R^{30}$) wherein $R^{30}$ is $C_1$-$C_{40}$ hydrocarbyl, substituted $C_1$-$C_{40}$ hydrocarbyl, a monovalent heteroatom, or a heteroatom-bonded monovalent group (such as F, Cl, Br, I, methyl, ethyl, propyl, butyl, pentyl, hexyl, heptyl, octyl, nonyl, decyl, undecyl, dodecyl, adamantyl, cyclohexyl, phenyl, carbazolyl);
- L is a Lewis base, optionally any two L groups join together to form a bidentate Lewis base (such as ethers, amines, phosphines, thioethers, esters, $Et_2O$, MeOtBu, $Et_3N$, $PhNMe_2$, $MePh_2N$, tetrahydrofuran, and dimethylsulfide);
- X is an anionic ligand, optionally an X group is joined to an L group to form a monoanionic bidentate group, or optionally, any two X groups are joined together to form a dianionic ligand (such as methyl, ethyl, propyl, butyl, pentyl, hexyl, heptyl, octyl, nonyl, decyl, undecyl, dodecyl, adamantyl, benzyl, trimethylsilyl, neopentyl, phenyl, hydrido, chloro, fluoro, bromo, iodo, trifluoromethanesulfonate, dimethylamido, diethylamido, dipropylamido, and diisopropylamido);
- n is 1, 2 or 3;
- m is 0, 1, or 2; and
- n+m is not greater than 4, such as 1, 2, 3, or 4.

In at least one embodiment the catalyst compound is represented by Formula (I) wherein the compound features a tridentate dianionic ligand comprising three heterocyclic rings and wherein the tridentate dianionic ligand is coordinated to the metal to form a pair of 8-membered metallocycle rings. In at least one embodiment the catalyst compounds represented by Formula (I) have a structure wherein the ring formed by M, $Q^1$, the ring containing $Z^1Z^2$, $A^1$, and J is an eight-membered ring and the ring formed by M, $Q^2$, the ring containing $Z^3Z^4$, $A^2$ and, J is an eight-membered ring having a structure wherein the ring formed by M, $Q^1$, the ring containing $Z^1Z^2$, $A^1$, and J is an eight-membered ring, and the ring formed by M, $Q^2$, the ring containing $Z^3Z^4$, $A^2$ and, J is an eight-membered ring.

The heterocyclic Lewis base (J) of Formula (I) is a divalent group that bridges the $A^1$ and $A^2$ groups and is coordinated to the metal center M as a neutral 2-electron donor. The Lewis base J may be an aromatic or non-aromatic heterocycle. The heterocyclic Lewis base J may be a heterocyclic Lewis base having 5 or 6 ring atoms. In at least one embodiment, J is a group 15-containing heterocycle, or a group 16-containing heterocycle, such as J is a nitrogen-containing heterocycle, an oxygen-containing heterocycle, a phosphorus-containing heterocycle, or a sulfur-containing heterocycle, for example. 5-membered heterocyclic Lewis bases may include thiazoles, isothiazoles, 1,2,4-thidiazoles, 1,2,5-thidiazoles, 1,3,4-thidiazoles, thiophenes, oxazoles, isoxazoles, oxazolines (e.g., 2-oxazoline, 3-oxazoline, 4-oxazoline), oxazolidines, imidazoles, furans, thiofurans, pyrroles, pyrazoles, 1,2,3-triazoles, 1,2,4-triazoles, phospholes, azaphospholes, or isomers thereof, which may be substituted or unsubstituted.

In at least one embodiment, J is a heterocyclic ring having 5 ring atoms. In at least one embodiment, J is a heterocyclic ring having 6 ring atoms. In alternate embodiments of the invention, J contains 1, 2 or more ring atoms that are heteroatoms. Preferably, when J is a six membered ring, the ring contains 1 ring heteroatom, preferably J contains one of S, N, P, or O as a ring atom. Alternately, when J is a five membered ring, the ring contains at least 1 heteroatom ring atom, preferably J contains at least one of S, N, P, O as a ring atom. Alternately J may be a five membered ring, and the ring contains at least 2 heteroatom ring atoms (which may be the same or different), preferably J contains at least two of S, N, P, or O as ring atoms (which may be the same or different). In a preferred embodiment the heterocyclic Lewis base (J) is a pyridine or a substituted pyridine.

The heterocyclic ring fragments —($Z^1Z^2$)— and —($Z^3Z^4$)— are each part of what is referred to in this document as a heterocyclic-ol such as a thiophen-3-ol (when neutral charged) or heterocyclic-olate such as thiophen-3-olate (when deprotonated to form an anion) group. For example, a heterocyclic-ol group is represented by either of the formulas:

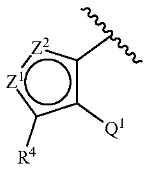
or
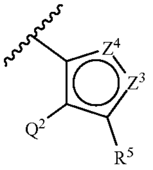

where indicates a connection to the rest of the compound, and where $Q^1$ and $Q^2$ are selected from OH, SH, $NH(R^{30})$, or $PH(R^{30})$ and $Z^1$, $Z^2$, $Z^3$, $Z^4$, $R^4$, $R^5$, and $R^{30}$ are defined as above.

A heterocyclic-olate group is represented by either of the formulas:

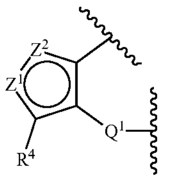
or
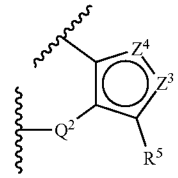

where indicates a connection to the rest of the compound, and where $Q^1$ and $Q^2$ are selected from O, S, $N(R^{30})$, or $P(R^{30})$ and $Z^1$, $Z^2$, $Z^3$, $Z^4$, $R^4$, $R^5$, and $R^{30}$ are defined as above.

In at least one embodiment, the heterocyclic ring fragments $—(Z^1Z^2)—$ and $—(Z^3Z^4)—$ (of the heterocyclic-ol and heterocyclic-olate groups) are independently selected from $—(SC(R^{51}))—$ or $—(C(R^{51})S)—$, with each $R^{50}$ and $R^{51}$ is independently hydrogen, $C_1$-$C_{40}$ hydrocarbyl, $C_1$-$C_{40}$ substituted hydrocarbyl, a monovalent heteroatom, or a heteroatom-bonded monovalent group. In a preferred embodiment, $—(Z^1Z^2)—$ is —(C(H)S)— and $—(Z^3Z^4)—$ is —(C(H)S))—; this is equivalent to $Z^1$ and $Z^3$ are each CH, and $Z^2$ and $Z^4$ are each sulfur.

In at least one embodiment, $A^1$ is represented by the formula:

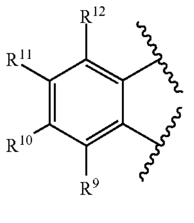

where indicates a connection to the catalyst compound, and each of $R^9$, $R^{10}$, $R^{11}$, and $R^{12}$ is independently hydrogen, $C_1$-$C_{40}$ hydrocarbyl, $C_1$-$C_{40}$ substituted hydrocarbyl, a monovalent heteroatom, or a heteroatom-bonded monovalent group (such as F, Cl, Br, I, methyl, ethyl, propyl, butyl, pentyl, hexyl, heptyl, octyl, nonyl, decyl, undecyl, dodecyl, adamantyl), or one or more of $R^9$ and $R^1$, $R^{10}$ and $R^{11}$, or $R^{11}$ and $R^{12}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms.

In at least one embodiment, $A^2$ is represented by the formula:

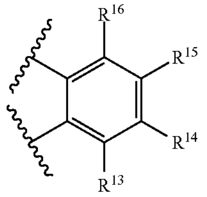

where indicates a connection to the catalyst compound, and each of $R^{13}$, $R^{14}$, $R^{15}$, and $R^{16}$ is independently hydrogen, $C_1$-$C_{40}$ hydrocarbyl, $C_1$-$C_{40}$ substituted hydrocarbyl, a monovalent heteroatom, or a heteroatom-bonded monovalent group (such as F, Cl, Br, I, methyl, ethyl, propyl, butyl, pentyl, hexyl, heptyl, octyl, nonyl, decyl, undecyl, dodecyl, adamantyl), or one or more of $R^{13}$ and $R^{14}$, $R^{14}$ and $R^{15}$, or $R^{15}$ and $R^{16}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms.

In at least one embodiment, J is represented by the formula:

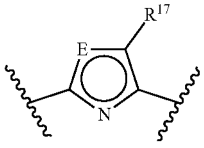

where indicates a connection to the catalyst compound, and $R^{17}$ is hydrogen, $C_1$-$C_{40}$ hydrocarbyl, $C_1$-$C_{40}$ substituted hydrocarbyl, a monovalent heteroatom, or a heteroatom-bonded monovalent group (such as F, Cl, Br, I, methyl, ethyl, propyl, butyl, pentyl, hexyl, heptyl, octyl, nonyl, decyl, undecyl, dodecyl, adamantyl). E can be oxygen (such that J is an oxazole), sulfur (such that J is a thiazole), or N(hydrocarbyl) (such that J is an imidazole).

In at least one embodiment, J is represented by the formula:

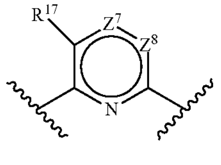

where indicates a connection to the catalyst compound, and $Z^7$ is selected from nitrogen and $C(R^{18})$, and $Z^8$ is selected from nitrogen and $C(R^{19})$, and each of $R^{17}$ and $R^{18}$ and $R^{19}$ are selected from hydrogen, $C_1$-$C_{40}$ hydrocarbyl, $C_1$-$C_{40}$ substituted hydrocarbyl, a monovalent heteroatom, or a heteroatom-bonded monovalent group (such as F, Cl, Br, I, methyl, ethyl, propyl, butyl, pentyl, hexyl, heptyl, octyl, nonyl, decyl, undecyl, dodecyl, adamantyl, phenyl).

In at least one embodiment, the catalyst compound represented by Formula (I) is represented by Formula (II) or Formula (III):

(II)

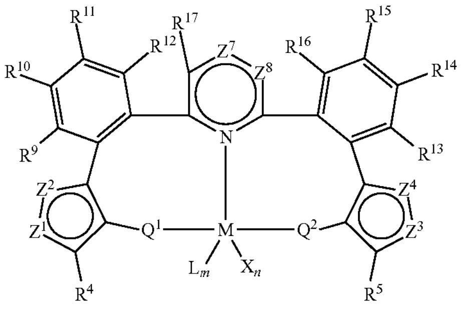

(III)

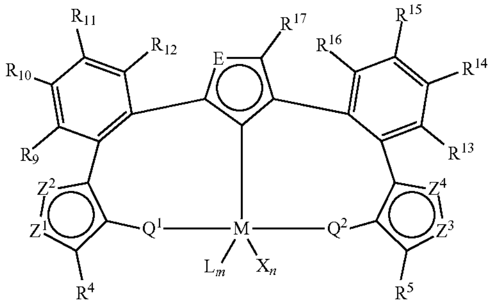

wherein:

each $Q^1$ and $Q^2$ are independently selected from oxygen, sulfur, $N(R^{30})$, or $P(R^{30})$ wherein $R^{30}$ is $C_1$-$C_{40}$ hydrocarbyl, substituted $C_1$-$C_{40}$ hydrocarbyl, a monovalent heteroatom, or a heteroatom-bonded monovalent group (such as F, Cl, Br, I, methyl, ethyl, propyl, butyl, pentyl, hexyl, heptyl, octyl, nonyl, decyl, undecyl, dodecyl, adamantyl, cyclohexyl, phenyl, carbazolyl);

heterocyclic ring fragments —$(Z^1Z^2)$— and —$(Z^3Z^4)$— are selected from —$(Z^5Z^6)$— or —$(Z^6Z^5)$—, with $Z^5$ being selected from oxygen, sulfur, S(O), $S(O)_2$, and $N(R^{50})$, and $Z^6$ being selected from nitrogen and $C(R^{51})$, wherein each $R^{50}$ and $R^{51}$ is independently hydrogen, $C_1$-$C_{40}$ hydrocarbyl, $C_1$-$C_{40}$ substituted hydrocarbyl, a monovalent heteroatom, or a heteroatom-bonded monovalent group (such as F, Cl, Br, I, methyl, ethyl, propyl, butyl, pentyl, hexyl, heptyl, octyl, nonyl, decyl, undecyl, dodecyl, adamantyl, cyclohexyl, phenyl);

$Z^7$ is selected from nitrogen and $C(R^{18})$;

$Z^8$ is selected from nitrogen and $C(R^{19})$;

E is oxygen, sulfur, or $N(R^{20}$ each of $R^4$ and $R^5$ is independently hydrogen, $C_1$-$C_{40}$ hydrocarbyl, $C_1$-$C_{40}$ substituted hydrocarbyl, a monovalent heteroatom, or a heteroatom-bonded monovalent group (such as F, Cl, Br, I, methyl, ethyl, propyl, butyl, pentyl, hexyl, heptyl, octyl, nonyl, decyl, undecyl, dodecyl, adamantyl, cyclohexyl, phenyl, carbazolyl);

each of $R^9$, $R^{10}$, $R^{11}$, and $R^{12}$ is independently hydrogen, $C_1$-$C_{40}$ hydrocarbyl, $C_1$-$C_{40}$ substituted hydrocarbyl, a monovalent heteroatom, or a heteroatom-bonded monovalent group (such as F, Cl, Br, I, methyl, ethyl, propyl, butyl, pentyl, hexyl, heptyl, octyl, nonyl, decyl, undecyl, dodecyl, adamantyl, cyclohexyl, phenyl, carbazolyl), or one or more of $R^9$ and $R^{10}$, $R^{10}$ and $R^{11}$, or $R^{11}$ and $R^{12}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms;

each of $R^{13}$, $R^{14}$, $R^{15}$, and $R^{16}$ is independently hydrogen, $C_1$-$C_{40}$ hydrocarbyl, $C_1$-$C_{40}$ substituted hydrocarbyl, a monovalent heteroatom, or a heteroatom-bonded monovalent group (such as F, Cl, Br, I, methyl, ethyl, propyl, butyl, pentyl, hexyl, heptyl, octyl, nonyl, decyl, undecyl, dodecyl, adamantyl, cyclohexyl, phenyl, carbazolyl), or one or more of $R^{13}$ and $R^{14}$, $R^{14}$ and $R^{15}$, or $R^{15}$ and $R^{16}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms;

each of $R^{17}$, $R^{18}$, $R^{19}$ and $R^{20}$ is hydrogen, $C_1$-$C_{40}$ hydrocarbyl, $C_1$-$C_{40}$ substituted hydrocarbyl, a monovalent heteroatom, or a heteroatom-bonded monovalent group (such as F, Cl, Br, I, methyl, ethyl, propyl, butyl, pentyl, hexyl, heptyl, octyl, nonyl, decyl, undecyl, dodecyl, adamantyl, phenyl), or one or more of $R^{17}$ and $R^{18}$, $R^{18}$ and $R^{19}$ may be joined together to form one or more substituted hydrocarbyl rings, unsubstituted hydrocarbyl rings, substituted heterocyclic rings, or unsubstituted heterocyclic rings each having 5, 6, 7, or 8 ring atoms;

M is a group 3, 4, or 5 metal;

L is a Lewis base;

X is an anionic ligand;

n is 1, 2 or 3;

m is 0, 1, or 2;

n+m is not greater than 4;

any two L groups may be joined together to form a bidentate Lewis base;

an X group may be joined to an L group to form a monoanionic bidentate group; and any two X groups may be joined together to form a dianionic ligand.

The metal, M, of Formula (I), Formula (II), or Formula (III) can be a group 3, 4 or 5 metal, such as M can be a group 4 metal. Group 4 metals may include zirconium, titanium, and hafnium. In a preferred embodiment, M is zirconium or hafnium.

The groups $Q^1$ and $Q^2$ of Formula (I), Formula (II), or Formula (III) may be oxygen, sulfur, $N(R^{30})$, or $P(R^{30})$, wherein $R^{30}$ is $C_1$-$C_{40}$ hydrocarbyl, substituted $C_1$-$C_{40}$ hydrocarbyl, a monovalent heteroatom, or a heteroatom-bonded monovalent group (such as F, Cl, Br, I, methyl, ethyl, propyl, butyl, pentyl, hexyl, heptyl, octyl, nonyl, decyl, undecyl, dodecyl, adamantyl, phenyl). In a preferred embodiment $Q^1$ and $Q^2$ are both oxygen.

Each L of Formula (I), Formula (II), or Formula (III) can be independently selected from ethers, amines, phosphines, thioethers, esters, $Et_2O$, MeOtBu, $Et_3N$, $PhNMe_2$, $MePh_2N$, tetrahydrofuran, and dimethylsulfide, and each X can be independently selected from $C_1$-$C_{40}$ hydrocarbyl, substituted $C_1$-$C_{40}$ hydrocarbyl, a monovalent heteroatom, or a heteroatom-bonded monovalent group such as, but not limited to, (methyl, benzyl, trimethylsilyl, neopentyl, ethyl, propyl, butyl, phenyl, hydrido, chloro, fluoro, bromo, iodo, trifluoromethanesulfonate, dimethylamido, diethylamido, dipropylamido, and diisopropylamido. In at least one embodiment, in of Formula (I), Formula (II), or Formula (III) n is 2 and each X is independently chloro or methyl.

$R^{17}$ of Formula (II) or Formula (III) can be hydrogen, $C_1$-$C_{40}$ hydrocarbyl, $C_1$-$C_{40}$ substituted hydrocarbyl, a monovalent heteroatom, or a heteroatom-bonded monovalent group (such as F, Cl, Br, I, methyl, ethyl, propyl, butyl, pentyl, hexyl, heptyl, octyl, nonyl, decyl, undecyl, dodecyl, adamantyl, phenyl). In at least one embodiment, $R^{17}$ is hydrogen.

E of Formula (III) can be selected from oxygen (such that J is an oxazole), sulfur (such that J is a thiazole), or $N(R^{20})$ (such that J is an imidazole), where $R^{20}$ is hydrogen, $C_1$-$C_{40}$ hydrocarbyl, $C_1$-$C_{40}$ substituted hydrocarbyl, a monovalent heteroatom, or a heteroatom-bonded monovalent group (such as F, Cl, Br, I, methyl, ethyl, propyl, butyl, pentyl, hexyl, heptyl, octyl, nonyl, decyl, undecyl, dodecyl, adamantyl, phenyl). In at least one embodiment, E is selected sulfur, oxygen, or NMe.

Each of $R^4$ and $R^5$ of Formula (II) or Formula (III) can be independently selected from hydrogen, $C_1$-$C_{40}$ hydrocarbyl, $C_1$-$C_{40}$ substituted hydrocarbyl, alkoxy, silyl, amino, aryloxy, halogen, or phosphino (such as F, Cl, Br, I, F, methyl, ethyl, propyl, butyl, pentyl, hexyl, heptyl, octyl, nonyl, decyl, undecyl, dodecyl, adamantyl, phenyl). In at least embodiment $R^4$ and $R^5$ are each a $C_4$-$C_{40}$ cyclic tertiary hydrocarbyl group. For example, $R^4$ and $R^5$ of Formula (II) or Formula (III) can be independently $C_1$-$C_{10}$ alkyl, such as $R^4$ and $R^5$ can be tert-butyl or adamanyl. In at least one embodiment, $R^4$ and $R^5$ are independently selected from unsubstituted phenyl, substituted phenyl, unsubstituted carbazole, substituted carbazole, unsubstituted naphthyl, substituted naphthyl, unsubstituted anthracenyl, substituted anthracenyl, unsubstituted fluorenyl, or substituted fluorenyl, a monovalent heteroatom, or a heteroatom-bonded monovalent group, such as $R^4$ and $R^5$ can be independently unsubstituted phenyl or 3,5-di-tert-butylbenzyl. Furthermore, either (1) $R^4$ can be $C_1$-$C_{20}$ alkyl (e.g., $R^4$ can be tert-butyl) and $R^5$ can be an aryl, or (2) $R^5$ can be $C_1$-$C_{20}$ alkyl (e.g., $R^5$ can be tert-butyl) and $R^4$ can be an aryl. Alternately, $R^4$ and/or $R^5$ can be independently a monovalent heteroatom, such as $R^4$ and $R^5$ can be a halogen atom (such as Br, Cl, F, or I).

Each of $R^9$, $R^{10}$, $R^{11}$, $R^{12}$, $R^{13}$, $R^{14}$, $R^{15}$, $R^{16}$, and $R^{17}$ of Formula (II) or Formula (III) can be independently hydrogen or $C_1$-$C_{10}$ alkyl (such as methyl, ethyl, propyl, butyl, pentyl, hexyl, heptyl, octyl, nonyl, decyl, adamantyl), preferably $R^9$, $R^{10}$, $R^{11}$, R, $R^{13}$, $R^{14}$, $R^{15}$, $R^{16}$, and $R^{17}$ can be independently hydrogen, methyl, ethyl, propyl, or isopropyl. In at least one embodiment, $R^9$, $R^{10}$, $R^{11}$, $R^{12}$, $R^{13}$, $R^{14}$, $R^{15}$, $R^{16}$, and $R^{17}$ are hydrogen. Alternately, each of $R^9$, $R^{10}$, $R^{11}$, $R^{12}$, $R^{13}$, $R^{14}$, $R^{15}$, $R^{16}$, and $R^{17}$ of Formula (II) or Formula (III) can be independently hydrogen, phenyl, cyclohexyl, fluoro, chloro, methoxy, ethoxy, phenoxy, or trimethylsilyl.

In at least one embodiment, the catalyst compound of Formula (II) is one or more of the following, where M=group 4 metal (such as Hf, Zr or Ti); R=halide, $C_1$-$C_{20}$ hydrocarbyl (such as methyl, ethyl, propyl, butyl, pentyl, hexyl, heptyl, octyl, nonyl, decyl, undecyl, dodecyl, adamantyl, benzyl, trimethylsilyl, neopentyl, phenyl, hydrido, chloro, fluoro, bromo, iodo, trifluoromethanesulfonate, dimethylamido, diethylamido, dipropylamido, and diisopropylamido):

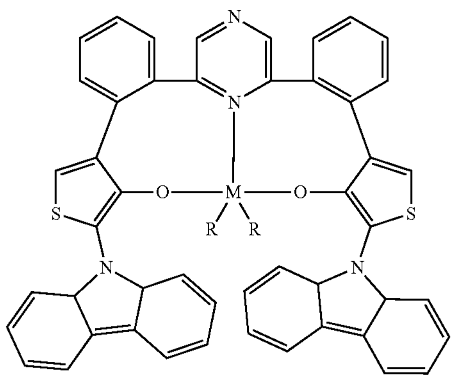

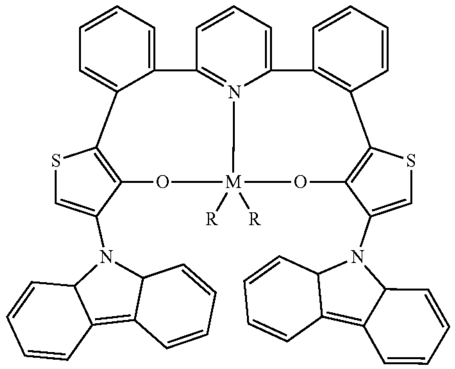

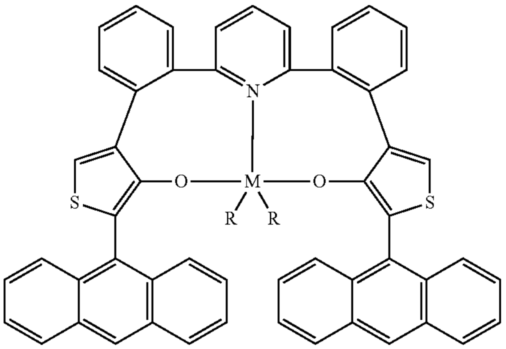

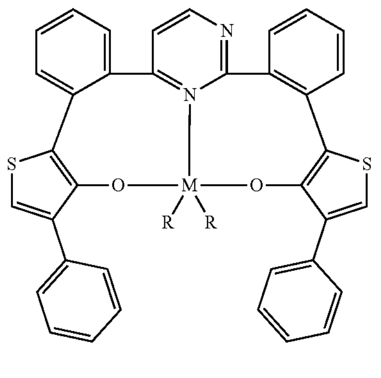

-continued
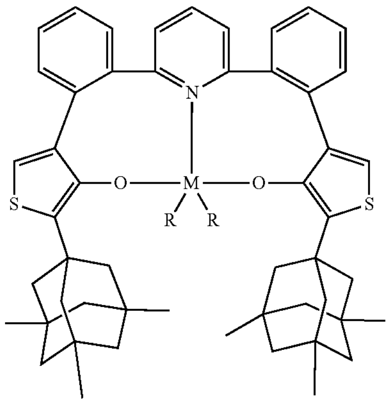
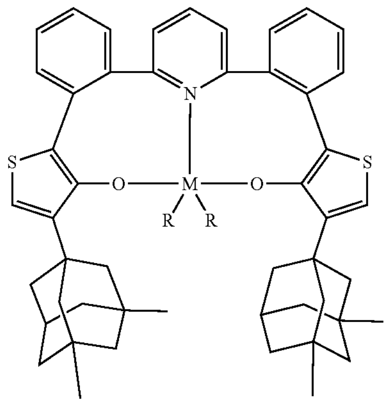
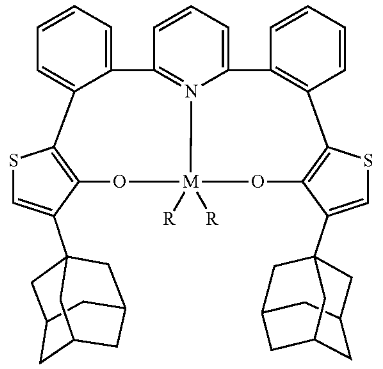
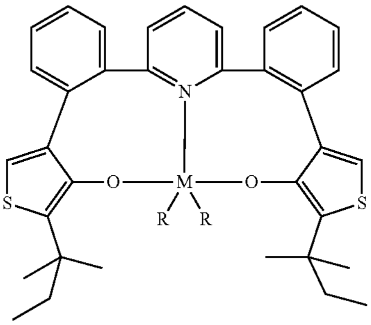
-continued
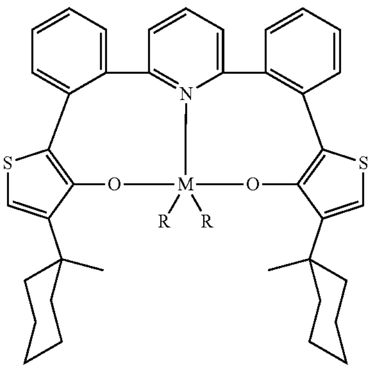
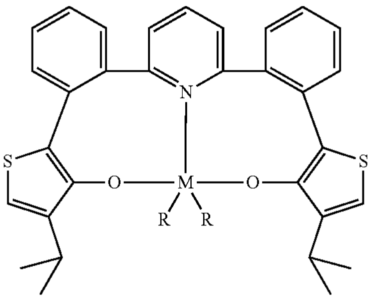
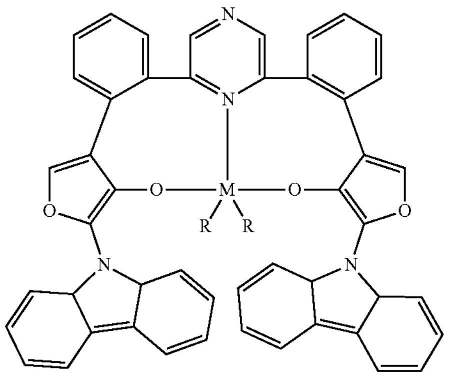
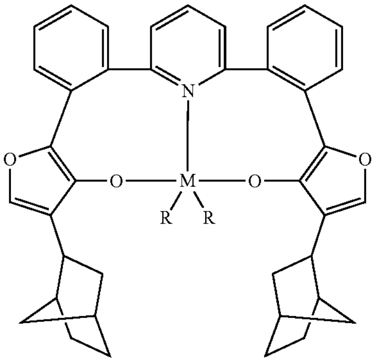

-continued
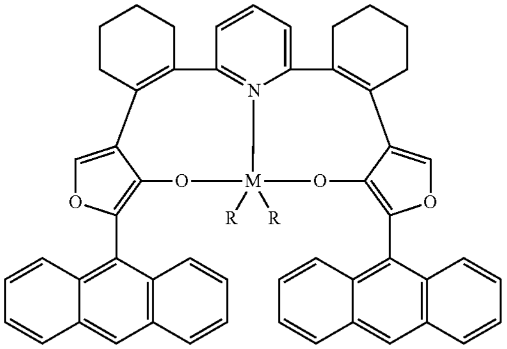
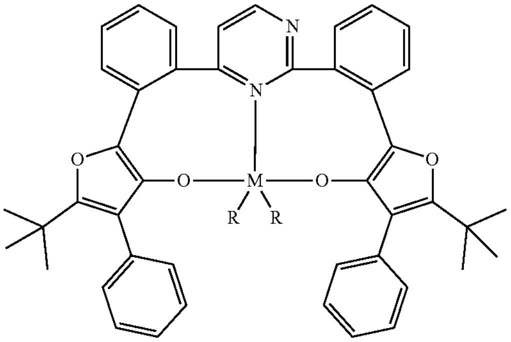
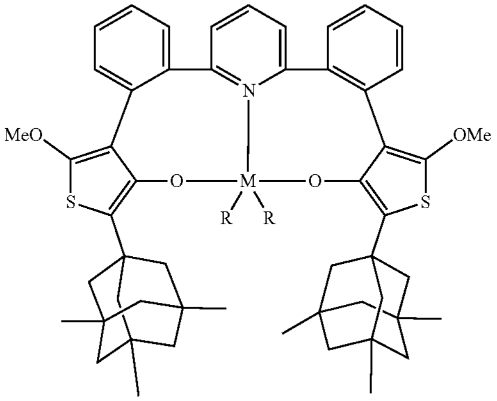
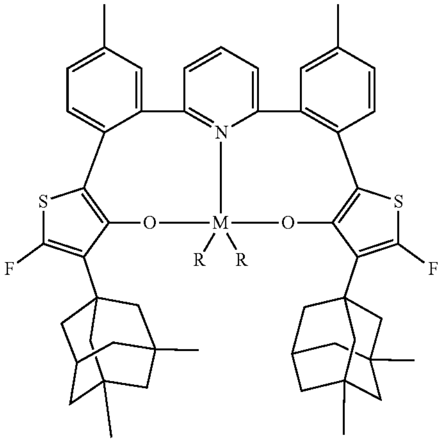
-continued
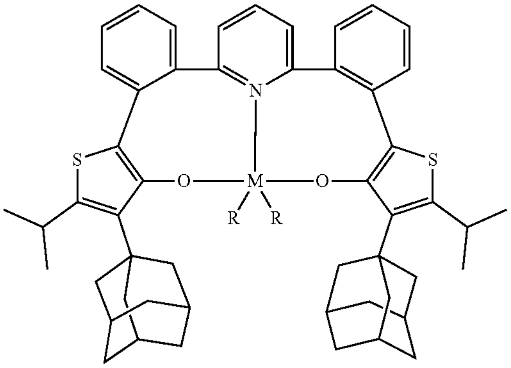
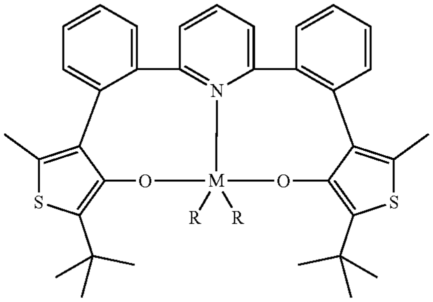
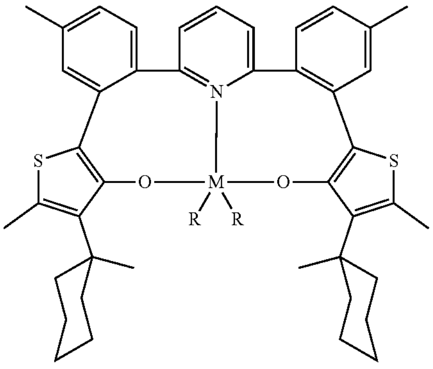
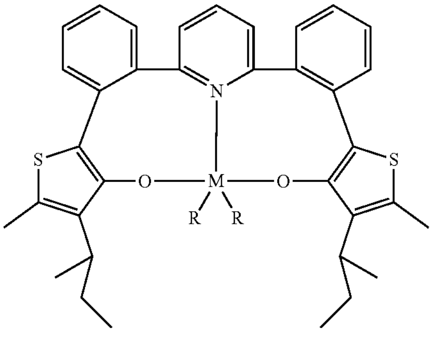

-continued
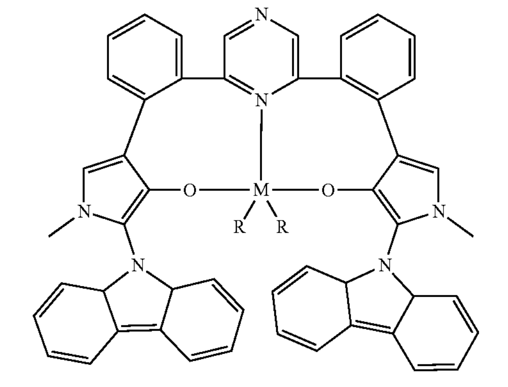
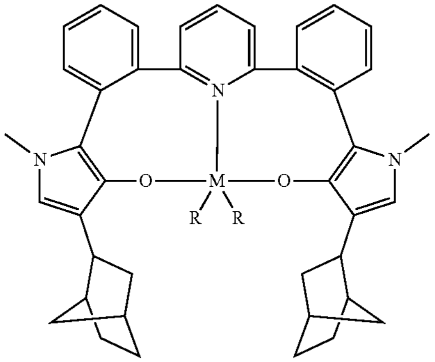
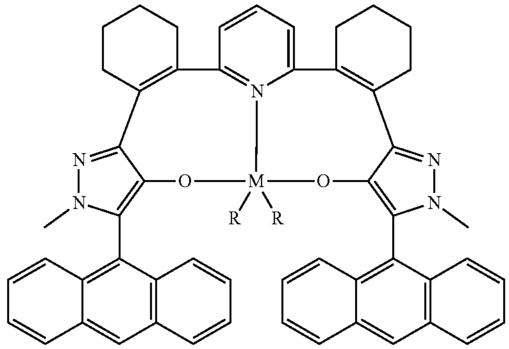
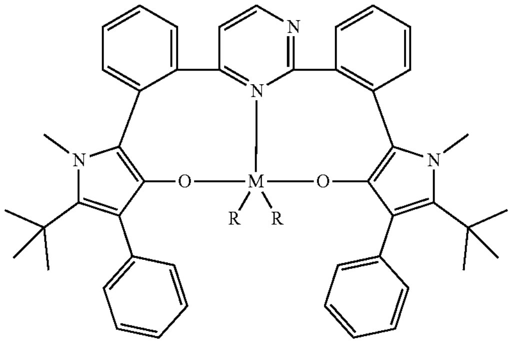
-continued
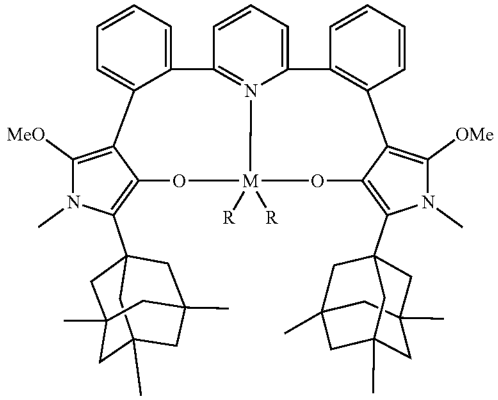
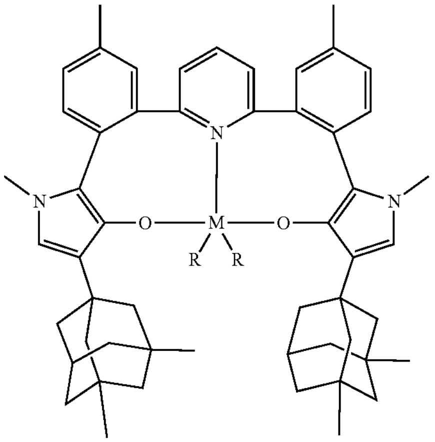
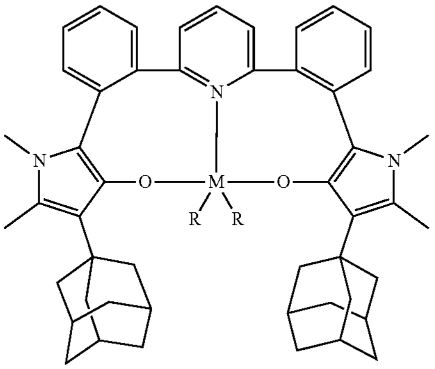
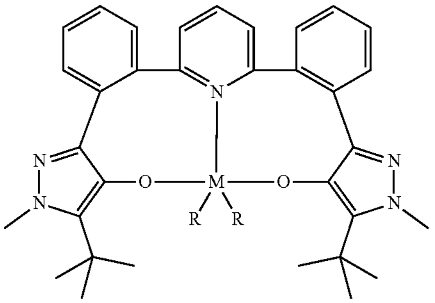

-continued
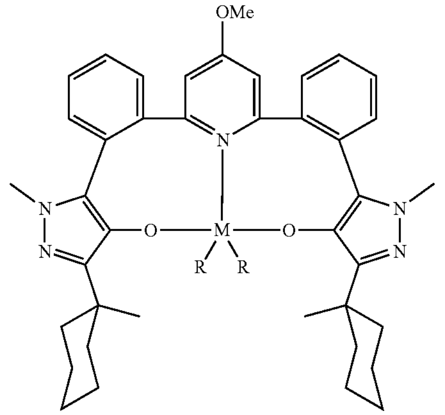
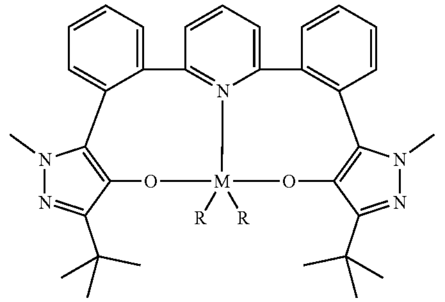
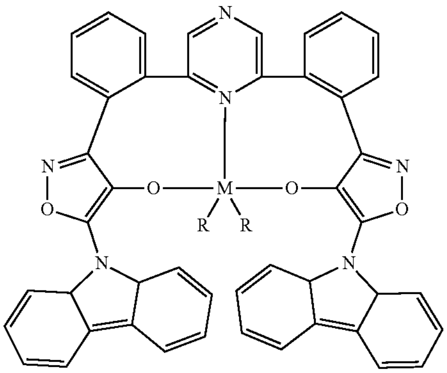
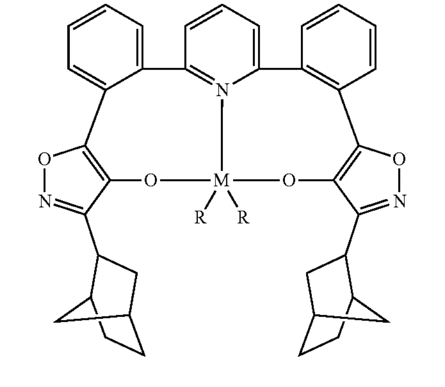
-continued
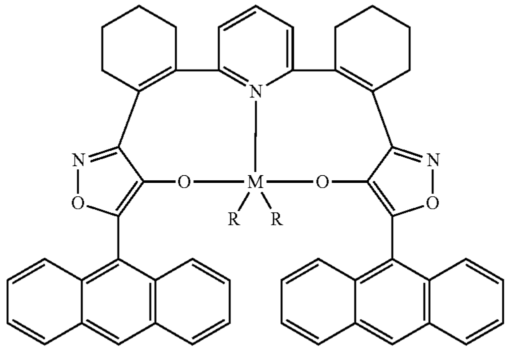
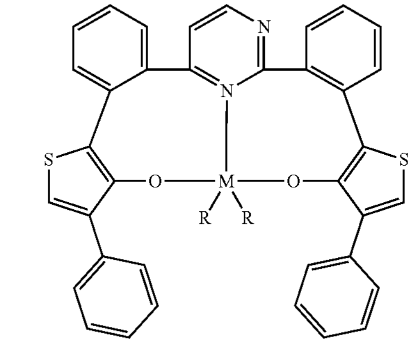
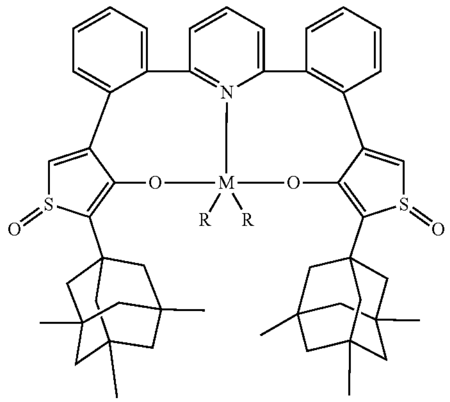
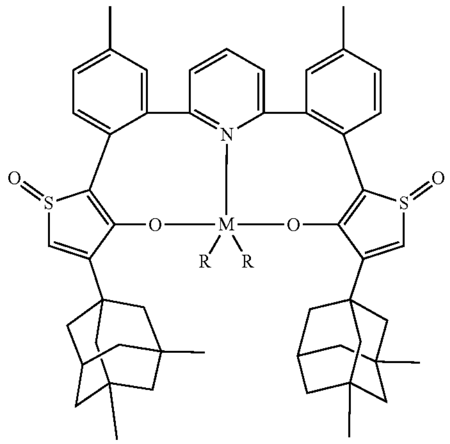

-continued

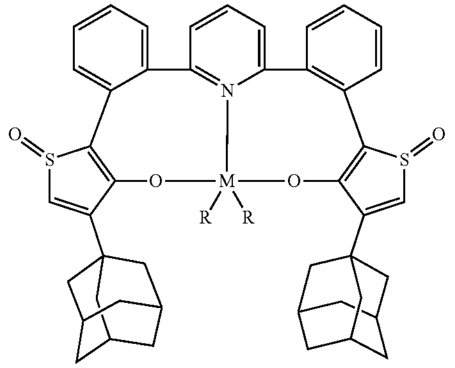

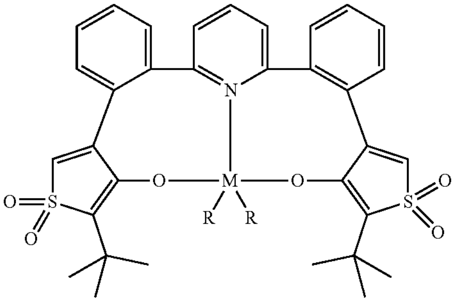

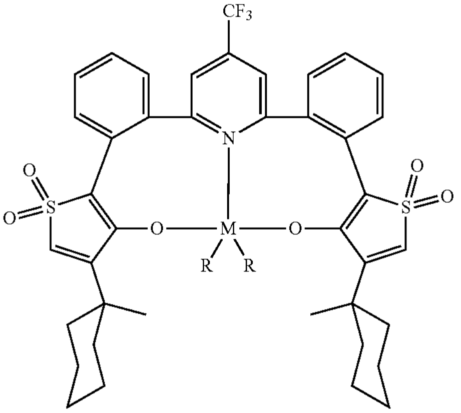

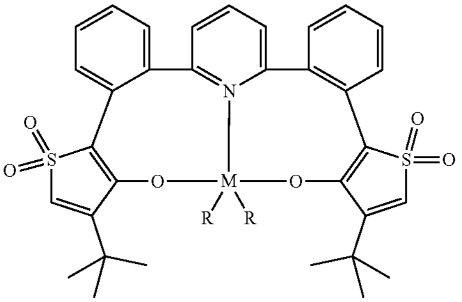

In at least one embodiment, the catalyst compound of Formula (III) is one or more of the following, where M=group 4 metal (such as Hf, Zr or Ti); R=halide, $C_1$-$C_{20}$ hydrocarbyl (such as methyl, ethyl, propyl, butyl, pentyl, hexyl, heptyl, octyl, nonyl, decyl, undecyl, dodecyl, adamantyl, benzyl, trimethylsilyl, neopentyl, phenyl, hydrido, chloro, fluoro, bromo, iodo, trifluoromethanesulfonate, dimethylamido, diethylamido, dipropylamido, and diisopropylamido):

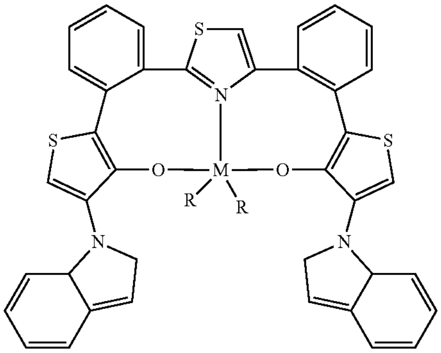

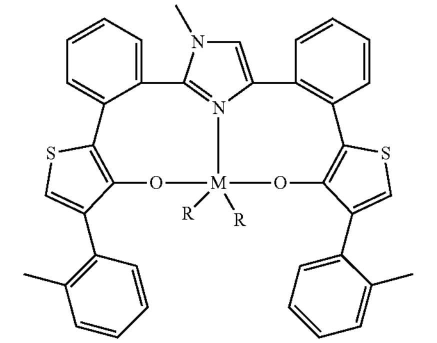

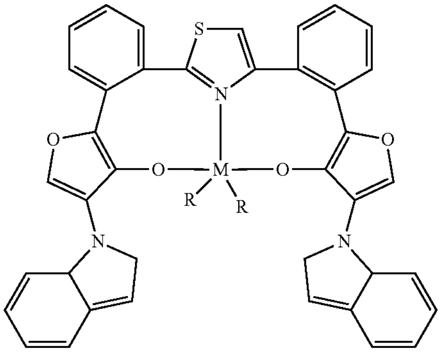

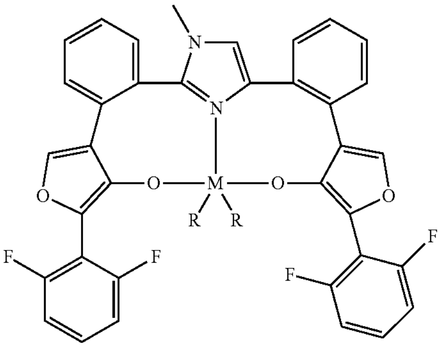

-continued

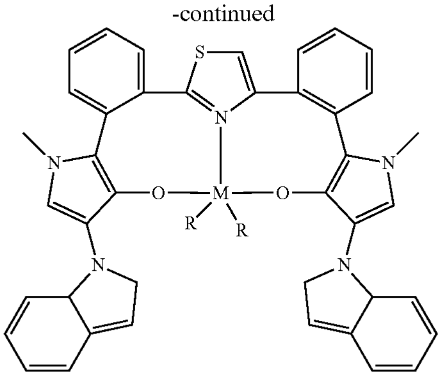

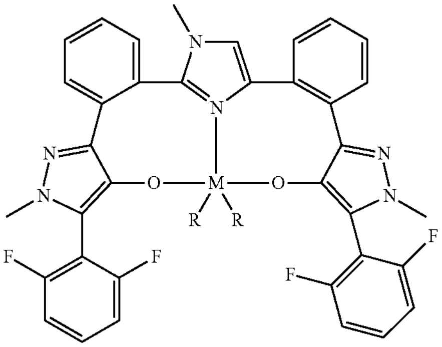

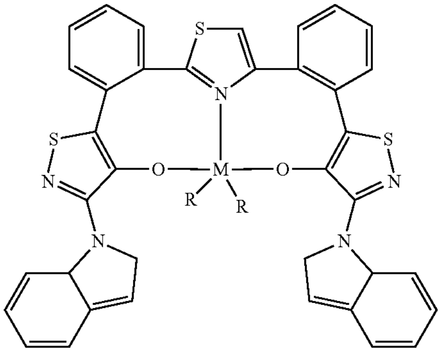

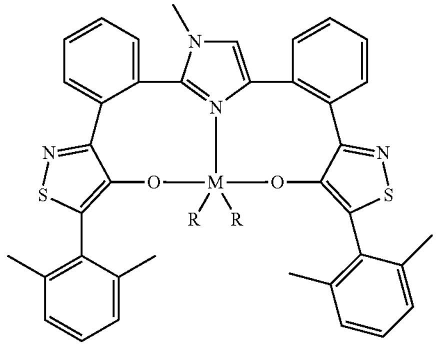

In at least one embodiment, one or more different catalyst compounds are present in a catalyst system. One or more different catalyst compounds can be present in the reaction zone where the process(es) described herein occur. The same activator can be used for the transition metal compounds, however, two different activators, such as a non-coordinating anion activator and an alumoxane, can be used in combination.

The two transition metal compounds (pre-catalysts) may be used in any ratio. Molar ratios of (A) transition metal compound to (B) transition metal compound can be a range of (A:B) of from 1:1000 to 1000:1, alternatively 1:100 to 500:1, alternatively 1:10 to 200:1, alternatively 1:1 to 100:1, alternatively 1:1 to 75:1, and alternatively 5:1 to 50:1. The particular ratio chosen will depend on the exact pre-catalysts chosen, the method of activation, and the end product desired. In at least one embodiment, when using the two pre-catalysts, where both are activated with the same activator, mole percentages, based upon the molecular weight of the pre-catalysts, can be from 10% to 99.9% A to 0.1% to 90% B, alternatively 25% to 99% A to 0.5% to 75% B, alternatively 50% to 99% A to 1% to 50% B, and alternatively 75% to 99% A to 1% to 10% B.

Methods to Prepare the Catalyst Compounds

The following describes methods to prepare catalysts described herein. FIG. 1 illustrates the a general synthesis route to prepare the inventive bis(heterocyclic-ol) Lewis base ligands and bis(heterocyclic-olate) Lewis base transition metal complexes. Catalyst compounds of this type will be synthesized as described below (including the Examples below), where free ligand can be obtained via a multiple reaction process in order to join together the three fragments (i.e., heterocyclic group, aryl linker group, and the heterocyclic-ol such as a thiophen-3-ol group). Abbreviations used in FIG. 1 are as follows: RP is a protecting group; examples of suitable protecting groups include, but are not limited to, methoxymethyl (MOM), ethoxymethyl, tetrahydropyranyl ether (THP), and benzyl. R is a hydrocarbyl or monovalent heteroatom or heteroatom-bound monovalent group; examples include phenyl, mesityl, cumyl, methyl, tert-butyl, isopropyl, cyclohexyl, adamantanyl, methylcyclohexyl, and carbazolyl. Metal $M^1$ is a group 1 or 2 metal or metal halide; examples include lithium, magnesium chloride, and magnesium bromide. Metal $M^2$ is a group 11 or 12 metal or metal halide; examples include copper, zinc, copper chloride, and zinc chloride. J-$Br_2$ represents a dibrominated heterocyclic Lewis base; examples include 2,6-dibromopyridine, 2,6-dibromo-4-methylpyridine, 2,4-dibromo-1-methyl-1H-imidazole, 2,4-dibromooxazole, 2,5-dibromothiophene, 2,5-dibromofuran, 2,5-dibromo-3-hexylthiophene. The heterocycle fragment ($Z^1Z^2$), metal M, anionic ligand X, and heterocycle J are as described earlier.

The protected heterocyclic-ol (S1 in FIG. 1) is lithiated by reaction with butyllithium to form the lithium derivative S2. This lithium derivative is converted to a boronic acid ester (S3) by reaction with 2-isopropoxy-4,4,5,5-tetramethyl-1,3,2-dioxaborolane. The Negishi coupling of compound S3 and 2-bromoiodobenzene will form bromoaryl derivative S4. An alternative route to S4 will be to slowly add 1-bromo-2-chlorobenzene to compound S2. Derivative S4 may be metalated to form S5 by reaction with butyllithium or magnesium metal. Compound S5 will then be converted to S6 by reaction with a main-group metal halide, such as zinc chloride or copper chloride. Compound S6 can then be joined in a Pd- or Ni-catalyzed coupling with J-$Br_2$ to form the bis(heterocyclic-ol) Lewis base ligand following deprotection. Alternatively, compound S5 may be converted to S7 by reaction with 2-isopropoxy-4,4,5,5-tetramethyl-1,3,2-dioxaborolane. Then, S7 may be converted to S8 by Negishi coupling with J-$Br_2$, followed by deprotection. Once the free ligand has been prepared, the free ligand (S8) can be converted to the corresponding transition metal complex (S9) by reaction with metal-containing reagents. Examples of suitable metal-containing reagents may include metal halides, metal amides, and organometallics. For example, metal-containing reagents may include $ZrCl_4$, $HfCl_4$, $Zr(NMe_2)_2Cl_2$(1,2-dimethoxyethane), $Hf(NMe_2)_2Cl_2$(1,2-dimethoxyethane), $Zr(NMe_2)_4$, $Hf(NEt_2)_4$, $Zr(CH_2Ph)_4$, $Hf(CH_2Ph)_4$, or $TiCl_4$. The free ligand may be: i) reacted directly with the metal-containing reagents; or ii) deprotonated by reaction with a main-group metal reagent (e.g., BuLi, NaH, iPrMgBr, MeMgBr) prior to reaction with the transition metal reagent. Alternatively, the metal halide reagents may be reacted with an alkylating agent, such as an organomagnesium reagent, to form in situ a transition metal organometallic species that can be subsequently reacted with the free ligand to form the catalyst complex.

Activators

The terms "cocatalyst" and "activator" are used herein interchangeably.

The catalyst systems described herein comprise a catalyst complex as described above and an activator such as alumoxane or a non-coordinating anion and may be formed by combining the catalyst components described herein with activators in any manner known from the literature including combining them with supports, such as silica. The catalyst systems may also be added to or generated in solution polymerization or bulk polymerization (in the monomer). Catalyst systems of the present disclosure may have one or more activators and one, two or more catalyst components. Activators are defined to be any compound which can activate any one of the catalyst compounds described above by converting the neutral metal compound to a catalytically active metal compound cation. Non-limiting activators, for example, may include alumoxanes, aluminum alkyls, ionizing activators, which may be neutral or ionic, and conventional-type cocatalysts. Suitable activators may include alumoxane compounds, modified alumoxane compounds, and ionizing anion precursor compounds that abstract a reactive, σ-bound, metal ligand making the metal compound cationic and providing a charge-balancing non-coordinating or weakly coordinating anion, e.g., a non-coordinating anion.

In at least one embodiment, the catalyst system comprises an activator and the catalyst compound of Formula (I), Formula (II), or Formula (III). The identity of the activator combined with the identity of the catalyst compound of Formula (I), Formula (II), or Formula (III) can be used to influence the activity of the catalyst. For example, in the case of a polymerization or copolymerization of an olefin such as ethylene, when a catalyst compound of Formula (I), Formula (II), or Formula (III) is combined with an ionizing/non-coordinating anion activators (e.g., N,N-dimethylanilinium tetrakis(pentafluorophenyl)borate), the catalyst activity of the catalyst compound of Formula (I), Formula (II), or Formula (III) may be >30,000 $gP \cdot mmolcat^{-1} \cdot h^{-1}$, such as 35,000 $gP \cdot mmolcat^{-1} \cdot h^{-1}$ or greater, such as 40,000 $gP \cdot mmolcat^{-1} \cdot h^{-1}$ or greater, such as 50,000 $gP \cdot mmolcat^{-1} \cdot h^{-1}$ or greater, such as 75,000 $gP \cdot mmolcat^{-1} \cdot h^{-1}$ or greater, such as 100,000 $gP \cdot mmolcat^{-1} \cdot h^{-1}$ or greater, such as 150,000 $gP \cdot mmolcat^{-1} \cdot h^{-1}$ or greater, such as 200,000 $gP \cdot mmolcat^{-1} \cdot h^{-1}$ or greater, such as 250,000 $gP \cdot mmolcat^{-1} \cdot h^{-1}$ or greater, such as 300,000 $gP \cdot mmolcat^{-1} \cdot h^{-1}$ or greater, such as 400,000 $gP \cdot mmolcat^{-1} \cdot h^{-1}$ or greater (e.g., about 379,906 $gP \cdot mmolcat^{-1} \cdot h^{-1}$). Further, when a catalyst compound of Formula (I), Formula (II), or Formula (III) is combined with an alumoxane activator (e.g., MAO), the catalyst activity of the catalyst compound of Formula (I), Formula (II), or Formula (III) can be <30,000 $gP \cdot mmolcat^{-1} \cdot h^{-1}$, such as from about 50 $gP \cdot mmolcat^{-1} \cdot h^{-1}$ to about 30,000 $gP \cdot mmolcat^{-1} \cdot h^{-1}$, such as from about 100 $gP \cdot mmolcat^{-1} \cdot h^{-1}$ to about 25,000 $gP \cdot mmolcat^{-1} \cdot h^{-1}$. Furthermore, the identity of the activator combined with the identity of the catalyst compound of Formula (I), Formula (II), or Formula (III) can be used to influence the molecular weight of the polymer products, and the Tm of the polymer products. For example, when an ionizing/non-coordinating anion activator (e.g., N,N-dimethylanilinium tetrakis(pentafluorophenyl)borate) is combined with the catalyst compound of Formula (I), Formula (II), or Formula (III), low or very low molecular weight polymers (e.g., <100,000 g/mol, such as from about 1,000 g/mol to about 20,000 g/mol, such as from about 2,000 g/mol to about 15,000 g/mol) can be formed and may have Tm values lower than that of the polymers formed using an alumoxane activator (e.g., MAO). In contrast, when an alumoxane activator (e.g., MAO), is combined with the catalyst compound of Formula (I), Formula (II), or Formula (III), high molecular weight polymers (e.g., >100,000 g/mol, such as from about 100,000 g/mol to about 3,000,000 g/mol, such as from about 500,000 g/mol to about 2,000,000 g/mol) can be formed and may have Tm values higher than that of the polymers formed using an ionizing/non-coordinating anion activators.

Alumoxane Activators

Alumoxane activators are utilized as activators in the catalyst systems described herein. Alumoxanes are generally oligomeric compounds containing —Al($R^{a'''}$)—O— subunits, where $R^{a'''}$ is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is an alkyl, halide, alkoxide or amide. Mixtures of different alumoxanes and modified alumoxanes may also be used. It may be suitable to use a visually clear methylalumoxane. A cloudy or gelled alumoxane can be filtered to produce a clear solution or clear alumoxane can be decanted from the cloudy solution. A useful alumoxane is a modified methyl alumoxane (MMAO) cocatalyst type 3A (commercially available from Akzo Chemicals, Inc. under the trade name Modified Methylalumoxane type 3A, covered under patent number U.S. Pat. No. 5,041,584, which is incorporated by reference herein). Another useful alumoxane is solid polymethylaluminoxane as described in U.S. Pat. Nos. 9,340,630, 8,404,880, and 8,975,209, which are incorporated by reference herein.

When the activator is an alumoxane (modified or unmodified), at least one embodiment select the maximum amount of activator at up to a 5,000-fold molar excess Al/M over the catalyst compound (per metal catalytic site). The minimum activator-to-catalyst-compound can be a 1:1 molar ratio. Alternate ranges may include from 1:1 to 500:1, alternately from 1:1 to 200:1, alternately from 1:1 to 100:1, or alternately from 1:1 to 50:1.

In an alternate embodiment, little or no alumoxane is used in the polymerization processes described herein. For example, alumoxane can be present at zero mole %, alternately the alumoxane can be present at a molar ratio of aluminum to catalyst compound transition metal less than 500:1, such as less than 300:1, such as less than 100:1, such as less than 1:1.

Ionizing/Non-Coordinating Anion Activators

The term "non-coordinating anion" (NCA) means an anion which either does not coordinate to a catalyst metal cation or which is only weakly coordinated to the metal cation thereby remaining sufficiently labile to be displaced by a Lewis base. "Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in accordance with the present disclosure are those that are compatible, stabilize the transition metal cation in the sense of balancing its ionic charge at +1, and yet retain sufficient lability to permit displacement during polymerization. Ionizing activators useful herein typically comprise an NCA, particularly a compatible NCA.

The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a Lewis base, such as an olefin monomer can displace it from the catalyst center. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon.

It is within the scope of the present disclosure to use an ionizing activator, neutral or ionic. It is also within the scope of the present disclosure to use neutral or ionic activators alone or in combination with alumoxane or modified alumoxane activators. For descriptions of suitable activators please see U.S. Pat. Nos. 8,658,556 and 6,211,105.

The catalyst systems of the present disclosure can include at least one non-coordinating anion (NCA) activator. In at least one embodiment, boron containing NCA activators represented by the formula below can be used:

Zd+(Ad-)

where: Z is (L-H) or a reducible Lewis acid; L is a Lewis base; H is hydrogen;

(L-H) is a Bronsted acid; Ad− is a boron containing non-coordinating anion having the charge d−; d is 1, 2, or 3.

The cation component, $Z_d^+$ may include Bronsted acids such as protons or protonated Lewis bases or reducible Lewis acids capable of protonating or abstracting a moiety, such as an alkyl or aryl, from the bulky ligand transition metal catalyst precursor, resulting in a cationic transition metal species.

The activating cation $Z_d^+$ may also be a moiety such as silver, tropylium, carbeniums, ferroceniums and mixtures, such as carbeniums and ferroceniums. $Z_d^+$ can be triphenyl carbenium. Reducible Lewis acids can be a triaryl carbenium (where the aryl can be substituted or unsubstituted, such as those represented by the formula: ($Ar_3C^+$), where Ar is aryl or aryl substituted with a heteroatom, a $C_1$ to $C_{40}$ hydrocarbyl, or a substituted $C_1$ to $C_{40}$ hydrocarbyl), such as the reducible Lewis acids "Z" may include those represented by the formula: ($Ph_3C$), where Ph is a substituted or unsubstituted phenyl, such as substituted with $C_1$ to $C_{40}$ hydrocarbyls or substituted a $C_1$ to $C_{40}$ hydrocarbyls, such as $C_1$ to $C_{20}$ alkyls or aromatics or substituted $C_1$ to $C_{20}$ alkyls or aromatics, such as Z is a triphenylcarbenium.

When $Z_d^+$ is the activating cation $(L\text{-}H)_d^+$, it can be a Bronsted acid, capable of donating a proton to the transition metal catalytic precursor resulting in a transition metal cation, including ammoniums, oxoniums, phosphoniums, silyliums, and mixtures thereof, such as ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, dioctadecylmethylamine, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers, tetrahydrothiophene, and mixtures thereof.

The anion component $A^{d-}$ includes those having the formula $[M^{k+}Q_n]^{d-}$ where k is 1, 2, or 3; n is 1, 2, 3, 4, 5, or 6 (such as 1, 2, 3, or 4); n−k=d; M is an element selected from Group 13 of the Periodic Table of the Elements, such as boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the optional proviso that in not more than 1 occurrence is Q a halide. Each Q can be a fluorinated hydrocarbyl group having 1 to 20 carbon atoms, such as each Q is a fluorinated aryl group, and such as each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting, examples of boron compounds which may be used as an activating cocatalyst are the compounds described as (and particularly those specifically listed as) activators in U.S. Pat. No. 8,658,556, which is incorporated by reference herein.

The ionic activator $Z_d^+$ ($A^{d-}$) can be one or more of N,N-dimethylanilinium tetrakis(perfluorophenyl)borate, N,N-dimethylanilinium tetrakis(perfluoronaphthyl)borate, dioctadecylmethylammonium tetrakis(perfluorophenyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis (perfluoronaphthyl)borate, triphenylcarbenium tetrakis (perfluorobiphenyl)borate, triphenylcarbenium tetrakis(3,5-bis(trifluoromethyl)phenyl)borate, or triphenylcarbenium tetra(perfluorophenyl)borate.

Alternately, the activator compounds are represented by Formula (AI):

$$[R^1R^2R^3EH]_d^+[M^{k+}Q_n]^{d-} \quad \text{(A1)}$$

wherein:

E is nitrogen or phosphorous, preferably nitrogen;

d is 1, 2 or 3 (preferably 3); k is 1, 2, or 3 (preferably 3); n is 1, 2, 3, 4, 5, or 6 (preferably 4, 5, or 6); n−k=d (preferably d is 1, 2 or 3; k is 3; n is 4, 5, or 6, preferably when M is B, n is 4);

each of $R^1$, $R^2$, and $R^3$ is independently H, optionally substituted $C_1$-$C_{40}$ alkyl (such as branched or linear alkyl), or optionally substituted $C_5$-$C_{50}$-aryl (alternately each of $R^1$, $R^2$, and $R^3$ is independently unsubstituted or substituted with at least one of halide, $C_5$-$C_{50}$ aryl, $C_6$-$C_{35}$ arylalkyl, $C_6$-$C_{35}$ alkylaryl and, in the case of the $C_5$-$C_{50}$-aryl, $C_1$-$C_{50}$ alkyl); wherein $R^1$, $R^2$, and $R^3$ together comprise 15 or more carbon atoms (such as 18 or more carbon atoms, such as 20 or more carbon atoms, such as 22 or more carbon atoms, such as 25 or more carbon atoms, such as 30 or more carbon atoms, such as 35 or more carbon atoms, such as 37 or more carbon atoms, such as 40 or more carbon atoms, such as 45 or more carbon atoms), preferably at least one of $R^1$, $R^2$, and $R^3$ is a $C_3$ to $C_{40}$ hydrocarbyl, (such as a $C_3$-$C_{40}$ alkyl, alternately such as a $C_7$ to $C_{40}$ alkyl);

M is an element selected from group 13 of the Periodic Table of the Elements, preferably B or Al, preferably B; and each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical, preferably a fluorinated aryl group, such fluoro-phenyl or fluoro-naphthyl, more preferably perfluorophenyl or perfluoronaphthyl.

In any embodiment of Formula (AT), each of $R^1$, $R^2$ and $R^3$ may independently be selected from:

1) optionally substituted linear alkyls (such as methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, n-icosyl, n-henicosyl, n-docosyl, n-tricosyl, n-tetracosyl, n-pentacosyl, n-hexacosyl, n-heptacosyl, n-octacosyl, n-nonacosyl, or n-tricontyl);

2) optionally substituted branched alkyls (such as alkyl-butyl, alkyl-pentyl, alkyl-hexyl, alkyl-heptyl, alkyl-octyl, alkyl-nonyl, alkyl-decyl, alkyl-undecyl, alkyl-dodecyl, alkyl-tridecyl, alkyl-butadecyl, alkyl-pentadecyl, alkyl-hexadecyl, alkyl-heptadecyl, alkyl-octadecyl, alkyl-nonadecyl, alkyl-icosyl (including multi-alkyl analogs, i.e, dialkyl-butyl, dialkyl-pentyl, dialkyl-hexyl, dialkyl-heptyl, dialkyl-octyl, dialkyl-nonyl, dialkyl-decyl, dialkyl-undecyl, dialkyl-dodecyl, dialkyl-tridecyl, dialkyl-butadecyl, dialkyl-pentadecyl, dialkyl-hexadecyl, dialkyl-heptadecyl, dialkyl-octadecyl, dialkyl-nonadecyl, dialkyl-icosyl, trialkyl-butyl, trialkyl-pentyl, trialkyl-hexyl, trialkyl-heptyl, trialkyl-octyl, trialkyl-nonyl, trialkyl-decyl, trialkyl-undecyl, trialkyl-dodecyl, trialkyl-tridecyl, trialkyl-butadecyl, trialkyl-pentadecyl, trialkyl-hexadecyl, trialkyl-heptadecyl, trialkyl-octadecyl, trialkyl-nonadecyl, and trialkyl-icosyl, etc.), and isomers thereof wherein each alkyl group is independently a $C_1$ to $C_{40}$, (alternately $C_2$ to $C_{30}$, alternately $C_3$ to $C_{20}$) linear, branched or cyclic alkyl group), preferably the alkyl group is methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetracosyl, pentacosyl, hexacosyl, heptacosyl, octacosyl, nonacosyl, or tricontyl);

3) optionally substituted arylalkyls, such as (methylphenyl, ethylphenyl, propylphenyl, butylphenyl, pentylphenyl, hexylphenyl, heptylphenyl, octylphenyl, nonylphenyl, decylphenyl, undecylphenyl, dodecylphenyl, tridecylphenyl, tetradecylphenyl, pentadecylphenyl, hexadecylphenyl, heptadecylphenyl, octadecylphenyl, nonadecylphenyl, icosylphenyl, henicosylphenyl, docosylphenyl, tricosylphenyl, tetracosylphenyl, pentacosylphenyl, hexacosylphenyl, heptacosylphenyl, octacosylphenyl, nonacosylphenyl, tricontylphenyl, 3,5,5-trimethylhexylphenyl, dioctylphenyl, 3,3,5-trimethylhexylphenyl, 2,2,3,3,4 pentamethypentylylphenyl, and the like);

4) optionally substituted silyl groups, such as a trialkylsilyl group, where each alkyl is independently an optionally substituted $C_1$ to $C_{20}$ alkyl (such as trimethylsilyl, triethylsilyl, tripropylsilyl, tributylsilyl, trihexylsilyl, triheptylsilyl, trioctylsilyl, trinonylsilyl, tridecylsilyl, triundecylsilyl, tridodecylsilyl, tritridecylsilyl, tri-tetradecylsilyl, tri-pentadecylsilyl, tri-hexadecylsilyl, tri-heptadecylsilyl, tri-octadecylsilyl, tri-nonadecylsilyl, tri-icosylsilyl);

5) optionally substituted alkoxy groups (such as —OR*, where R* is an optionally substituted $C_1$ to $C_{20}$ alkyl or aryl (such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, icosyl, phenyl, alkylphenyl (such as methyl phenyl, propyl phenyl, etc.), naphthyl, or anthracenyl);

6) halogens (such as Br or $C_1$); and 7) halogen containing groups (such as bromomethyl, bromophenyl, and the like).

For more information on activators represented by Formula (IA) that are useful herein please see US 2019-0330139 and US 2019-0330392, which are incorporated by reference herein. Useful activators include N-methyl-4-nonadecyl-N-octadecylanilinium tetrakis(perfluoronaphthalen-2-yl)borate, and N-methyl-4-nonadecyl-N-octadecylanilinium tetrakis(perfluorophenyl)borate.

Bulky activators are also useful herein as non-coordinating anion activators. "Bulky activator" as used herein refers to anionic activators represented by the formula:

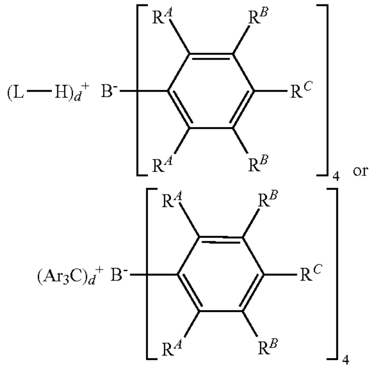

where:

each $R^A$ is independently a halide, such as a fluoride;

Ar is substituted or unsubstituted aryl group (such as a substituted or unsubstituted phenyl), such as substituted with $C_1$ to $C_{40}$ hydrocarbyls, such as $C_1$ to $C_{20}$ alkyls or aromatics;

each $R^B$ is independently a halide, a $C_6$ to $C_{20}$ substituted aromatic hydrocarbyl group or a siloxy group of the formula —O—Si—$R^D$, where $R^D$ is a $C_1$ to $C_{20}$ hydrocarbyl or hydrocarbylsilyl group (such as $R^B$ is a fluoride or a perfluorinated phenyl group);

each $R^C$ is a halide, $C_6$ to $C_{20}$ substituted aromatic hydrocarbyl group or a siloxy group of the formula —O—Si—$R^D$, where $R^D$ is a $C_1$ to $C_{20}$ hydrocarbyl or hydrocarbylsilyl group (such as $R^D$ is a fluoride or a $C_6$ perfluorinated aromatic hydrocarbyl group); where $R^B$ and $R^C$ can form one or more saturated or unsaturated, substituted or unsubstituted rings (such as $R^B$ and $R^C$ form a perfluorinated phenyl ring);

L is a Lewis base; $(L-H)^+$ is a Bronsted acid; d is 1, 2, or 3;

where the anion has a molecular weight of greater than 1,020 g/mol; and where at least three of the substituents on the B atom each have a molecular volume of greater than 250 cubic A, alternately greater than 300 cubic A, or alternately greater than 500 cubic A.

For example, $(Ar_3C)_d^+$ can be $(Ph_3C)_d^+$, where Ph is a substituted or unsubstituted phenyl, such as substituted with $C_1$ to $C_{40}$ hydrocarbyls or substituted $C_1$ to $C_{40}$ hydrocarbyls, such as $C_1$ to $C_{20}$ alkyls or aromatics or substituted $C_1$ to $C_{20}$ alkyls or aromatics.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," *Journal of Chemical Education*, v. 71(11), November 1994, pp. 962-964, which is incorporated by reference herein. Molecular volume (MV), in units of cubic A, is calculated using the formula: $MV=8.3V_S$, where $V_S$ is the scaled volume. $V_S$ is the sum of the relative volumes of the constituent atoms, and is calculated from the molecular formula of the substituent using the following table of relative volumes. For fused rings, the $V_S$ is decreased by 7.5% per fused ring.

| Element | Relative Volume |
|---|---|
| H | 1 |
| 1st short period, Li to F | 2 |
| 2nd short period, Na to Cl | 4 |
| 1st long period, K to Br | 5 |
| 2nd long period, Rb to I | 7.5 |
| 3rd long period, Cs to Bi | 9 |

For a list of suitable bulky activators please see U.S. Pat. No. 8,658,556, which is incorporated by reference herein.

In another embodiment, one or more of the NCA activators is chosen from the activators described in U.S. Pat. No. 6,211,105.

In at least one embodiment, the activator is selected from one or more of a triaryl carbenium (such as triphenylcarbenium tetraphenylborate, triphenylcarbenium tetrakis(pentafluorophenyl)borate, triphenylcarbenium tetrakis-(2,3,4,6-tetrafluorophenyl)borate, triphenylcarbenium tetrakis (perfluoronaphthyl)borate, triphenylcarbenium tetrakis (perfluorobiphenyl)borate, triphenylcarbenium tetrakis(3,5-bis(trifluoromethyl)phenyl)borate).

In another embodiment, the activator is selected from one or more of trialkylammonium tetrakis(pentafluorophenyl) borate, N,N-dialkylanilinium tetrakis(pentafluorophenyl) borate, dioctadecylmethylammonium tetrakis(perfluoronaphthyl)borate, N,N-dimethyl-(2,4,6-trimethylanilinium) tetrakis(pentafluorophenyl)borate, trialkylammonium tetrakis-(2,3,4,6-tetrafluorophenyl) borate, N,N-dialkylanilinium tetrakis-(2,3,4,6-tetrafluorophenyl)borate, trialkylammonium tetrakis(perfluoronaphthyl)borate, N,N-dialkylanilinium tetrakis(perfluoronaphthyl) borate, trialkylammonium tetrakis(perfluorobiphenyl) borate, N,N-dialkylanilinium tetrakis(perfluorobiphenyl) borate, trialkylammonium tetrakis(3,5-bis(trifluoromethyl) phenyl)borate, N,N-dialkylanilinium tetrakis(3,5-bis (trifluoromethyl)phenyl)borate, N,N-dialkyl-(2,4,6-trimethylanilinium) tetrakis(3,5-bis(trifluoromethyl)phenyl) borate, di-(i-propyl)ammonium tetrakis(pentafluorophenyl) borate, (where alkyl is methyl, ethyl, propyl, n-butyl, sec-butyl, or t-butyl).

Suitable activator-to-catalyst ratio, e.g., all NCA activators-to-catalyst ratio may be about a 1:1 molar ratio. Alternate ranges include from 0.1:1 to 100:1, alternately from 0.5:1 to 200:1, alternately from 1:1 to 500:1, alternately from 1:1 to 1000:1. A particularly useful range is from 0.5:1 to 10:1, such as 1:1 to 5:1.

It is also within the scope of the present disclosure that the catalyst compounds can be combined with combinations of alumoxanes and NCA's (see for example, U.S. Pat. Nos. 5,153,157; 5,453,410; EP 0 573 120 B1; WO 1994/007928; and WO 1995/014044 which discuss the use of an alumoxane in combination with an ionizing activator).

Useful chain transfer agents can be hydrogen, alkylalumoxanes, a compound represented by the formula $AlR_3$, $ZnR_2$ (where each R is, independently, a $C_1$-$C_8$ aliphatic radical, such as methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof.

Furthermore, a catalyst system of the present disclosure may include a metal hydrocarbenyl chain transfer agent represented by the formula:

$$Al(R')_{3-v}(R'')_v$$

where each R' can be independently a $C_1$-$C_{30}$ hydrocarbyl group, and/or each R", can be independently a $C_4$-$C_{20}$ hydrocarbenyl group having an end-vinyl group; and v can be from 1 to 3, such as 1 to 2, such as 2 to 3, such as 1, 2 or 3. For more information on metal hydrocarbenyl chain transfer agents please see U.S. Ser. No. 15/744,478, filed Jan. 12, 2018. Preferably, each R" is represented by the formula: $-(CH_2)nCH{=}CH_2$, where n is an integer from 2 to 18.

In any embodiment of the invention described herein, particularly useful AVTAs include, but are not limited to, isobutyl-di(oct-7-en-1-yl)-aluminum, isobutyl-di(dec-9-en-1-yl)-aluminum, isobutyl-di(non-8-en-1-yl)-aluminum, isobutyl-di(hept-6-en-1-yl)-aluminum, dimethyl(oct-7-en-1-yl)aluminum, diethyl(oct-7-en-1-yl)aluminum, dibutyl(oct-7-en-1-yl)aluminum, diisobutyl(oct-7-en-1-yl)aluminum, diisobutyl(non-8-en-1-yl)aluminum, diisobutyl(dec-8-en-1-yl)aluminum, diisobutyl(dodec-10-en-1-yl)aluminum, and the like. Mixtures of one or more AVTAs may also be used. In some embodiments of the invention, isobutyl-di(oct-7-en-1-yl)-aluminum, isobutyl-di(dec-9-en-1-yl)-aluminum, isobutyl-di(non-8-en-1-yl)-aluminum, isobutyl-di(hept-6-en-1-yl)-aluminum are preferred.

In embodiments of the invention, the activators described herein have a solubility of more than 10 mM (or more than 20 mM, or more than 50 mM) at 25° C. (stirred 2 hours) in methylcyclohexane and/or a solubility of more than 1 mM (or more than 10 mM, or more than 20 mM) at 25° C. (stirred 2 hours) in isohexane.

The present disclosure relates to a catalyst system comprising a metallocene transition metal compound and an activator compound represented by Formula (IA), to the use of such activator compounds for activating a transition metal compound in a catalyst system for polymerizing olefins, and to processes for polymerizing olefins, the process comprising contacting under polymerization conditions one or more olefins with a catalyst system comprising a metallocene transition metal compound and such activator compounds, where aromatic solvents, such as toluene, are absent (e.g. present at zero mol %, alternately present at less than 1 mol %, preferably the catalyst system, the polymerization reaction and/or the polymer produced are free of detectable aromatic hydrocarbon solvent, such as toluene.

The polymers (such as poly alpha-olefins) produced herein preferably contain 0 ppm (alternately less than 1 ppm, alternately less than 5 ppm, alternately less than 10 ppm) of aromatic hydrocarbon. Preferably, the polymers (such as polyalpha-olefins) produced herein contain 0 ppm (alternately less than 1 ppm, alternately less than 5 ppm, alternately less than 10 ppm) of toluene.

The catalyst systems used herein preferably contain 0 ppm (alternately less than 1 ppm, alternately less than 5 ppm, alternately less than 10 ppm) of aromatic hydrocarbon. Preferably, the catalyst systems used herein contain 0 ppm (alternately less than 1 ppm, alternately less than 5 ppm, alternately less than 10 ppm) of toluene.

Optional Scavengers or Coactivators

In addition to these activator compounds, scavengers or coactivators may be used. A scavenger is a compound that can be added to facilitate polymerization by scavenging impurities. Some scavengers may also act as activators and may be referred to as coactivators. A coactivator, that is not a scavenger, may also be used in conjunction with an activator in order to form an active catalyst. In at least one embodiment, a coactivator can be pre-mixed with the transition metal compound to form an alkylated transition metal compound. Aluminum alkyl or alumoxane compounds which may be utilized as scavengers or coactivators may include, for example, trimethylaluminum, triethylaluminum, triisobutylaluminum, tri-n-hexylaluminum, tri-n-octylaluminum, diisobutylaluminum hydride, methylalumoxane (MAO), modified methylalumoxane (MMAO), MMAO-3A, and diethyl zinc.

Optional Support Materials

In embodiments herein, the catalyst system may include an inert support material. The supported material can be a porous support material, for example, talc, and inorganic oxides. Other support materials include zeolites, clays, organoclays, or another organic or inorganic support material, or mixtures thereof.

The support material can be an inorganic oxide in a finely divided form. Suitable inorganic oxide materials for use in catalyst systems herein may include groups 2, 4, 13, and 14 metal oxides, such as silica, alumina, and mixtures thereof. Other inorganic oxides that may be employed either alone or in combination with the silica, or alumina can be magnesia, titania, zirconia. Other suitable support materials, however, can be employed, for example, finely divided functionalized polyolefins, such as finely divided polyethylene. Examples of suitable supports may include magnesia, titania, zirconia, montmorillonite, phyllosilicate, zeolites, talc, clays. Also, combinations of these support materials may be used, for example, silica-chromium, silica-alumina, silica-titania. In at least one embodiment, the support material is selected from $Al_2O_3$, $ZrO_2$, $SiO_2$, $SiO_2/Al_2O_3$, $SiO_2/TiO_2$, silica clay, silicon oxide/clay, or mixtures thereof.

The support material, such as an inorganic oxide, can have a surface area in the range of from about 10 $m^2/g$ to about 700 $m^2/g$, pore volume in the range of from about 0.1 $cm^3/g$ to about 4.0 $cm^3/g$ and average particle size in the range of from about 5 μm to about 500 μm. The surface area of the support material can be in the range of from about 50 $m^2/g$ to about 500 $m^2/g$, pore volume of from about 0.5 $cm^3/g$ to about 3.5 $cm^3/g$ and average particle size of from about 10 m to about 200 m. For example, the surface area of the support material is in the range is from about 100 $m^2/g$ to about 400 $m^2/g$, pore volume from about 0.8 $cm^3/g$ to about 3.0 $cm^3/g$ and average particle size is from about 5 μm to about 100 gm. The average pore size of the support material useful in the present disclosure is in the range of from 10 Å to 1000 Å, such as 50 Å to about 500 Å, and such as 75 Å to about 350 Å. In at least one embodiment, the support material is a high surface area, amorphous silica (surface area=300 $m^2/gm$; pore volume of 1.65 $cm^3/gm$). For example, suitable silicas can be the silicas marketed under the tradenames of DAVISON™ 952 or DAVISON™ 955 by the Davison Chemical Division of W. R. Grace and Company. In other embodiments, DAVISON™ 948 is used. Alternatively, a silica can be ES-70™ silica (PQ Corporation, Malvern, Pennsylvania) that has been calcined, for example (such as at 875° C.).

The support material should be dry, that is, free of absorbed water. Drying of the support material can be effected by heating or calcining at about 100° C. to about 1,000° C., such as at least about 600° C. When the support material is silica, it is heated to at least 200° C., such as about 200° C. to about 850° C., and such as at about 600° C.; and for a time of about 1 minute to about 100 hours, from about 12 hours to about 72 hours, or from about 24 hours to about 60 hours. The calcined support material must have at least some reactive hydroxyl (OH) groups to produce supported catalyst systems of the present disclosure. The calcined support material is then contacted with at least one polymerization catalyst comprising at least one catalyst compound and an activator.

The support material, having reactive surface groups, such as hydroxyl groups, is slurried in a non-polar solvent and the resulting slurry is contacted with a solution of a catalyst compound and an activator. In at least one embodiment, the slurry of the support material is first contacted with the activator for a period of time in the range of from about 0.5 hour to about 24 hours, from about 2 hours to about 16 hours, or from about 4 hours to about 8 hours. The solution of the catalyst compound is then contacted with the isolated support/activator. In at least one embodiment, the supported catalyst system is generated in situ. In alternate embodiment, the slurry of the support material is first contacted with the catalyst compound for a period of time in the range of from about 0.5 hour to about 24 hours, from about 2 hours to about 16 hours, or from about 4 hours to about 8 hours. The slurry of the supported catalyst compound is then contacted with the activator solution.

The mixture of the catalyst, activator and support is heated from about 0° C. to about 70° C., such as from about 23° C. to about 60° C., such as at room temperature. Contact times can be from about 0.5 hours to about 24 hours, such as from about 2 hours to about 16 hours, or from about 4 hours to about 8 hours.

Suitable non-polar solvents are materials in which all of the reactants used herein, e.g., the activator and the catalyst compound, are at least partially soluble and which are liquid at reaction temperatures. Non-polar solvents can be alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

Polymerization Processes

The present disclosure relates to polymerization processes where monomer (e.g., ethylene; propylene), and optionally comonomer, are contacted with a catalyst system comprising an activator, at least one catalyst compound, and optional support as described above. The catalyst compound and activator, and optional support may be combined in any order. The catalyst compound and activator, and or optional support may be combined prior to contacting with the monomer. Alternatively, the catalyst compound and activator may be introduced into the polymerization reactor separately, wherein they subsequently react to form the active catalyst.

Monomers include substituted or unsubstituted $C_2$ to $C_{40}$ alpha olefins, such as $C_2$ to $C_{20}$ alpha olefins, such as $C_2$ to $C_{12}$ alpha olefins, such as ethylene, propylene, butene, pentene, hexene, heptene, octene, nonene, decene, undecene, dodecene and isomers thereof. In at least one embodiment, the monomer includes ethylene and an optional comonomer comprising one or more $C_3$ to $C_{40}$ olefins, such as $C_4$ to $C_{20}$ olefins, such as $C_6$ to $C_{12}$ olefins. The $C_3$ to $C_{40}$ olefin monomers may be linear, branched, or cyclic. The $C_3$ to $C_{40}$ cyclic olefins may be strained or unstrained, monocyclic or polycyclic, and may optionally include heteroatoms and/or one or more functional groups. In another embodiment, the monomer includes propylene and an optional comonomer comprising one or more ethylene or $C_4$ to $C_{40}$ olefins, such as $C_4$ to $C_{20}$ olefins, such as $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and optional comonomers may include ethylene, propylene, butene, pentene, hexene, heptene, octene, nonene, decene, undecene, dodecene, norbornene, ethylidenenorbornene, vinylnorbomene, norbornadiene, dicyclopentadiene, cyclopentene, cycloheptene, cyclooctene, cyclooctadiene, cyclododecene, 7-oxanorbomene, 7-oxanorbornadiene, substituted derivatives thereof, and isomers thereof, such as hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbomene, norbornadiene, and their respective homologs and derivatives, such as norbomene, norbornadiene, and dicyclopentadiene.

Polymerization processes of the present disclosure can be carried out in any suitable manner. Any suitable suspension, homogeneous, bulk, solution, slurry, or gas phase polymerization process can be used. Such processes can be run in a batch, semi-batch, or continuous mode. Homogeneous polymerization processes, such as solution processes can be used. (A solution polymerization means a polymerization process in which the polymer is dissolved in a liquid polymerization medium, such as an inert solvent or monomer(s) or their blends. A homogeneous polymerization is one where the polymer product is dissolved in the polymerization medium. Suitable systems are typically not turbid as described in J. Vladimir Oliveira, C. Dariva and J. C. Pinto, *Ind. Eng. Chem. Res.,* 2000, v. 29, p. 4627). A bulk homogeneous process can be used (a bulk polymerization means a polymerization process in which the monomers and/or comonomers being polymerized are used as a solvent or diluent using little or no inert solvent as a solvent or diluent. A small fraction of inert solvent might be used as a carrier for catalyst and scavenger.) Typically, a bulk polymerization system contains less than 25 wt % of inert solvent or diluent, such as less than 10 wt %, such as less than 1 wt %, such as 0 wt %. In an embodiment, no solvent or diluent is present or added in the reaction medium, (except for the small amounts used as the carrier for the catalyst system or other additives, or amounts found with the monomer; e.g., propane in propylene).

In another embodiment, the process is a slurry process. As used herein, the term "slurry polymerization process" means a polymerization process performed in a hydrocarbon solvent where a supported catalyst is employed and monomers are polymerized on the supported catalyst particles at a temperature that is below the melting point of the polymer produced. At least 95 wt % of polymer products derived from the supported catalyst are in granular form as solid particles (not dissolved in the diluent).

Suitable diluents/solvents for polymerization may include non-coordinating, inert liquids. Examples of diluents/solvents for polymerization may include straight and branched-chain hydrocarbons, such as isobutane, butane, pentane, isopentane, hexanes, isohexane, heptane, octane, dodecane, and mixtures thereof, cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_4$ to $C_{10}$ alkanes, chlorobenzene, and aromatic and alkylsubstituted aromatic compounds, such as benzene, toluene, mesitylene, and xylene. Suitable solvents may also include liquid olefins which may act as monomers or comonomers including ethylene, propylene, 1-butene, 1-hexene, 1-pentene, 3-methyl-1-pentene, 4-methyl-1-pentene, 1-octene, 1-decene, and mixtures thereof. In at least one embodiment, aliphatic hydrocarbon solvents are used as the solvent, such as isobutane, butane, pentane, isopentane, hexanes, isohexane, heptane, octane, dodecane, and mixtures thereof, cyclic and alicyclic hydrocarbons, such as cyclohexane, cycloheptane, methylcyclohexane, methylcycloheptane, and mixtures thereof. In another embodiment, the solvent is not aromatic, such as aromatics are present in the solvent at less than 1 wt %, such as less than 0.5 wt %, such as less than 0 wt % based upon the weight of the solvents.

In at least one embodiment, the feed concentration of the monomers and comonomers for the polymerization is 60 vol % solvent or less, such as 40 vol % or less, such as 20 vol % or less, based on the total volume of the feed stream. In at least one embodiment, the polymerization is run in a bulk process.

Polymerizations can be run at any temperature and/or pressure suitable to obtain the desired polymers. Typical temperatures and/or pressures include a temperature in the range of from about 0° C. to about 300° C., such as about 20° C. to about 200° C., such as about 35° C. to about 160° C., such as from about 80° C. to about 160° C., such as from about 90° C. to about 140° C.; and at a pressure in the range of from about 0.35 MPa to about 25 MPa, such as from about 0.45 MPa to about 6 MPa, or from about 0.5 MPa to about 4 MPa.

In a suitable polymerization, the run time of the reaction can be up to 300 minutes, such as from about 5 minutes to 250 minutes, such as from about 10 minutes to 120 minutes, such as from about 20 minutes to 90 minutes, such as from about 30 minutes to 60 minutes. In a continuous process the run time may be the average residence time of the reactor.

In at least one embodiment, hydrogen is present in the polymerization reactor at a partial pressure of 0.001 psig to 50 psig (0.007 kPa to 345 kPa), such as from 0.01 psig to 25 psig (0.07 kPa to 172 kPa), such as from 0.1 psig to 10 psig (0.7 kPa to 70 kPa).

In at least one embodiment, little or no alumoxane is used in the process to produce the polymers. For example, alumoxane can be present at zero mol %, alternately the alumoxane can be present at a molar ratio of aluminum to transition metal less than 500:1, such as less than 300:1, such as less than 100:1, such as less than 1:1.

In at least one embodiment, the polymerization: 1) is conducted at temperatures of 0° C. to 300° C. (such as 25° C. to 250° C., such as 80° C. to 160° C., such as 100° C. to 140° C.); 2) is conducted at a pressure of atmospheric pressure to 10 MPa (such as 0.35 MPa to 10 MPa, such as from 0.45 MPa to 6 MPa, such as from 0.5 MPa to 4 MPa); 3) is conducted in an aliphatic hydrocarbon solvent (such as isobutane, butane, pentane, isopentane, hexanes, isohexane, heptane, octane, dodecane, and mixtures thereof, cyclic and alicyclic hydrocarbons, such as cyclohexane, cycloheptane, methylcyclohexane, methylcycloheptane, and mixtures thereof; such as where aromatics are present in the solvent at less than 1 wt %, such as less than 0.5 wt %, such as at 0 wt % based upon the weight of the solvents); 4) wherein the catalyst system used in the polymerization comprises less than 0.5 mol %, such as 0 mol % alumoxane, alternately the alumoxane is present at a molar ratio of aluminum to transition metal less than 500:1, such as less than 300:1, such as less than 100:1, such as less than 1:1; 5) the polymerization occurs in one reaction zone; 6) optionally scavengers (such as trialkyl aluminum compounds) are absent (e.g., present at zero mol %, alternately the scavenger is present at a molar ratio of scavenger metal to transition metal of less than 100:1, such as less than 50:1, such as less than 15:1, such as less than 10:1); and 7) optionally hydrogen is present in the polymerization reactor at a partial pressure of 0.001 psig to 50 psig (0.007 kPa to 345 kPa) (such as from 0.01 psig to 25 psig (0.07 kPa to 172 kPa), such as 0.1 psig to 10 psig (0.7 kPa to 70 kPa)). In at least one embodiment, the catalyst system used in the polymerization includes no more than one catalyst compound.

A "reaction zone" also referred to as a "polymerization zone" is a vessel where polymerization takes place, for example a stirred-tank reactor or a loop reactor. When multiple reactors are used in a continuous polymerization process, each reactor is considered as a separate polymerization zone. For a multi-stage polymerization in a batch polymerization, each polymerization stage is considered as a separate polymerization zone. In at least one embodiment, the polymerization occurs in one reaction zone. Room temperature is 23° C. unless otherwise noted.

In at least one embodiment, the present disclosure provides a process for the production of an ethylene based polymer comprising: polymerizing ethylene by contacting the ethylene with the catalyst system of the present disclosure described above in one or more continuous stirred tank reactors or loop reactors, in series or in parallel, at a reactor pressure of from 0.05 MPa to 1,500 MPa and a reactor temperature of from 30° C. to 230° C. to form an ethylene based polymer. In at least one embodiment, hydrogen is present in the polymerization reactor at a partial pressure of from about 5 psig to about 300 psig, such as from about 10 psig to about 250 psig, such as from about 30 psig to about 200 psig, such as from about 40 psig to about 150 psig, such as from about 50 psig to about 100 psig (e.g., 75 psig). In at least one embodiment, the activity of the catalyst is at least 1,000 gP·mmolcat$^{-1}$·h$^{-1}$, such as from about 1,000 gP·mmolcat$^{-1}$·h$^{-1}$ to 500,000 gP·mmolcat$^{-1}$·h$^{-1}$, such as from about 10,000 gP·mmolcat$^{-1}$·h$^{-1}$ to 250,000 gP·mmolcat$^{-1}$·h$^{-1}$, such as from about 20,000 gP·mmolcat$^{-1}$·h$^{-1}$ to 100,000 gP·mmolcat$^{-1}$·h$^{-1}$, alternately from about 500,000 gP·mmolcat$^{-1}$·h$^{-1}$ to 2,000,000 gP·mmolcat$^{-1}$·h$^{-1}$, such as from about 600,000 gP·mmolcat$^{-1}$·h$^{-1}$ to 1,500,000 gP·mmolcat$^{-1}$·h$^{-1}$, such as from about 800,000 gP·mmolcat$^{-1}$·h$^{-1}$ to 1,000,000 gP·mmolcat$^{-1}$·h$^{-1}$.

In another embodiment, the present disclosure provides a process for the production of propylene based polymer comprising: polymerizing propylene by contacting the propylene with the catalyst system of the present disclosure described above in one or more continuous stirred tank reactors or loop reactors, in series or in parallel, at a reactor pressure of from 0.05 MPa to 1,500 MPa and a reactor temperature of from 30° C. to 230° C. to form a propylene based polymer. In at least one embodiment, hydrogen is present in the polymerization reactor at a partial pressure from about 10 psig to about 300 psig, such as from about 20 psig to about 250 psig, such as from about 30 psig to about 200 psig, such as from about 40 psig to about 150 psig, such as from about 50 psig to about 100 psig (e.g., 75 psig). In at least one embodiment, the activity of the catalyst is at least 50 gP·mmolcat$^{-1}$·h$^{-1}$, such as from 50 gP·mmolcat$^{-1}$·h$^{-1}$ to about 500,000 gP·mmolcat$^{-1}$·h$^{-1}$, such as from 100 gP·mmolcat$^{-1}$·h$^{-1}$ to about 250,000 gP·mmolcat$^{-1}$·h$^{-1}$, such as from 150 gP·mmolcat$^{-1}$·h$^{-1}$ to about 150,000 gP·mmolcat$^{-1}$·h$^{-1}$, alternately from about 500,000 gP·mmolcat$^{-1}$·h$^{-1}$ to about 6,000,000 gP·mmolcat$^{-1}$·h$^{-1}$, such as from about 750,000 gP·mmolcat$^{-1}$·h$^{-1}$ to about 4,000,000 gP·mmolcat$^{-1}$·h$^{-1}$, such as from about 1,000,000 gP·mmolcat$^{-1}$·h$^{-1}$ to about 2,000,000 gP·mmolcat$^{-1}$11.

In another embodiment, the present disclosure provides a process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with a catalyst system described above in one or more continuous stirred tank reactors or loop reactors, in series or in parallel, at a reactor pressure of from 0.05 MPa to 1,500 MPa and a reactor temperature of from 30° C. to 230° C. to form an ethylene alpha-olefin copolymer. In at least one embodiment, hydrogen is present in the polymerization reactor at a partial pressure of from about 10 psig to about 300 psig, such as from about 20 psig to about 250 psig, such as from about 30 psig to about 200 psig, such as from about 40 psig to about 150 psig, such as from about 50 psig to about 100 psig (e.g., 75 psig), alternatively from about 150 psig to about 300 psig (e.g., 200 psig). In at least one embodiment, the activity of the catalyst is at least 500 gP·mmolcat$^{-1}$·h$^{-1}$, such as from about 500 gP·mmolcat$^{-1}$·h$^{-1}$ to about 5,000,000 gP·mmolcat$^{-1}$·h$^{-1}$, such as from about 10,000 gP·mmolcat$^{-1}$·h$^{-1}$ to about 2,500,000 gP·mmolcat$^{-1}$·h$^{-1}$, such as from about 20,000 gP·mmolcat$^{-1}$·h$^{-1}$ to about 1,000,000 gP·mmolcat$^{-1}$·h$^{-1}$, alternatively from about 5,000,000 gP·mmolcat$^{-1}$·h$^{-1}$ to about 8,000,000 gP·mmolcat$^{-1}$·h$^{-1}$.

In another embodiment, the present disclosure provides a process for the production of a propylene alpha-olefin copolymer comprising: polymerizing propylene and at least one ethylene and or at least one $C_4$-$C_{20}$ alpha-olefin by contacting the propylene and the at least one ethylene and or at least one $C_3$-$C_{20}$ alpha-olefin with a catalyst system described above in one or more continuous stirred tank reactors or loop reactors, in series or in parallel, at a reactor pressure of from 0.05 MPa to 1,500 MPa and a reactor temperature of from 30° C. to 230° C. to form an ethylene alpha-olefin copolymer. In at least one embodiment, hydrogen is present in the polymerization reactor at a partial pressure of from about 10 psig to about 300 psig, such as from about 20 psig to about 250 psig, such as from about 30 psig to about 200 psig, such as from about 40 psig to about 150 psig, such as from about 50 psig to about 100 psig (e.g., 75 psig), alternatively from about 150 psig to about 300 psig (e.g., 200 psig). In at least one embodiment, the activity of the catalyst is at least 500 $gP\cdot mmolcat^{-1}\cdot h^{-1}$, such as from about 500 $gP\cdot mmolcat^{-1}\cdot h^{-1}$ to about 5,000,000 $gP\cdot mmolcat^{-1}\cdot h^{-1}$, such as from about 10,000 $gP\cdot mmolcat^{-1}\cdot h^{-1}$ to about 2,500,000 $gP\cdot mmolcat^{-1}\cdot h^{-1}$, such as from about 20,000 $gP\cdot mmolcat^{-1}\cdot h^{-1}$ to about 1,000,000 $gP\cdot mmolcat^{-1}\cdot h^{-1}$, alternatively from about 5,000,000 $gP\cdot mmolcat^{-1}\cdot h^{-1}$ to about 8,000,000 $gP\cdot mmolcat^{-1}\cdot h^{-1}$.

In at least one embodiment, the conversion of olefin monomer is at least 10%, based upon polymer yield and the weight of the monomer entering the reaction zone, such as 20% or more, such as 30% or more, such as 50% or more, such as 80% or more.

In at least one embodiment, little or no alumoxane is used in the process to produce the polymers. For example, alumoxane is present at zero mol %, alternately the alumoxane is present at a molar ratio of aluminum to transition metal less than 500:1, such as less than 300:1, such as less than 100:1, such as less than 1:1.

In at least one embodiment, little or no scavenger is used in the process to produce the ethylene polymer. For example, scavenger (such as tri alkyl aluminum) is present at zero mol %, alternately the scavenger is present at a molar ratio of scavenger metal to transition metal of less than 100:1, such as less than 50:1, such as less than 15:1, such as less than 10:1.

Other additives may also be used in the polymerization, as desired, such as one or more scavengers, hydrogen, aluminum alkyls, or chain transfer agents (such as alkylalumoxanes, a compound represented by the formula $AlR_3$ or $ZnR_2$ (where each R is, independently, a $C_1$-$C_8$ aliphatic radical, such as methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof).

Solution Polymerization

In at least one embodiment, the polymerization process with catalyst compounds of the present disclosure is a solution polymerization process.

The solution polymerization is preferably a polymerization process in which at least 90 wt %, preferably at least 95 wt %, preferably at least 100 wt % (based upon the weight of the polymer) of the polymer product is dissolved in a liquid polymerization medium, such as an inert solvent or monomer(s) or their blends. Solution polymerization may involve polymerization in a continuous reactor in which the polymer formed, the starting monomer and catalyst materials supplied are agitated to reduce or avoid concentration gradients and in which the monomer acts as a diluent or solvent or in which a hydrocarbon is used as a diluent or solvent. Suitable processes can operate at temperatures from about 0° C. to about 250° C., such as from about 50° C. to about 170° C., such as from about 80° C. to about 150° C., such as from about 100° C. to about 140° C., and/or at pressures of about 0.1 MPa or more, such as 2 MPa or more. The upper pressure limit is not critically constrained but can be about 200 MPa or less, such as 120 MPa or less, such as 30 MPa or less. Temperature control in the reactor can generally be obtained by balancing the heat of polymerization and with reactor cooling by reactor jackets or cooling coils to cool the contents of the reactor, auto refrigeration, pre-chilled feeds, vaporization of liquid medium (diluent, monomers or solvent) or combinations of all three. Adiabatic reactors with pre-chilled feeds can also be used. The purity, type, and amount of solvent can be optimized for the maximum catalyst productivity for a particular type of polymerization. The solvent can be also introduced as a catalyst carrier. The solvent can be introduced as a gas phase or as a liquid phase depending on the pressure and temperature. Advantageously, the solvent can be kept in the liquid phase and introduced as a liquid. Solvent can be introduced in the feed to the polymerization reactors.

A process described herein can be a solution polymerization process that may be performed in a batchwise fashion (e.g., batch; semi-batch) or in a continuous process. Suitable reactors may include tank, loop, and tube designs. In at least one embodiment, the process is performed in a continuous fashion and dual loop reactors in a series configuration are used. In at least one embodiment, the process is performed in a continuous fashion and dual continuous stirred-tank reactors (CSTRs) in a series configuration are used. Furthermore, the process can be performed in a continuous fashion and a tube reactor can be used. In another embodiment, the process is performed in a continuous fashion and one loop reactor and one CSTR are used in a series configuration. The process can also be performed in a batchwise fashion and a single stirred tank reactor can be used.

Polyolefin Products

The present disclosure relates to compositions of matter produced by the methods described herein.

In at least one embodiment, a process described herein produces $C_2$ to $C_{20}$ olefin homopolymers (e.g., polyethylene; polypropylene), or $C_2$ to $C_{20}$ olefin copolymers (e.g., ethylene-octene, ethylene-propylene) and/or propylene-alpha-olefin copolymers, such as $C_3$ to $C_{20}$ copolymers (such as propylene-hexene copolymers or propylene-octene copolymers). In at least one embodiment, a process described herein produces $C_3$ to $C_{20}$ isotactic olefin homopolymers, such as isotactic polypropylene, such as highly isotactic polypropylene.

The term "isotactic" is defined as having at least 20% or more isotactic pentads according to analysis by $^{13}C$ NMR. The term "highly isotactic" is defined as having 50% or more isotactic pentads according to analysis by $^{13}C$ NMR. Polypropylene microstructure is determined by $^{13}C$-NMR spectroscopy, including the concentration of isotactic and syndiotactic diads ([m] and [r]), triads ([mm] and [rr]), and pentads ([mmmm] and [rrrr]). The designation "m" or "r" describes the stereochemistry of pairs of contiguous propylene groups, "m" referring to meso and "r" to racemic. Samples are dissolved in $d_2$-1,1,2,2-tetrachloroethane, and spectra recorded at 125° C. using a 100 MHz (or higher) NMR spectrometer. Polymer resonance peaks are referenced to mmmm=21.8 ppm. Calculations involved in the characterization of polymers by NMR are described by F. A. Bovey in POLYMER CONFORMATION AND CONFIGURATION (Academic Press, New York 1969) and J. Randall in POLYMER SEQUENCE DETERMINATION, $^{13}C$-NMR METHOD (Academic Press, New York, 1977).

In at least one embodiment, an ethylene or propylene based polymer (homopolymer) has one or more of: an Mw value of 500 g/mol or greater, such as from about 500 g/mol to about 3,000,000 g/mol, such as from about 25,000 g/mol to about 2,000,000 g/mol, alternately from about 3,000,000 g/mol to about 10,000,000 g/mol, such as from about 5,000,000 g/mol to about 7,500,000 g/mol; an Mn value of 500 g/mol or greater, such as from about 500 g/mol to about 2,000,000 g/mol, such as from about 100,000 g/mol to about 1,200,000 g/mol, alternately from about 2,000,000 g/mol to about 10,000,000 g/mol, such as from about 5,000,000 g/mol to about 7,500,000 g/mol; an Mz value of 500 g/mol or greater, such as from about 500 g/mol to about 10,000,000 g/mol, such as from about 100,000 to about 6,000,000 g/mol, alternately from about 10,000,000 g/mol to about 25,000,000 g/mol.

In at least one embodiment, the ethylene or propylene based polymer has an Mw/Mn (PDI) value of from 1 to 20, such as from 5 to 20, such as from 10 to 20, alternatively from 1 to 5, such as from 1.5 to about 3.

In at least one embodiment, the ethylene or propylene based polymer has a melting point (Tm) of at least 50° C., such as from about 50° C. to about 150° C., such as from about 100° C. to about 140° C., such as from about 120° C. to about 140° C., such as from about 130° C. to about 140° C.

For purpose of this invention and the claims thereto, unless otherwise indicated (e.g., use of Rapid DSC in the Example section below) the melting point (or melting temperature, $T_m$) of a polymer is determined using Differential Scanning Calorimetry (DSC) on a commercially available instrument (e.g., TA Instruments 2920 DSC). 6 to 10 mg of polymer are sealed in an aluminum pan and loaded into the instrument at room temperature. Melting data (first heat) is acquired by heating the sample to at least 30° C. above its melting temperature, typically 220° C. for polypropylene, at a heating rate of 10° C./min. The sample is held for at least 5 minutes at this temperature to destroy its thermal history. Crystallization data are acquired by cooling the sample from the melt to at least 50° C. below the crystallization temperature, typically −50° C. for polypropylene, at a cooling rate of 20° C./min. The sample is held at this temperature for at least 5 minutes, and finally heated at 10° C./min to acquire additional melting data (second heat). The endothermic melting transition (first and second heat) and exothermic crystallization transition are analyzed according to standard procedures. The melting temperatures reported are the peak melting temperatures from the second heat unless otherwise specified. For polymers displaying multiple peaks, the melting temperature is defined to be the peak melting temperature from the melting trace associated with the largest endothermic calorimetric response (as opposed to the peak occurring at the highest temperature).

In at least one embodiment, an ethylene or propylene based polymer is an ethylene alpha-olefin copolymer or propylene alpha-olefin copolymer having one or more of an Mw value of 5,000 g/mol or greater, such as from about 1,000 g/mol to about 3,000,000 g/mol, such as from about 1.00 g/mol to about 500,000 g/mol, such as from about 6,000 g/mol to about 250,000 g/mol, such as from about 7,000 g/mol to about 100,000 g/mol, such as from about 8,000 g/mol to about 50,000 g/mol, alternatively from about 500,000 g/mol to about 3,000,000 g/mol, such as from about 750,000 g/mol to about 2,750,000 g/mol, such as from about 1,000,000 g/mol to about 2,500,000 g/mol, such as from about 1,500,000 g/mol to about 2,000,000 g/mol; an Mn value of 1,000 g/mol or greater, such as from about 1,000 g/mol to about 1,500,000 g/mol, such as from about 1,000 g/mol to about 300,000 g/mol, such as from about 2,500 g/mol to about 200,000 g/mol, such as from about 4,000 g/mol to about 50,000 g/mol, alternatively from about 300,000 g/mol to 2,000,000 g/mol, such as from about 200,000 g/mol to about 1,750,000, such as from about 300,000 g/mol to about 1,500,000 g/mol, such as from about 400,000 g/mol to about 1,250,000 g/mol; an Mz value of 1,000 g/mol or greater, such as from about 1,000 g/mol to about 5,000,000 g/mol, such as from about 1,000 g/mol to about 100,000 g/mol, such as from about 2,500 g/mol to about 75,000 g/mol, such as from about 5,000 g/mol to about 50,000 g/mol, alternatively from about 100,000 g/mol to about 10,000,000 g/mol, such as from about 200,000 g/mol to about 7,500,000 g/mol, such as from about 300,000 g/mol to about 5,000,000 g/mol.

In at least one embodiment, the ethylene alpha-olefin copolymer or propylene alpha-olefin copolymer has a comonomer content of from 0.1 wt % to 50 wt %, such as from 1 wt % to 10 wt %, such as from 5 wt % to 25 wt %, such as from 15 wt % to 35 wt %, such as from 25 wt % to 50 wt %.

In at least one embodiment, the ethylene alpha-olefin copolymer or propylene alpha-olefin copolymer has an Mw/Mn (PDI) value of from 1 to 5, such as from 1 to 4, such as from 1 to 3.

In at least one embodiment, the ethylene alpha-olefin copolymer or propylene alpha-olefin copolymer has a melting point (Tm) of at least 100° C., such as from about 100° C. to about 140° C., such as from about 105° C. to about 130° C., such as from about 115° C. to about 125° C.

Accordingly, the present disclosure can provide highly active catalysts capable of operating at high reactor temperatures while producing polymers with substantially high molecular weights.

Gel Permeation Chromatograph (GPC 4-D)

For purposes of the claims, and unless otherwise indicated, the distribution and the moments of molecular weight (Mw, Mn, Mz, Mw/Mn, etc.), the comonomer content, and the branching index (g') are determined by using a high temperature Gel Permeation Chromatography (Polymer Char GPC-IR) equipped with a multiple-channel band-filter based Infrared detector IR5 with a multiple-channel band filter based infrared detector ensemble IR5 with band region covering from about 2,700 $cm^{-1}$ to about 3,000 $cm^{-1}$ (representing saturated C—H stretching vibration), an 18-angle light scattering detector and a viscometer. Three Agilent PLgel 10-μm Mixed-B LS columns are used to provide polymer separation. Reagent grade 1,2,4-trichlorobenzene (TCB) (from Sigma-Aldrich) comprising ~300 ppm antioxidant BHT can be used as the mobile phase at a nominal flow rate of ~1.0 mL/min and a nominal injection volume of ~200 μL. The whole system including transfer lines, columns, and detectors can be contained in an oven maintained at ~145° C. A given amount of sample can be weighed and sealed in a standard vial with ~10 μL flow marker (heptane) added thereto. After loading the vial in the auto-sampler, the oligomer or polymer may automatically be dissolved in the instrument with ~8 mL added TCB solvent at ~160° C. with continuous shaking. The sample solution concentration can be from ~0.2 mg/ml to ~2.0 mg/ml, with lower concentrations used for higher molecular weight samples. The concentration, c, at each point in the chromatogram can be calculated from the baseline-subtracted IR5 broadband signal, I, using the equation: c=αI, where α is the mass constant determined with polyethylene or polypropylene standards. The mass recovery can be calculated from the ratio of the integrated area of the concentration chromatography over elution volume and the injection mass which is equal to the predetermined concentration multiplied by injection loop volume. The conventional molecular weight (IR MW) is determined by combining universal calibration relationship with the column calibration which is performed with a series of monodispersed polystyrene (PS) standards ranging from 700 to 10M gm/mole. The MW at each elution volume is calculated with following equation:

$$\log M = \frac{\log(K_{PS}/K)}{\alpha+1} + \frac{\alpha_{PS}+1}{\alpha+1}\log M_{PS}$$

where the variables with subscript "PS" stand for polystyrene while those without a subscript are for the test samples. In this method, $\alpha_{PS}$=0.67 and $K_{PS}$=0.000175, α and K for other materials are as calculated in published literature (see for example, Sun, T. et al. *Macromolecules* 2001, v. 34, pg. 6812), except that for purposes of this invention and claims thereto, α=0.695+(0.01*(wt. fraction propylene)) and K=0.000579−(0.0003502*(wt. fraction propylene)) for ethylene-propylene copolymers and ethylene-propylene-diene terpolymers, α=0.705 and K=0.0002288 for linear propylene polymers, α=0.695 and K=0.000181 for linear butene polymers, α is 0.695 and K is 0.000579*(1−0.0087*w2b+0.000018*(w2b)^) for ethylene-butene copolymer where w2b is a bulk weight percent of butene comonomer, α is 0.695 and K is 0.000579*(1-0.0075*w2b) for ethylene-hexene copolymer where w2b is a bulk weight percent of hexene comonomer, α is 0.695 and K is 0.000579*(1-0.0077*w2b) for ethylene-octene copolymer where w2b is a bulk weight percent of octene comonomer, and α=0.695 and K=0.000579 for all other linear ethylene polymers. Concentrations are expressed in g/$cm^3$, molecular weight is expressed in g/mole, and intrinsic viscosity (hence K in the Mark-Houwink equation) is expressed in dL/g unless otherwise noted.

The comonomer composition is determined by the ratio of the IR5 detector intensity corresponding to $CH_2$ and $CH_3$ channel calibrated with a series of PE and PP homo/copolymer standards whose nominal value are predetermined by NMR or FTIR. In particular, this provides the methyls per 1,000 total carbons ($CH_3$/1000TC) as a function of molecular weight. The short-chain branch (SCB) content per 1,000TC (SCB/1000TC) is then computed as a function of molecular weight by applying a chain-end correction to the $CH_3$/1000TC function, assuming each chain to be linear and terminated by a methyl group at each end. The weight % comonomer is then obtained from the following expression in which f is 0.3, 0.4, 0.6, 0.8, and so on for $C_3$, $C_4$, $C_6$, $C_8$, and so on co-monomers, respectively:

$$w2 = f * SCB/1000TC.$$

The bulk composition of the polymer from the GPC-IR and GPC-4D analyses is obtained by considering the entire signals of the $CH_3$ and $CH_2$ channels between the integration limits of the concentration chromatogram. First, the following ratio is obtained:

$$\text{Bulk } IR \text{ ratio} = \frac{\text{Area of } CH_3 \text{ signal within integration limits}}{\text{Area of } CH_2 \text{ signal within integration limits}}.$$

Then the same calibration of the $CH_3$ and $CH_2$ signal ratio, as mentioned previously in obtaining the $CH_3$/1000TC as a function of molecular weight, is applied to obtain the bulk $CH_3$/1000TC. A bulk methyl chain ends per 1,000TC (bulk $CH_3$ end/1000TC) is obtained by weight-averaging the chain-end correction over the molecular-weight range. Then, $$w2b = f * \text{bulk CH3}/1000TC$$

$$\text{bulk } SCB/1000TC = \text{bulk CH3}/1000TC - \text{bulk CH3end}/1000TC$$

and bulk SCB/1000TC is converted to bulk w2 in the same manner as described above.

The LS detector is the 18-angle Wyatt Technology High Temperature DAWN HELEOSII. The LS molecular weight (M) at each point in the chromatogram is determined by analyzing the LS output using the Zimm model for static light scattering (*Light Scattering from Polymer Solutions*; Huglin, M. B., Ed.; Academic Press, 1972.):

$$\frac{K_o c}{\Delta R(\theta)} = \frac{1}{MP(\theta)} + 2A_2 c.$$

Here, ΔR(θ) is the measured excess Rayleigh scattering intensity at scattering angle θ, c is the polymer concentration determined from the IR5 analysis, $A_2$ is the second virial coefficient, P(θ) is the form factor for a monodisperse random coil, and $K_O$ is the optical constant for the system:

$$K_o = \frac{4\pi^2 n^2 (dn/\mathrm{dc})^2}{\lambda^4 N_A}$$

where $N_A$ is Avogadro's number, and (dn/dc) is the refractive index increment for the system. The refractive index, n=1.500 for TCB at 145° C. and λ=665 nm. For analyzing polyethylene homopolymers, ethylene-hexene copolymers, and ethylene-octene copolymers, dn/dc=0.1048 ml/mg and $A_2$=0.0015; for analyzing ethylene-butene copolymers, dn/dc=0.1048*(1-0.00126*w2) ml/mg and $A_2$=0.0015 where w2 is weight percent butene comonomer.

A high temperature Agilent (or Viscotek Corporation) viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $-\eta_S$, for the solution flowing through the viscometer is calculated from their outputs. The intrinsic viscosity, [η], at each point in the chromatogram is calculated from the equation $[\eta]=\eta_S/c$, where c is concentration and is determined from the IR5 broadband channel output. The viscosity MW at each point is calculated as $M=K_{PS}M^{+PS+1}/[\eta]$, where $\alpha_{ps}$ is 0.67 and $K_{ps}$ is 0.000175.

The branching index ($g'_{vis}$) is calculated using the output of the GPC-IR5-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index $g'_{vis}$ is defined as $$g'_{vis} = \frac{[\eta]_{avg}}{KM_v^{\alpha}},$$

where $M_V$ is the viscosity-average molecular weight based on molecular weights determined by LS analysis and the K and a are for the reference linear polymer, which are, for purposes of this invention and claims thereto, α=0.700 and K=0.0003931 for ethylene, propylene, diene monomer copolymers, α=0.705 and K=0.0002288 for linear propylene polymers, α=0.695 and K=0.000181 for linear butene polymers, α is 0.695 and K is 0.000579*(1−0.0087*w2b+0.000018*(w2b)^) for ethylene-butene copolymer where w2b is a bulk weight percent of butene comonomer, a is 0.695 and K is 0.000579*(1-0.0075*w2b) for ethylene-hexene copolymer where w2b is a bulk weight percent of hexene comonomer, a is 0.695 and K is 0.000579*(1-0.0077*w2b) for ethylene-octene copolymer where w2b is a bulk weight percent of octene comonomer, and α=0.695 and K=0.000579 for all other linear ethylene polymers. Concentrations are expressed in g/cm$^3$, molecular weight is expressed in g/mole, and intrinsic viscosity (hence K in the Mark-Houwink equation) is expressed in dL/g unless otherwise noted. Calculation of the w2b values is as discussed above. α and K for other linear materials are as calculated in the published literature (see, for example, Sun, T. et al. *Macromolecules* 2001, v. 34, pg. 6812).

Blends

In another embodiment, the polymer (such as the polyethylene or polypropylene) produced herein is combined with one or more additional polymers prior to being formed into a film, molded part or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

In at least one embodiment, the polymer (such as the polyethylene or polypropylene) is present in the above blends, at from 10 wt % to 99 wt %, based upon the weight of the polymers in the blend, such as 20 wt % to 95 wt %, such as at least 30 wt % to 90 wt %, such as at least 40 wt % to 90 wt %, such as at least 50 wt % to 90 wt %, such as at least 60 wt % to 90 wt %, such as at least 70 to 90 wt %.

The blends described above may be produced by mixing the polymers of the present disclosure with one or more polymers (as described above), by connecting reactors together in series to make reactor blends or by using more than one catalyst in the same reactor to produce multiple species of polymer. The polymers can be mixed together prior to being put into the extruder or may be mixed in an extruder.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc.

Films

Any of the foregoing polymers, such as the foregoing polypropylenes or blends thereof, may be used in a variety of end-use applications. Such applications include, for example, mono- or multi-layer blown, extruded, and/or shrink films. These films may be formed by any number of well-known extrusion or coextrusion techniques, such as a blown bubble film processing technique, wherein the composition can be extruded in a molten state through an annular die and then expanded to form a uni-axial or biaxial orientation melt prior to being cooled to form a tubular, blown film, which can then be axially slit and unfolded to form a flat film. Films may be subsequently unoriented, uniaxially oriented, or biaxially oriented to the same or different extents. One or more of the layers of the film may be oriented in the transverse and/or longitudinal directions to the same or different extents. The uniaxially orientation can be accomplished using typical cold drawing or hot drawing methods. Biaxial orientation can be accomplished using tenter frame equipment or a double bubble processes and may occur before or after the individual layers are brought together. For example, a polyethylene layer can be extrusion coated or laminated onto an oriented polypropylene layer or the polyethylene and polypropylene can be coextruded together into a film then oriented. Likewise, oriented polypropylene could be laminated to oriented polyethylene or oriented polyethylene could be coated onto polypropylene then optionally the combination could be oriented even further. For example, the films can be oriented in the Machine Direction (MD) at a ratio of up to 15, such as from about 5 to about 7, and in the Transverse Direction (TD) at a ratio of up to 15, such as from about 7 to about 9. However, in another embodiment the film is oriented to the same extent in both the MD and TD directions.

The films may vary in thickness depending on the intended application; however, films of a thickness from 1 μm to 50 μm can be suitable. Films intended for packaging can be from 10 μm to 50 μm thick. The thickness of the sealing layer can be from 0.2 μm to 50 μm. There may be a sealing layer on both the inner and outer surfaces of the film or the sealing layer may be present on only the inner or the outer surface.

In another embodiment, one or more layers may be modified by corona treatment, electron beam irradiation, gamma irradiation, flame treatment, or microwave. In at least one embodiment, one or both of the surface layers is modified by corona treatment.

Waxes

Polyolefin waxes, such as polyethylene waxes, having low molecular weight of about 250 g/mol to about 5,000 g/mol, for example, can be prepared in a solution polymerization process using the bis(heterocyclic-olate) Lewis base catalysts. The production of polyolefin waxes may be performed at a temperature of from about 50° C. to about 220° C., such as from about 100° C. to about 200° C., such as from about 120° C. to about 160° C. The production of polyolefin waxes may be performed at a reactor pressure of from about 0.5 MPa to about 25 MPa, such as from about 0.7 MPa to about 6 MPa. The production of polyolefin waxes may be performed in the presence of added hydrogen at a partial pressure of from 0 psig to about 100 psig, such as from 0 psig to about 40 psig, such as 0 psig.

Aspects Listing

The present disclosure provides, among others, the following aspects, each of which may be considered as optionally including any alternate aspects.

Clause 1. A catalyst compound represented by Formula (I):

(I)

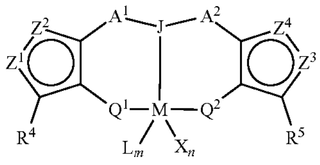

wherein:

M is a group 3, 4, or 5 metal;

each $A^1$ and $A^2$ is independently an aromatic, substituted aromatic, or alkenediyl group;

heterocyclic ring fragments —($Z^1Z^2$)— and —($Z^3Z^4$)— are independently selected from —($Z^5Z^6$)— or —($Z^6Z^5$)—, with $Z^5$ being selected from oxygen, sulfur, S(O), $S(O)_2$, and $N(R^{50})$, and $Z^6$ being selected from nitrogen and $C(R^{51})$, wherein each $R^{50}$ and $R^{51}$ is independently hydrogen, $C_1$-$C_{40}$ hydrocarbyl, $C_1$-$C_{40}$ substituted hydrocarbyl, a monovalent heteroatom, or a heteroatom-bonded monovalent group;

each of $R^4$ and $R^5$ is independently hydrogen, $C_1$-$C_{40}$ hydrocarbyl, $C_1$-$C_{40}$ substituted hydrocarbyl, a monovalent heteroatom, or a heteroatom-bonded monovalent group;

J is a heterocyclic Lewis base;

each $Q^1$ and $Q^2$ are independently selected from oxygen, sulfur, $N(R^{30})$, or $P(R^{30})$ wherein $R^{30}$ is $C_1$-$C_{40}$ hydrocarbyl, substituted $C_1$-$C_{40}$ hydrocarbyl, a monovalent heteroatom, or a heteroatom-bonded monovalent group;

L is a Lewis base;

X is an anionic ligand;

n is 1, 2 or 3;

m is 0, 1, or 2;

n+m is not greater than 4;

any two L groups may be joined together to form a bidentate Lewis base;

an X group may be joined to an L group to form a monoanionic bidentate group; and any two X groups may be joined together to form a dianionic ligand.

Clause 2. The catalyst compound of clause 1, wherein Al is represented by the formula:

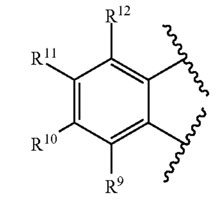

wherein indicates a connection to the catalyst compound, and each of $R^9$, $R^{10}$, $R^{11}$, and $R^{12}$ is independently hydrogen, $C_1$-$C_{40}$ hydrocarbyl, $C_1$-$C_{40}$ substituted hydrocarbyl, a monovalent heteroatom, or a heteroatom-bonded monovalent group, or one or more of $R^9$ and $R^{10}$, $R^{10}$ and $R^{11}$, or $R^{11}$ and $R^{12}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms.

Clause 3. The catalyst compound of clause 1, wherein $A^2$ is represented by the formula:

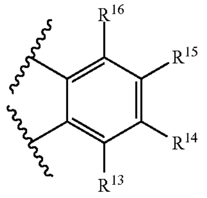

wherein indicates a connection to the catalyst compound, and each of $R^{13}$, $R^{14}$, $R^{15}$, and $R^{16}$ is independently hydrogen, $C_1$-$C_{40}$ hydrocarbyl, $C_1$-$C_{40}$ substituted hydrocarbyl, a monovalent heteroatom, or a heteroatom-bonded monovalent group, or one or more of $R^{13}$ and $R^{14}$, $R^{14}$ and $R^{15}$, or $R^{15}$ and $R^{16}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms.

Clause 4. The catalyst compound of clause 1, wherein the compound features a tridentate dianionic ligand that is coordinated to the metal to form a pair of 8-membered metallocycle rings.

Clause 5. The catalyst compound of clause 1, wherein J is a group 15-containing heterocycle, or a group 16-containing heterocycle.

Clause 6. The catalyst compound of clause 1, wherein J is a nitrogen-containing heterocycle, an oxygen-containing heterocycle, a phosphorus-containing heterocycle, or a sulfur-containing heterocycle.

Clause 7. The catalyst compound of any of clauses 1 to 6, wherein J is selected from a pyridine, a pyrimidine, a pyrazine, a thiazole, an oxazole, an oxazoline, an imidazole, a furan, or a thiofuran.

Clause 8. The catalyst compound of any of clauses 1 to 6, wherein J is represented by the formula:

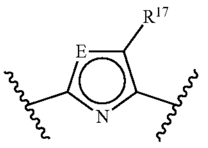

or

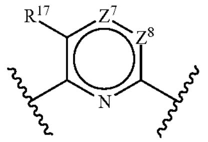

wherein ⌇ indicates a connection to the catalyst compound; E is oxygen, sulfur, or $NR^{17}$; $Z^7$ is selected from nitrogen and $C(R^{18})$; $Z^8$ is selected from nitrogen and $C(R^{19})$; and each of $R^{17}$ and $R^{18}$ and $R^{19}$ are selected from hydrogen, $C_1$-$C_{40}$ hydrocarbyl, $C_1$-$C_{40}$ substituted hydrocarbyl, a monovalent heteroatom, or a heteroatom-bonded monovalent group.

Clause 9. The catalyst compound of clause 1, wherein the catalyst compound represented by Formula (I) is represented by Formula (II) or Formula (III):

(II)

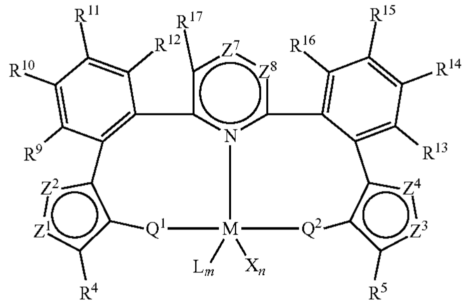

(III)

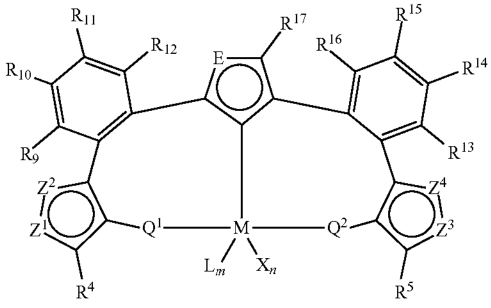

wherein:

each $Q^1$ and $Q^2$ are independently selected from oxygen, sulfur, $N(R^{30})$, or $P(R^{30})$ wherein $R^{30}$ is $C_1$-$C_{40}$ hydrocarbyl, substituted $C_1$-$C_{40}$ hydrocarbyl, a monovalent heteroatom, or a heteroatom-bonded monovalent group;

heterocyclic ring fragments —$(Z^1Z^2)$— and —$(Z^3Z^4)$— are selected from —$(Z^5Z^6)$— or —$(Z^6Z^5)$—, with $Z^5$ being selected from oxygen, sulfur, S(O), $S(O)_2$, and $N(R^{50})$, and $Z^6$ being selected from nitrogen and $C(R^{51})$, wherein each $R^{50}$ and $R^{51}$ is independently hydrogen, $C_1$-$C_{40}$ hydrocarbyl, $C_1$-$C_{40}$ substituted hydrocarbyl, a monovalent heteroatom, or a heteroatom-bonded monovalent group;

$Z^7$ is selected from nitrogen and $C(R^{18})$;

$Z^8$ is selected from nitrogen and $C(R^{19})$;

E is oxygen, sulfur, or $N(R^{20}$ each of $R^4$ and $R^5$ is independently hydrogen, $C_1$-$C_{40}$ hydrocarbyl, $C_1$-$C_{40}$ substituted hydrocarbyl, a monovalent heteroatom, or a heteroatom-bonded monovalent group;

each of $R^9$, $R^{10}$, $R^{11}$, and $R^{12}$ is independently hydrogen, $C_1$-$C_{40}$ hydrocarbyl, $C_1$-$C_{40}$ substituted hydrocarbyl, a monovalent heteroatom, or a heteroatom-bonded monovalent group, or one or more of $R^9$ and $R^{10}$, $R^{10}$ and $R^{11}$, or $R^{11}$ and $R^{12}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms;

each of $R^{13}$, $R^{14}$, $R^{15}$, and $R^{16}$ is independently hydrogen, $C_1$-$C_{40}$ hydrocarbyl, $C_1$-$C_{40}$ substituted hydrocarbyl, a monovalent heteroatom, or a heteroatom-bonded monovalent group, or one or more of $R^{13}$ and $R^{14}$, $R^{14}$ and $R^{15}$, or $R^{15}$ and $R^{16}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms;

each of $R^{17}$, $R^{18}$, $R^{19}$ and $R^{20}$ is hydrogen, $C_1$-$C_{40}$ hydrocarbyl, $C_1$-$C_{40}$ substituted hydrocarbyl, a monovalent heteroatom, or a heteroatom-bonded monovalent group, or one or more of $R^{17}$ and $R^{18}$, $R^{18}$ and $R^{19}$ may be joined together to form one or more substituted hydrocarbyl rings, unsubstituted hydrocarbyl rings, substituted heterocyclic rings, or unsubstituted heterocyclic rings each having 5, 6, 7, or 8 ring atoms;

M is a group 3, 4, or 5 metal;

L is a Lewis base;

X is an anionic ligand;

n is 1, 2 or 3;

m is 0, 1, or 2;

n+m is not greater than 4;

any two L groups may be joined together to form a bidentate Lewis base;

an X group may be joined to an L group to form a monoanionic bidentate group; and any two X groups may be joined together to form a dianionic ligand.

Clause 10. The catalyst compound of clause 9, wherein M is zirconium or hafnium.

Clause 11. The catalyst compound of clause 10, wherein $R^9$ through $R^{17}$ are hydrogen.

Clause 12. The catalyst compound of clause 11, wherein $R^4$ and $R^5$ are each selected from $C_1$-$C_{40}$ hydrocarbyl, $C_1$-$C_{40}$ substituted hydrocarbyl, or a heteroatom-bonded monovalent group containing up to 40 atoms.

Clause 13. The catalyst compound of clause 12, wherein —$(Z^1Z^2)$— and —$(Z^3Z^4)$— are selected from —$(Z^5Z^6)$— or —$(Z^6Z^5)$—, with $Z^5$ being oxygen or sulfur.

Clause 14. The catalyst compound of clause 13, wherein $R^4$ and $R^5$ are each selected from $C_4$-$C_{40}$ cyclic tertiary hydrocarbyl groups.

Clause 15. The catalyst compound (II) of clause 9, wherein $Z^7$ is $C(R^{18})$, wherein $R^{18}$ is selected from hydrogen, trifluoromethyl, methoxy, $Me_2N$, or halogen atom.

Clause 16. The catalyst compound of clause 15, wherein $Z^8$ is $C(R^{19})$, wherein $R^{18}$ is hydrogen.

Clause 17. The catalyst compound of clause 16, wherein $R^4$ and $R^5$ are each selected from $C_4$-$C_{20}$ hydrocarbyls.

Clause 18. The catalyst compound of clause 17, wherein $R^4$ and $R^5$ are each selected from $C_6$-$C_{20}$ aryls.

Clause 19. The catalyst compound of clause 17, wherein $R^4$ and $R^5$ are each selected from $C_4$-$C_{20}$ tertiary hydrocarbyl.

Clause 20. The catalyst compound of clause 19, wherein $R^4$ and $R^5$ are each selected from $C_4$-$C_{20}$ cyclic tertiary hydrocarbyl.

Clause 21. The catalyst compound of clause 20, wherein $R^4$ and $R^5$ are each selected from adamantan-1-yl, 3,5-dimethyladamantan-1-yl, and 3,5,7-trimethyladamantan-1-yl.

Clause 22. The catalyst compound of clause 17, wherein each of $R^9$, $R^{10}$, $R^{11}$, $R^{12}$, $R^{13}$, $R^{14}$, $R^{15}$, $R^{16}$, and $R^{17}$ is independently hydrogen or $C_1$-$C_{10}$ alkyl.

Clause 23. The catalyst compound of clause 1, wherein the catalyst compound is selected from the following, with M=Zr or Hf, and R=$C_1$-$C_{20}$ hydrocarbyl, a monovalent heteroatom, or a heteroatom-bonded monovalent group:

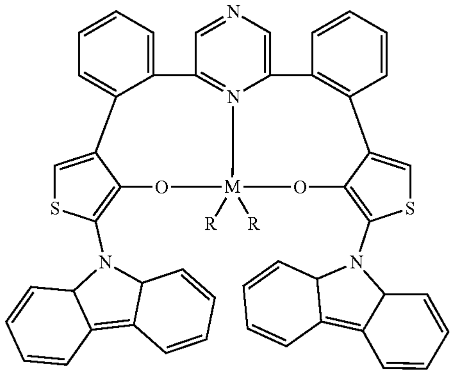

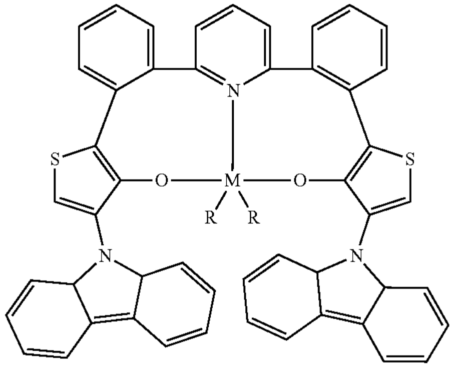

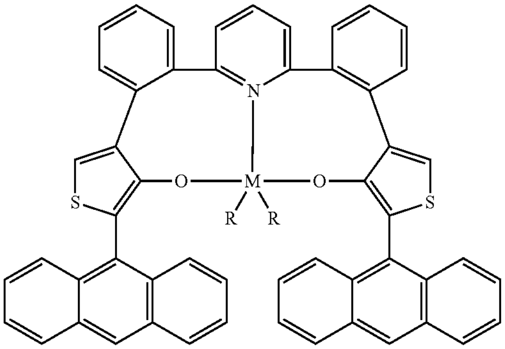

-continued

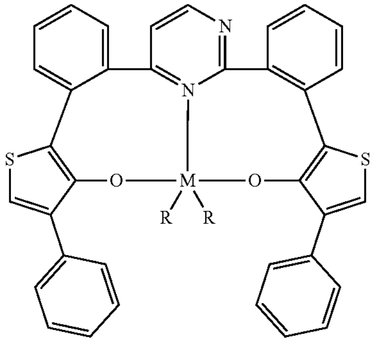

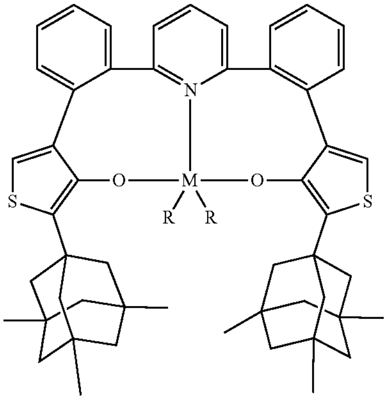

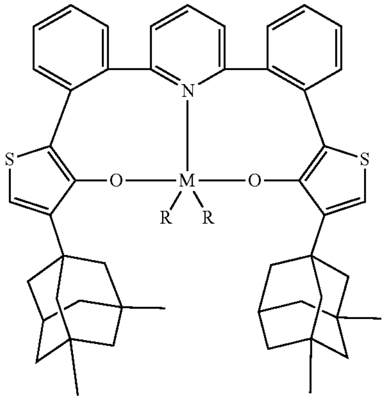

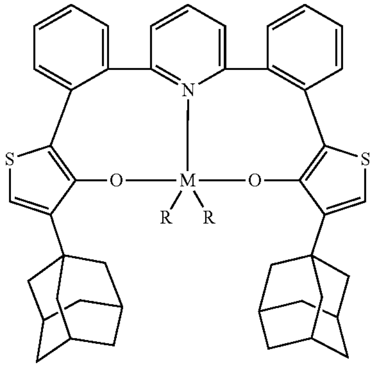

-continued
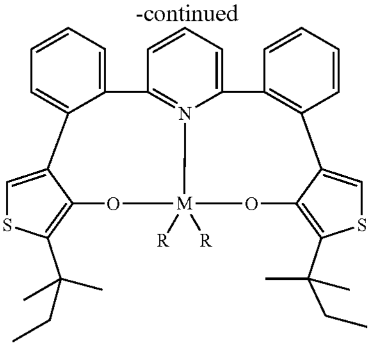
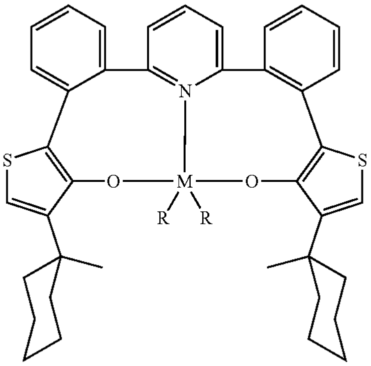
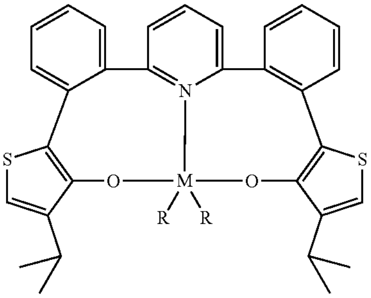
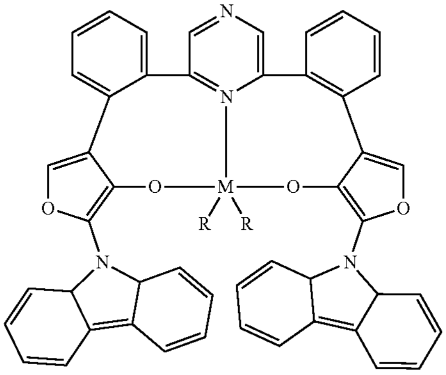
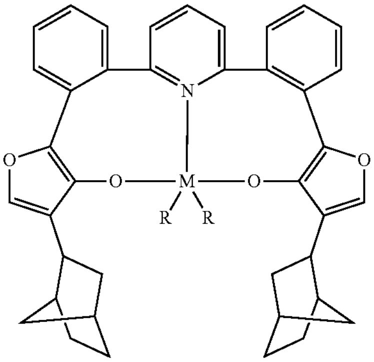
-continued
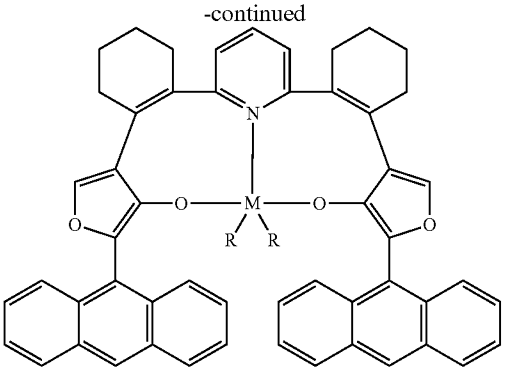
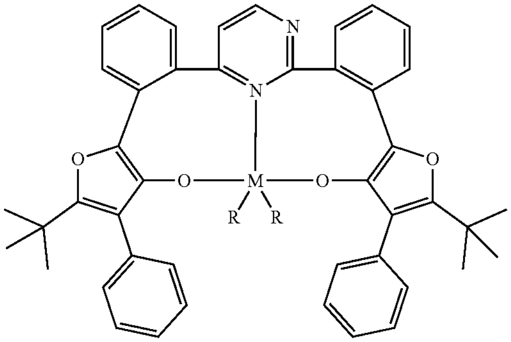
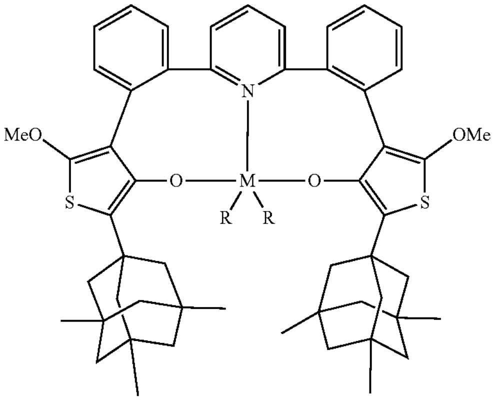
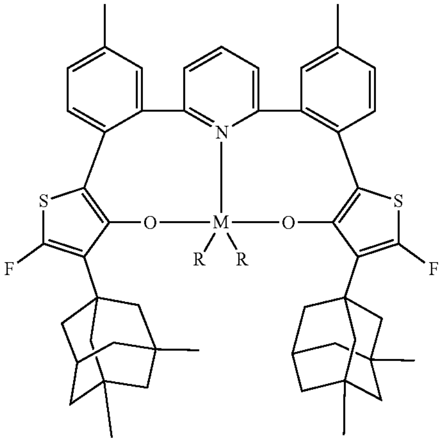

-continued
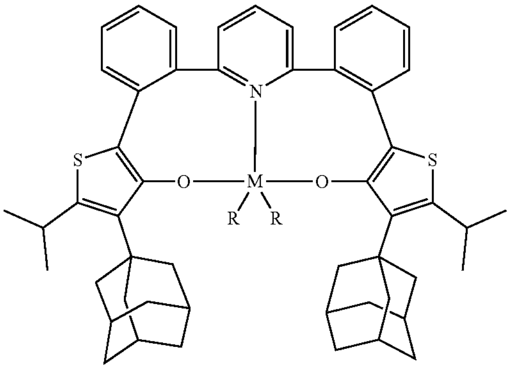
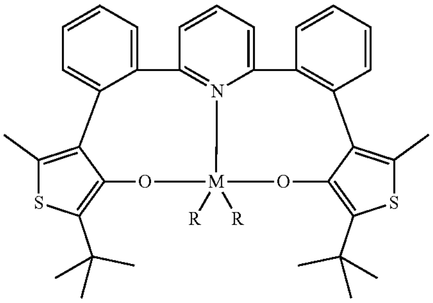
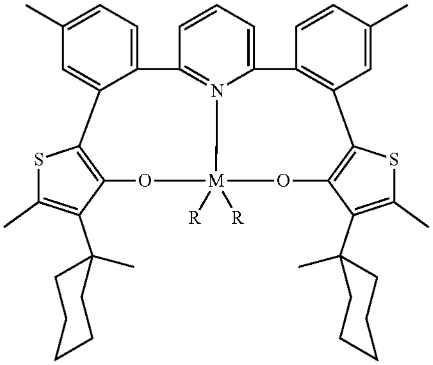
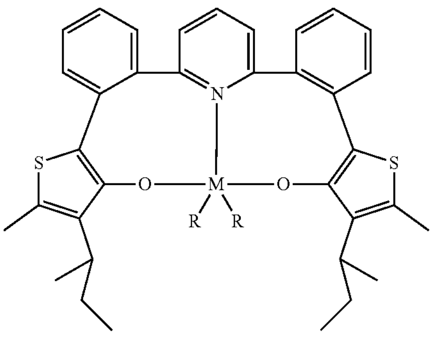
-continued
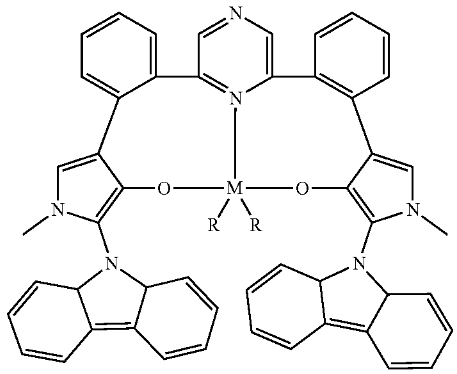
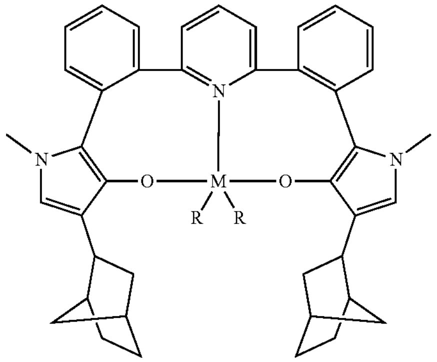
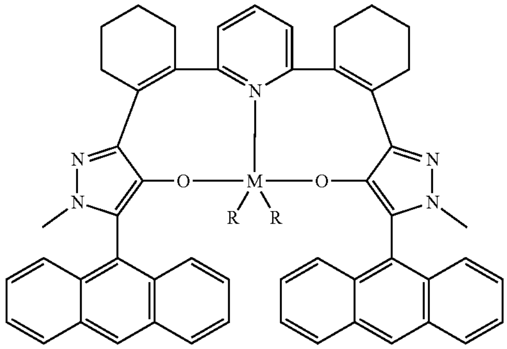
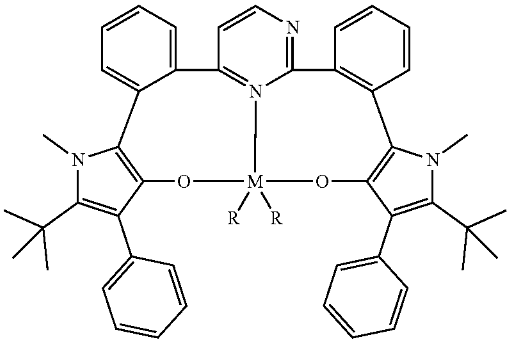

-continued
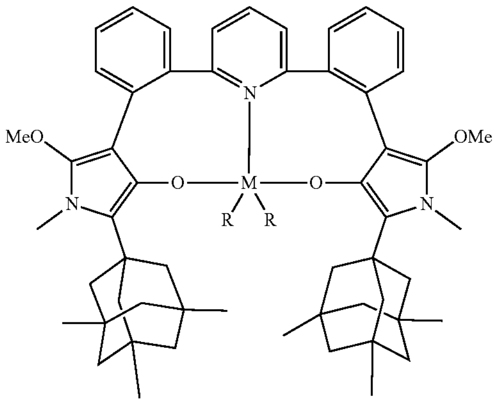
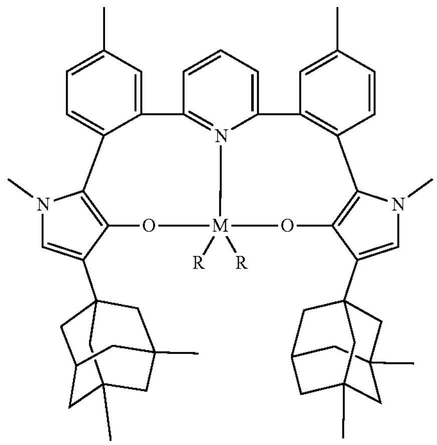
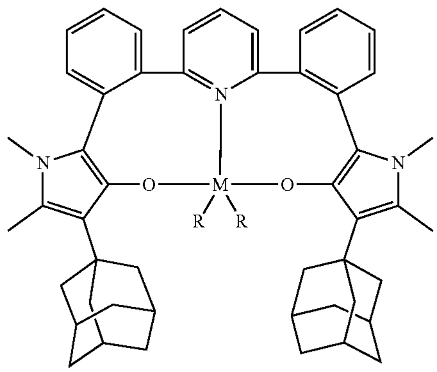
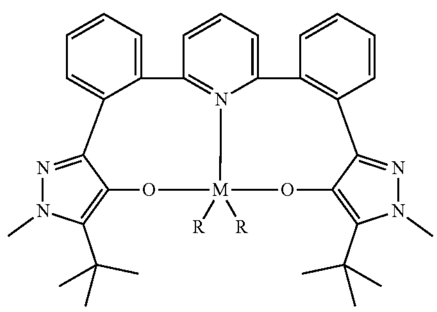
-continued
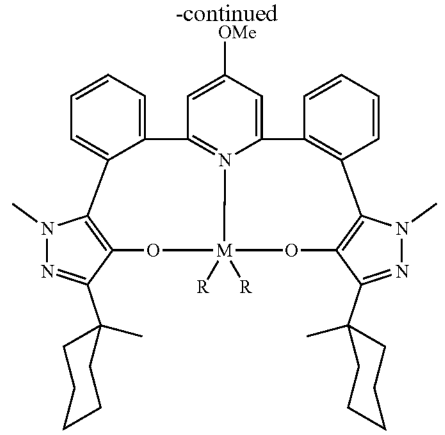
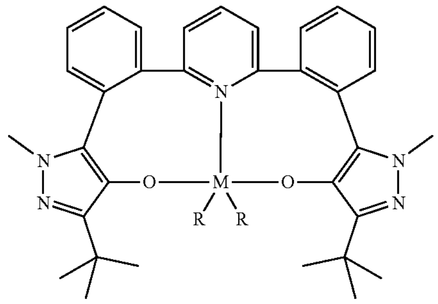
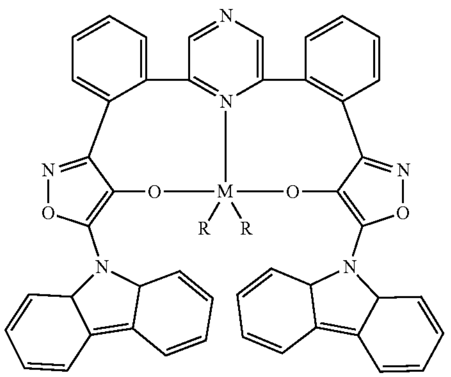
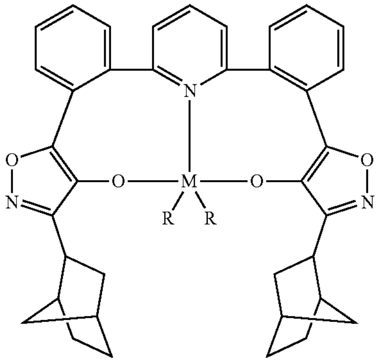

-continued
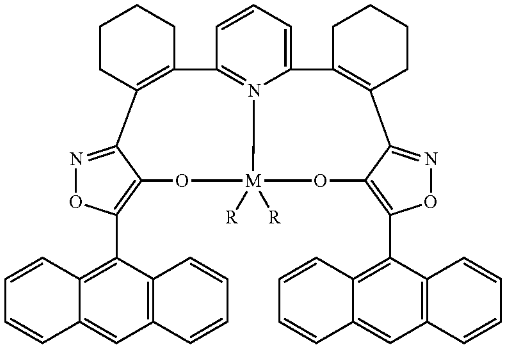
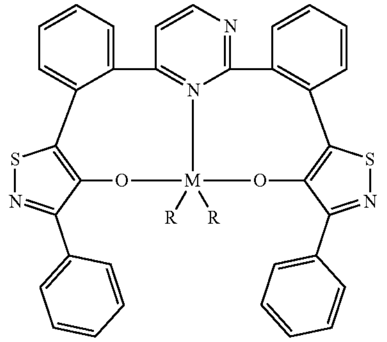
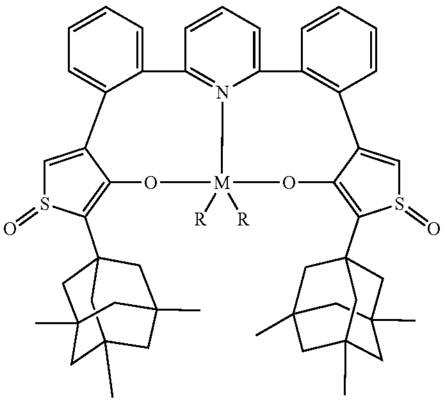
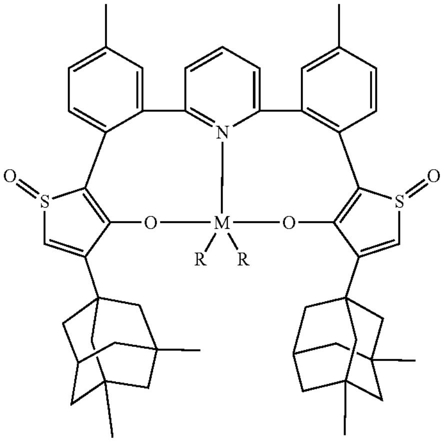
-continued
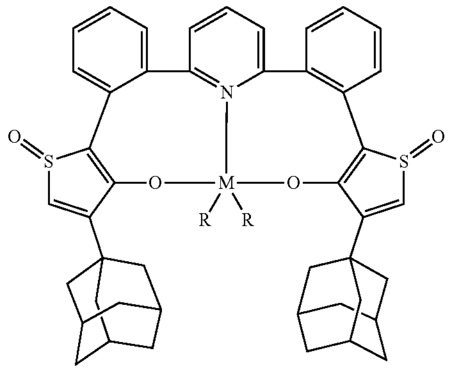
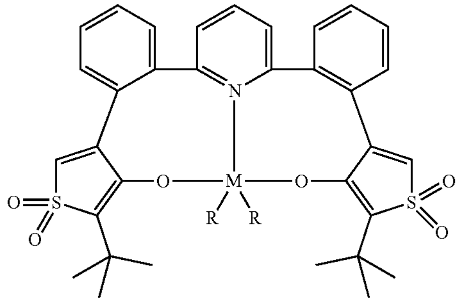
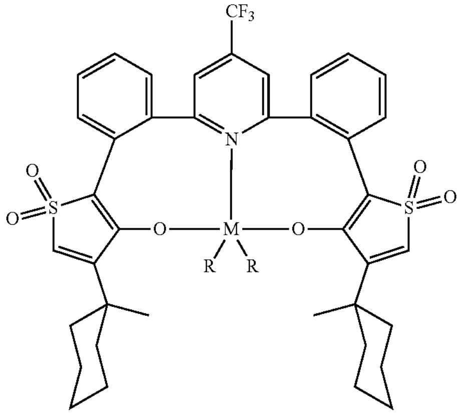
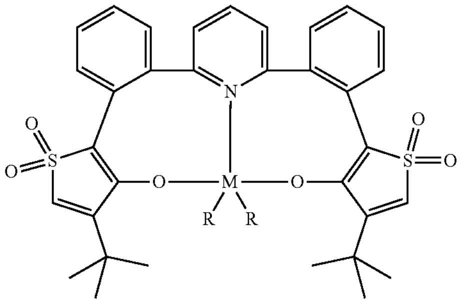
Clause 24. The catalyst compound of clause 1, wherein the catalyst compound is selected from the following, with M=Zr or Hf; and R═$C_1$-$C_{20}$ hydrocarbyl, a monovalent heteroatom, or a heteroatom-bonded monovalent group:

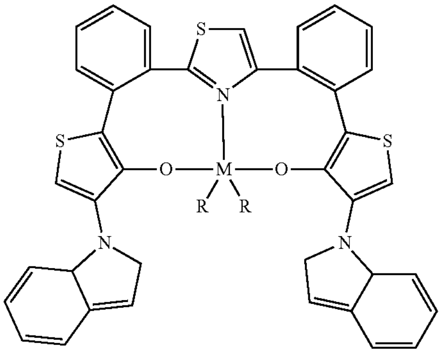

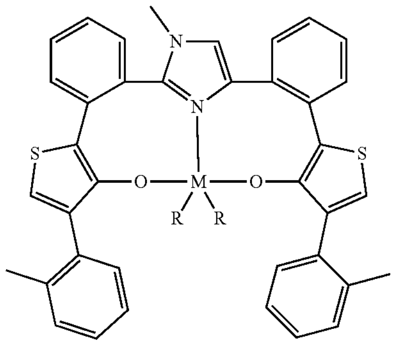

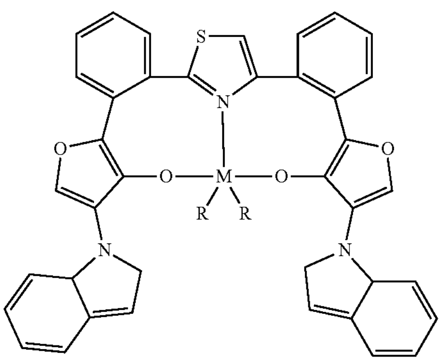

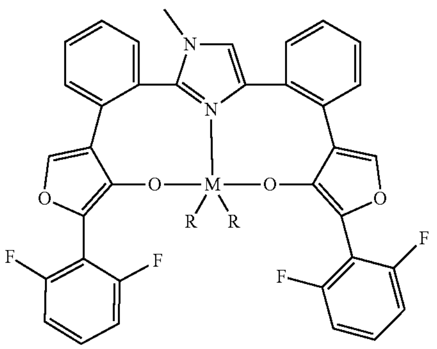

-continued

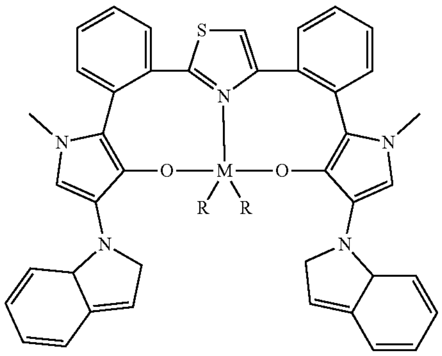

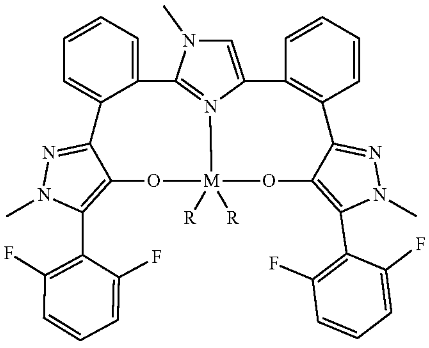

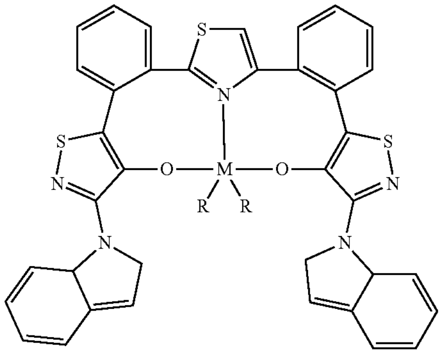

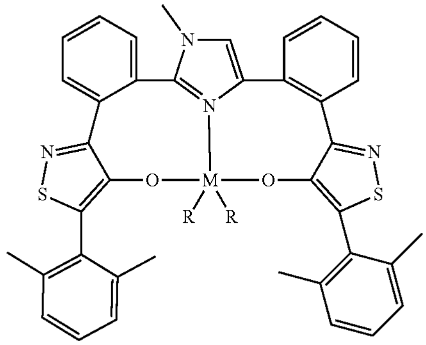

Clause 25. A catalyst system comprising an activator and the catalyst compound of any of clauses 1 to 24.

Clause 26. The catalyst system of clause 25, further comprising a support material.

Clause 27. The catalyst system of clause 26, wherein the support material is selected from $Al_2O_3$, $ZrO_2$, $SiO_2$, $SiO_2/Al_2O_3$, $SiO_2/TiO_2$, silica clay, silicon oxide/clay, or mixtures thereof.

Clause 28. The catalyst system of clause 25, wherein the activator comprises a non-coordinating anion activator.

Clause 29. The catalyst system of clause 25, wherein the activator is represented by the formula:

$$Z_d^+ (A^{d-})$$

wherein Z is (L-H) or a reducible Lewis Acid, L is a Lewis base; H is hydrogen; $(L\text{-}H)^+$ is a Bronsted acid; $A^{d-}$ is a non-coordinating anion having the charge d−; and d is an integer from 1 to 3.

Clause 30. The catalyst system of clause 25, wherein the activator is represented by the formula:

$$[R^1R^2R^3EH]_d^+[M^{k+}Q_n]^{d-}$$

wherein:

E is nitrogen or phosphorous; d is 1, 2 or 3; k is 1, 2, or 3); n is 1, 2, 3, 4, 5, or 6; n−k=d; each of $R^1$, $R^2$, and $R^3$ is independently H, optionally substituted $C_1$-$C_{40}$ alkyl or optionally substituted $C_5$-$C_{50}$-aryl; wherein $R^1$, $R^2$, and $R^3$ together comprise 15 or more carbon atom; M is an element selected from group 13 of the Periodic Table of the Elements; and each Q is independently a hydride, bridged or unbridged dialkylamido, halide, alkoxide, aryloxide, hydrocarbyl, substituted hydrocarbyl, halocarbyl, substituted halocarbyl, or halosubstituted-hydrocarbyl radical.

Clause 31. The catalyst system of clause 25, wherein the activator is one or more of N-methyl-4-nonadecyl-N-octadecylanilinium tetrakis(perfluoronaphthalen-2-yl)borate,
N-methyl-4-nonadecyl-N-octadecylanilinium tetrakis(perfluorophenyl)borate,
dioctadecylmethylammonium tetrakis(pentafluorophenyl)borate,
dioctadecylmethylammonium tetrakis(perfluoronaphthyl)borate,
N,N-dimethylanilinium tetrakis(pentafluorophenyl)borate,
triphenylcarbenium tetrakis(pentafluorophenyl)borate,
trimethylammonium tetrakis(perfluoronaphthyl)borate,
triethylammonium tetrakis(perfluoronaphthyl)borate,
tripropylammonium tetrakis(perfluoronaphthyl)borate,
tri(n-butyl)ammonium tetrakis(perfluoronaphthyl)borate,
tri(t-butyl)ammonium tetrakis(perfluoronaphthyl)borate,
N,N-dimethylanilinium tetrakis(perfluoronaphthyl)borate,
N,N-diethylanilinium tetrakis(perfluoronaphthyl)borate,
N,N-dimethyl-(2,4,6-trimethylanilinium) tetrakis(perfluoronaphthyl)borate,
tropillium tetrakis(perfluoronaphthyl)borate,
triphenylcarbenium tetrakis(perfluoronaphthyl)borate,
triphenylphosphonium tetrakis(perfluoronaphthyl)borate,
triethylsilylium tetrakis(perfluoronaphthyl)borate,
benzene(diazonium) tetrakis(perfluoronaphthyl)borate,
trimethylammonium tetrakis(perfluorobiphenyl)borate,
triethylammonium tetrakis(perfluorobiphenyl)borate,
tripropylammonium tetrakis(perfluorobiphenyl)borate,
tri(n-butyl)ammonium tetrakis(perfluorobiphenyl)borate,
tri(t-butyl)ammonium tetrakis(perfluorobiphenyl)borate,
N,N-dimethylanilinium tetrakis(perfluorobiphenyl)borate,
N,N-diethylanilinium tetrakis(perfluorobiphenyl)borate,
N,N-dimethyl-(2,4,6-trimethylanilinium) tetrakis(perfluorobiphenyl)borate,
tropillium tetrakis(perfluorobiphenyl)borate,
triphenylcarbenium tetrakis(perfluorobiphenyl)borate,
triphenylphosphonium tetrakis(perfluorobiphenyl)borate,
triethylsilylium tetrakis(perfluorobiphenyl)borate,
benzene(diazonium) tetrakis(perfluorobiphenyl)borate,
$[4\text{-t-butyl-PhNMe}_2H][(C_6F_3(C_6F_5)_2)_4B]$,
trimethylammonium tetraphenylborate,
triethylammonium tetraphenylborate,
tripropylammonium tetraphenylborate,
tri(n-butyl)ammonium tetraphenylborate,
tri(t-butyl)ammonium tetraphenylborate,
N,N-dimethylanilinium tetraphenylborate,
N,N-diethylanilinium tetraphenylborate,
N,N-dimethyl-(2,4,6-trimethylanilinium) tetraphenylborate,
tropillium tetraphenylborate,
triphenylcarbenium tetraphenylborate,
triphenylphosphonium tetraphenylborate,
triethylsilylium tetraphenylborate,
benzene(diazonium)tetraphenylborate,
trimethylammonium tetrakis(pentafluorophenyl)borate,
triethylammonium tetrakis(pentafluorophenyl)borate,
tripropylammonium tetrakis(pentafluorophenyl)borate,
tri(n-butyl)ammonium tetrakis(pentafluorophenyl)borate,
tri(sec-butyl)ammonium tetrakis(pentafluorophenyl)borate,
N,N-dimethylanilinium tetrakis(pentafluorophenyl)borate,
N,N-diethylanilinium tetrakis(pentafluorophenyl)borate,
N,N-dimethyl-(2,4,6-trimethylanilinium) tetrakis(pentafluorophenyl)borate,
tropillium tetrakis(pentafluorophenyl)borate,
triphenylcarbenium tetrakis(pentafluorophenyl)borate,
triphenylphosphonium tetrakis(pentafluorophenyl)borate,
triethylsilylium tetrakis(pentafluorophenyl)borate,
benzene(diazonium) tetrakis(pentafluorophenyl)borate,
trimethylammonium tetrakis-(2,3,4,6-tetrafluorophenyl)borate,
triethylammonium tetrakis-(2,3,4,6-tetrafluorophenyl)borate,
tripropylammonium tetrakis-(2,3,4,6-tetrafluorophenyl)borate,
tri(n-butyl)ammonium tetrakis-(2,3,4,6-tetrafluoro-phenyl)borate,
dimethyl(t-butyl)ammonium tetrakis-(2,3,4,6-tetrafluorophenyl)borate,
N,N-dimethylanilinium tetrakis-(2,3,4,6-tetrafluorophenyl)borate,
N,N-diethylanilinium tetrakis-(2,3,4,6-tetrafluorophenyl)borate,
N,N-dimethyl-(2,4,6-trimethylanilinium) tetrakis-(2,3,4,6-tetrafluorophenyl)borate,
tropillium tetrakis-(2,3,4,6-tetrafluorophenyl)borate,
triphenylcarbenium tetrakis-(2,3,4,6-tetrafluorophenyl)borate,
triphenylphosphonium tetrakis-(2,3,4,6-tetrafluorophenyl)borate,
triethylsilylium tetrakis-(2,3,4,6-tetrafluorophenyl)borate,
benzene(diazonium) tetrakis-(2,3,4,6-tetrafluorophenyl)borate,
trimethylammonium tetrakis(3,5-bis(trifluoromethyl)phenyl)borate,
triethylammonium tetrakis(3,5-bis(trifluoromethyl)phenyl)borate,
tripropylammonium tetrakis(3,5-bis(trifluoromethyl)phenyl)borate,
tri(n-butyl)ammonium tetrakis(3,5-bis(trifluoromethyl)phenyl)borate,
tri(t-butyl)ammonium tetrakis(3,5-bis(trifluoromethyl)phenyl)borate,
N,N-dimethylanilinium tetrakis(3,5-bis(trifluoromethyl)phenyl)borate, N,N-diethylanilinium tetrakis(3,5-bis(trifluoromethyl)phenyl)borate,
N,N-dimethyl-(2,4,6-trimethylanilinium) tetrakis(3,5-bis(trifluoromethyl)phenyl)borate,
tropillium tetrakis(3,5-bis(trifluoromethyl)phenyl)borate,
triphenylcarbenium tetrakis(3,5-bis(trifluoromethyl)phenyl)borate,
triphenylphosphonium tetrakis(3,5-bis(trifluoromethyl)phenyl)borate,
triethylsilylium tetrakis(3,5-bis(trifluoromethyl)phenyl)borate,
benzene(diazonium) tetrakis(3,5-bis(trifluoromethyl)phenyl)borate,
di-(i-propyl)ammonium tetrakis(pentafluorophenyl)borate,
dicyclohexylammonium tetrakis(pentafluorophenyl)borate,
tri(o-tolyl)phosphonium tetrakis(pentafluorophenyl)borate,
tri(2,6-dimethylphenyl)phosphonium tetrakis(pentafluorophenyl)borate,
triphenylcarbenium tetrakis(perfluorophenyl)borate,
1-(4-(tris(pentafluorophenyl)borate)-2,3,5,6-tetrafluorophenyl)pyrrolidinium,
tetrakis(pentafluorophenyl)borate,
4-(tris(pentafluorophenyl)borate)-2,3,5,6-tetrafluoropyridine, and
triphenylcarbenium tetrakis(3,5-bis(trifluoromethyl)phenyl)borate).

Clause 32. The catalyst system of clause 25, further comprising a metal hydrocarbenyl chain transfer agent represented by the formula:

$$Al(R')_{3-v}(R'')_v$$

wherein each R' independently is a $C_1$-$C_{30}$ hydrocarbyl group; each R'', independently, is a $C_4$-$C_{20}$ hydrocarbenyl group having an end-vinyl group; and v is from 1 to 3.

Clause 33. The catalyst system of clause 25, wherein the activator comprises an alkylalumoxane.

Clause 34. The catalyst system of clause 33, wherein the alumoxane is present at a molar ratio of aluminum to catalyst compound transition metal of 100:1 or more.

Clause 35. A process for the production of an ethylene based polymer comprising: polymerizing ethylene by contacting the ethylene with a catalyst system of any of clauses 25 to 34, in one or more continuous stirred tank reactors or loop reactors, in series or in parallel, at a reactor pressure of from 0.05 MPa to 1,500 MPa and a reactor temperature of from 30° C. to 230° C.

Clause 36. The process of clause 35, wherein the ethylene based polymer has an Mw value of from 2,000 to 3,000,000 g/mol, Mn value of from 1,000 to 2,000,000 g/mol, Mz value of from 10,000 to 10,000,000 g/mol, and an Mw/Mn of from 1 to 5.

Clause 37. The process of clause 35, wherein the ethylene based polymer has a melting point of from 110° C. to 150° C.

Clause 38. A process for the production of a propylene based polymer comprising: polymerizing propylene by contacting the propylene with a catalyst system of clause 25, in one or more continuous stirred tank reactors or loop reactors, in series or in parallel, at a reactor pressure of from 0.05 MPa to 1,500 MPa and a reactor temperature of from 30° C. to 230° C.

Clause 39. The process of clause 38, wherein the propylene based polymer has an Mw value of from 500 to 15,000 g/mol, Mn value of from 500 to 15,000 g/mol, Mz value of from 500 to 20,000 g/mol, and an Mw/Mn of from 1 to 5.

Clause 40. The process of clause 38, wherein the propylene based polymer has a melting point of from 50° C. to 150° C.

Clause 41. A process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with a catalyst system of clause 25, in one or more continuous stirred tank reactors or loop reactors, in series or in parallel, at a reactor pressure of from 0.05 MPa to 1,500 MPa and a reactor temperature of from 30° C. to 230° C.

Clause 42. The process of clause 41, wherein the ethylene alpha-olefin copolymer has a comonomer content of 0.1 to 50 wt %, an Mw value of from 1,000 to 3,000,000 g/mol, and Mz value of from 1,000 to 10,000,000 g/mol, an Mn value of from 1,000 to 1,000,000 g/mol, and an Mw/Mn of from 1 to 5.

Clause 43. The process of clause 41, wherein the ethylene alpha-olefin copolymer has a melting point of from 100° C. to 140° C.

Clause 44. A process for the production of a propylene alpha-olefin copolymer comprising: polymerizing propylene and at least one ethylene or at least one $C_4$-$C_{20}$ alpha-olefin by contacting the propylene and the at least one ethylene or at least one $C_3$-$C_{20}$ alpha-olefin with a catalyst system of clause 25, in one or more continuous stirred tank reactors or loop reactors, in series or in parallel, at a reactor pressure of from 0.05 MPa to 1,500 MPa and a reactor temperature of from 30° C. to 230° C.

Clause 45. The process of clause 44, wherein the propylene alpha-olefin copolymer has a comonomer content of 0.1 to 35 wt %, an Mw value of from 1,000 to 3,000,000 g/mol, and Mz value of from 1,000 to 10,000,000 g/mol, an Mn value of from 1,000 to 1,000,000 g/mol, and an Mw/Mn of from 1 to 5.

Clause 46. The process of clause 44, wherein the propylene alpha-olefin copolymer has a melting point of from 100° C. to 140° C.

EXAMPLES

Following are examples of inventive complexes (M=group 4 metal; R=halide, $C_1$-$C_{20}$ hydrocarbyl):

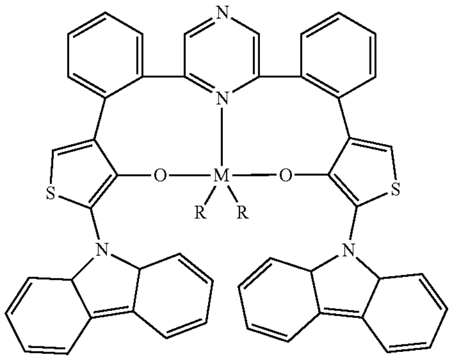

-continued
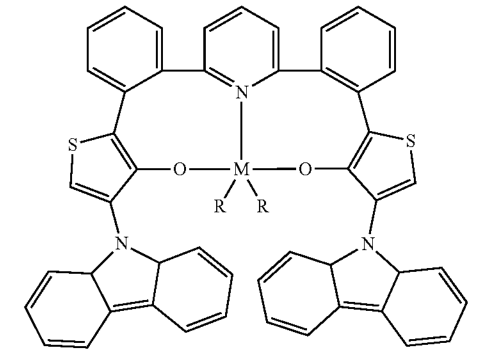
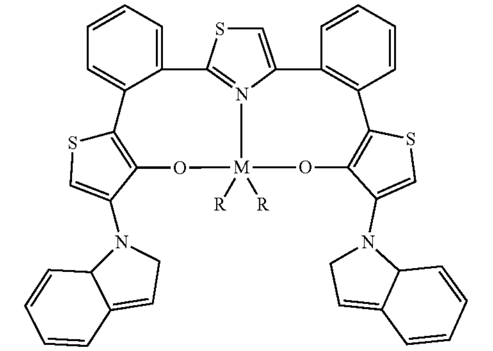
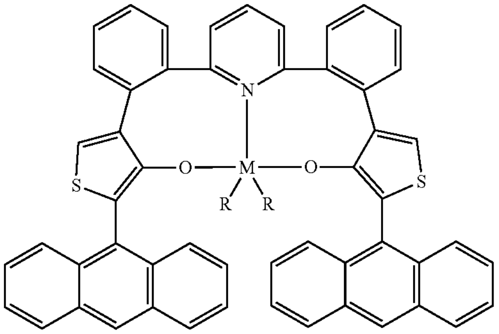
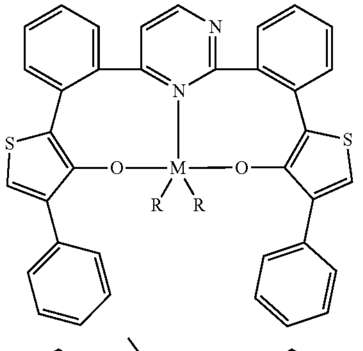
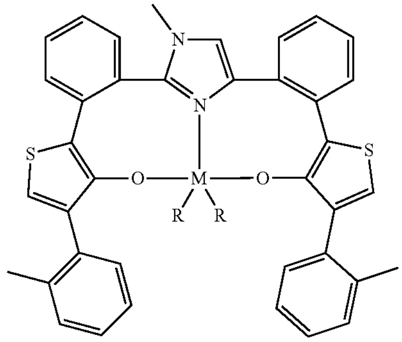
-continued
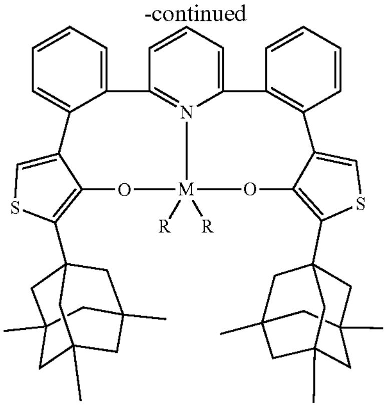
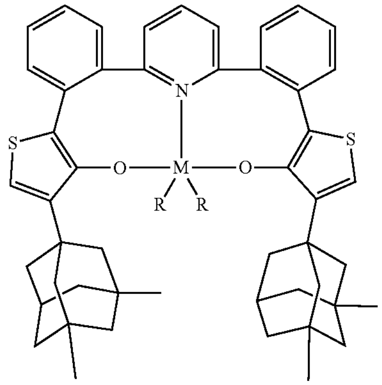
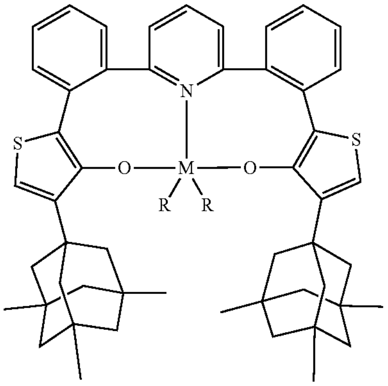
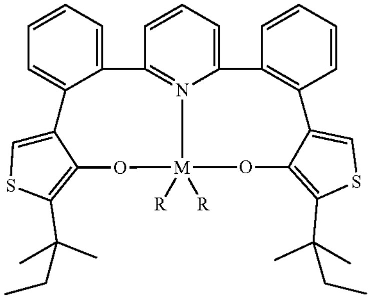

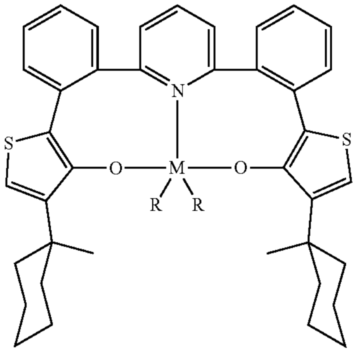
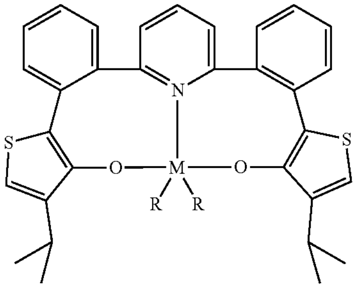
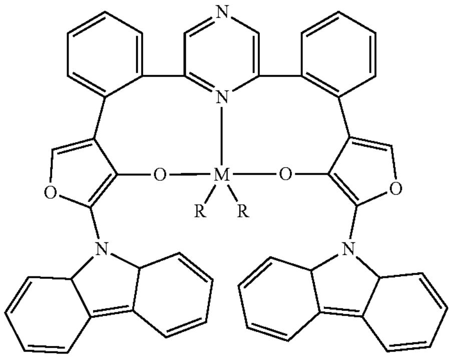
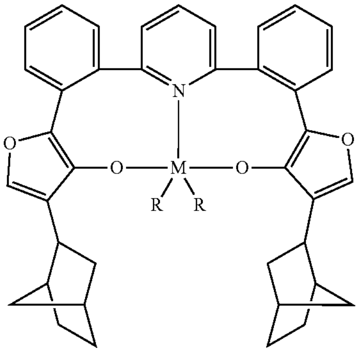
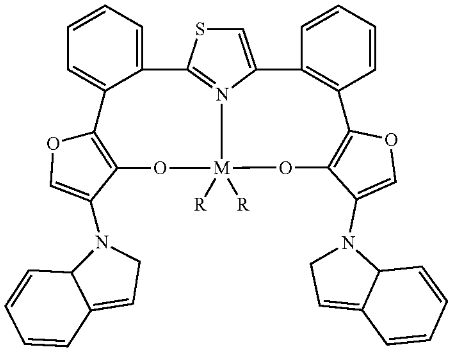
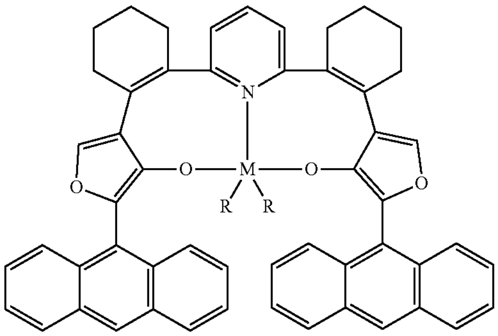
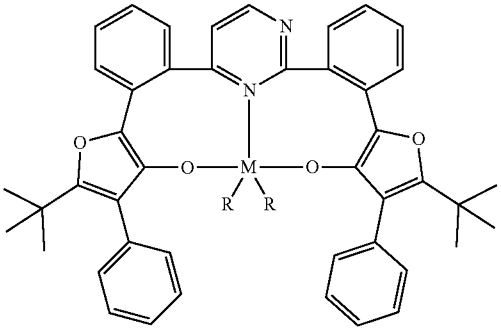
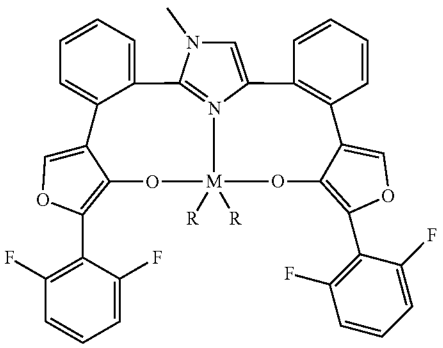
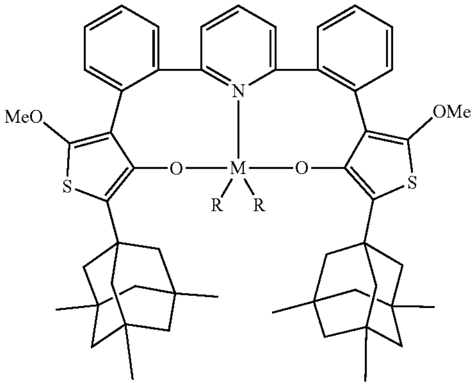

-continued
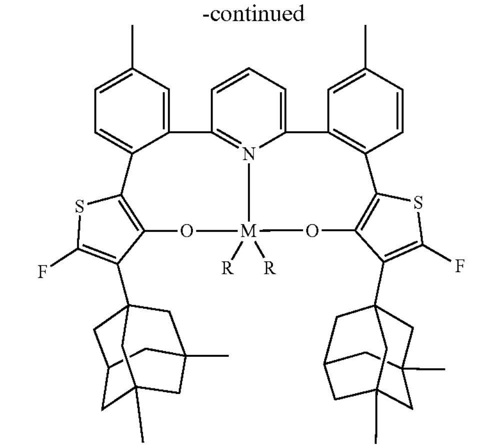
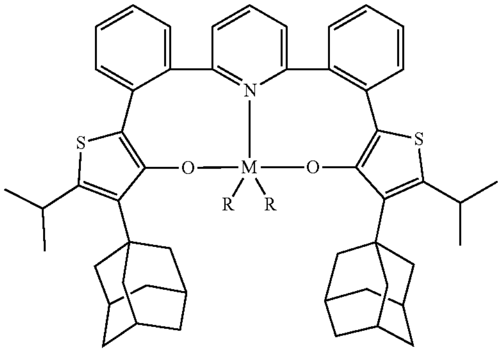
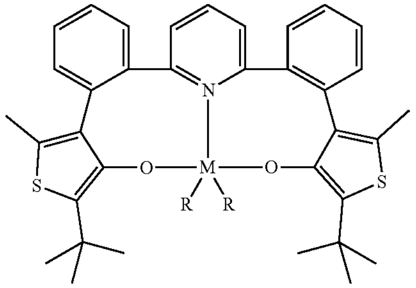
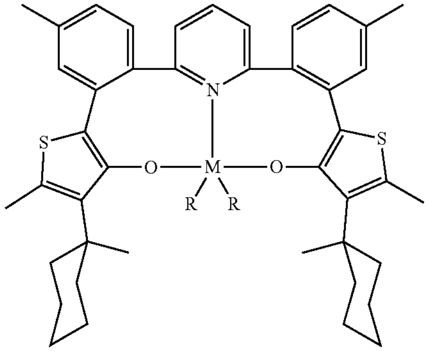
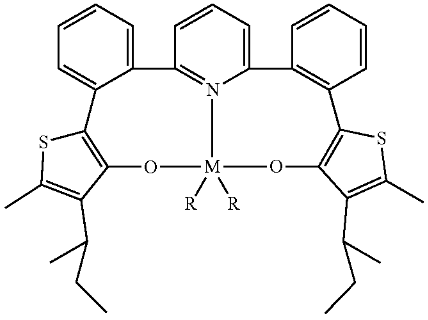
-continued
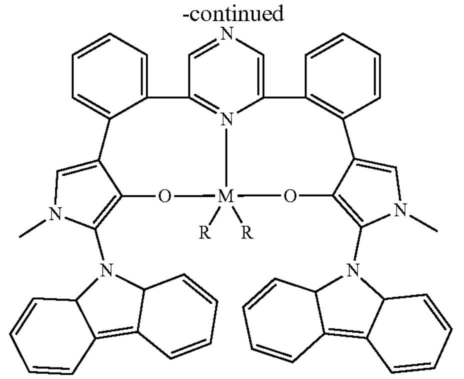
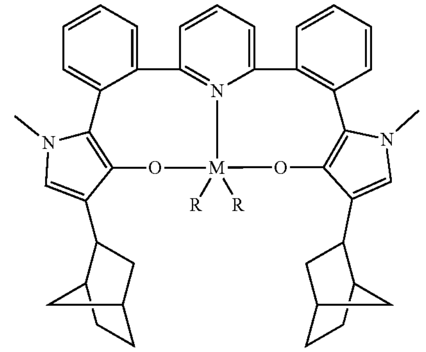
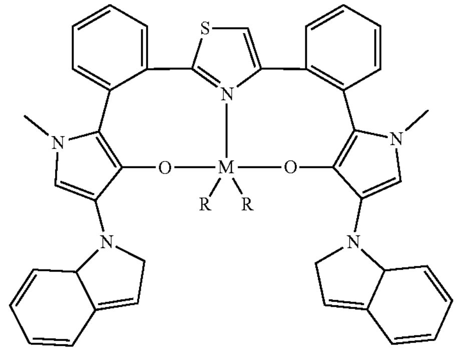
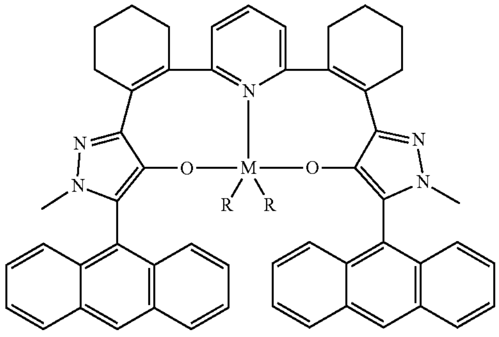
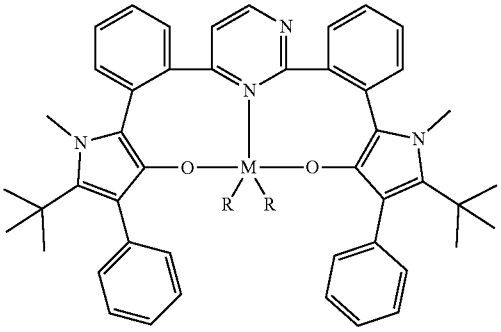

-continued
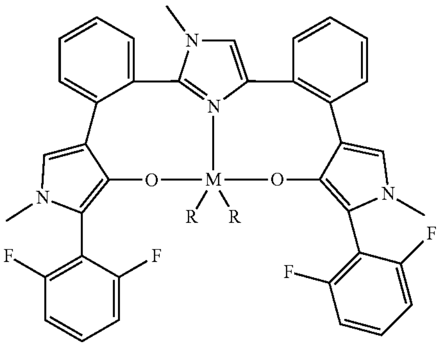
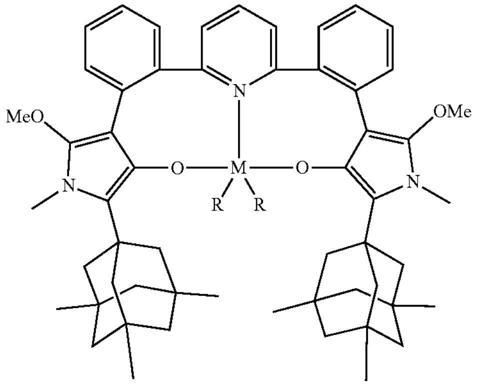
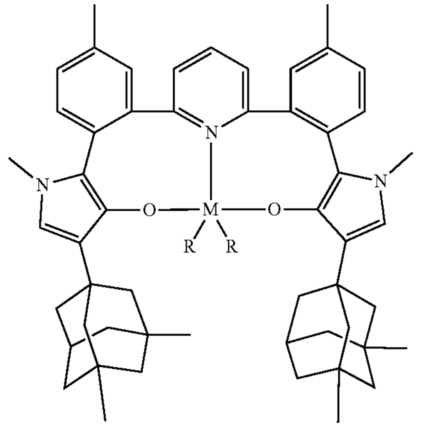
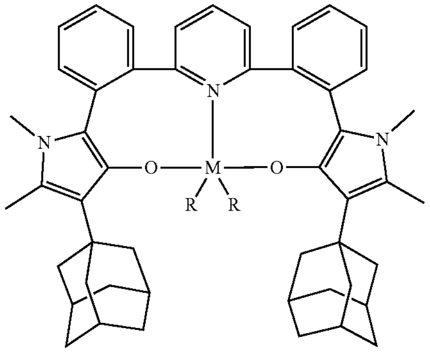
-continued
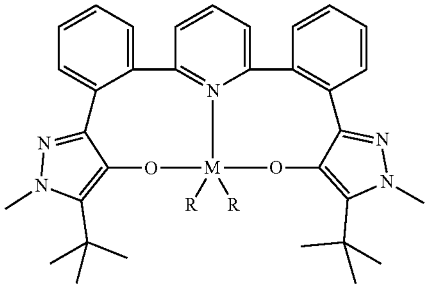
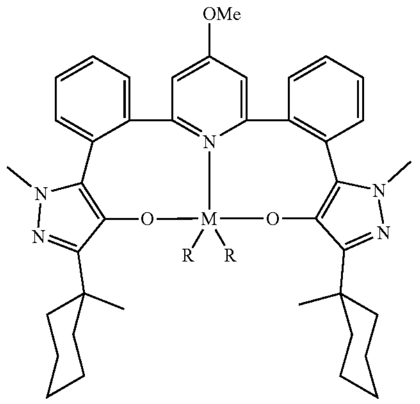
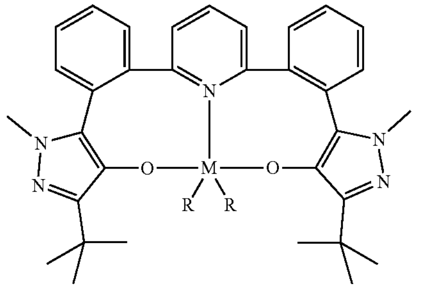
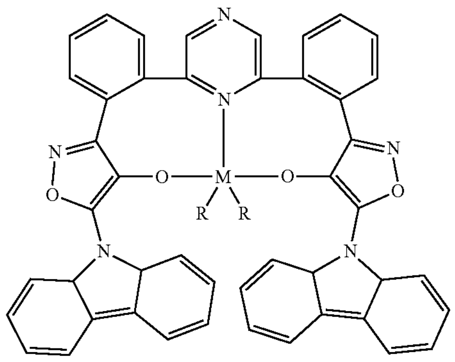
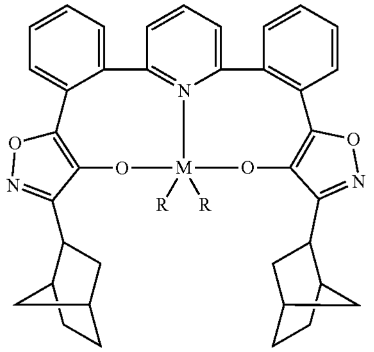

-continued
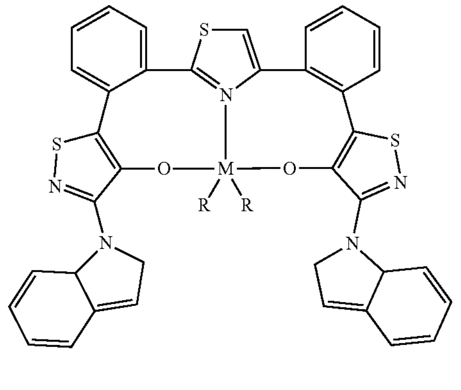
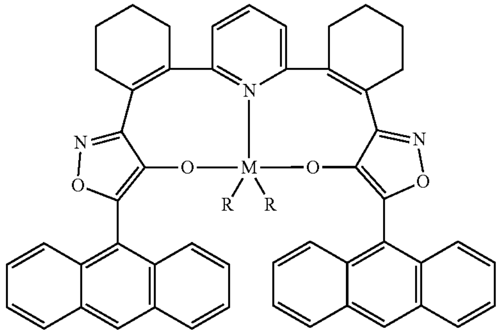
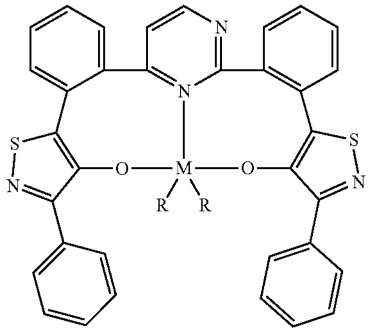
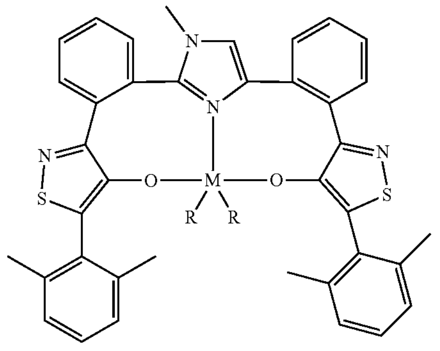
-continued
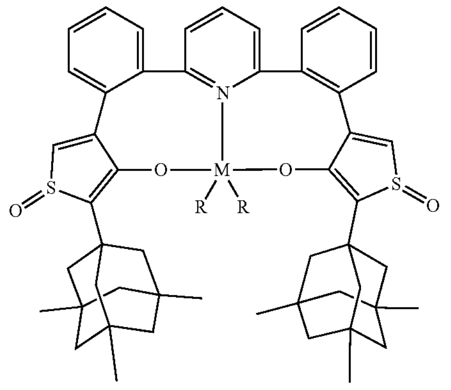
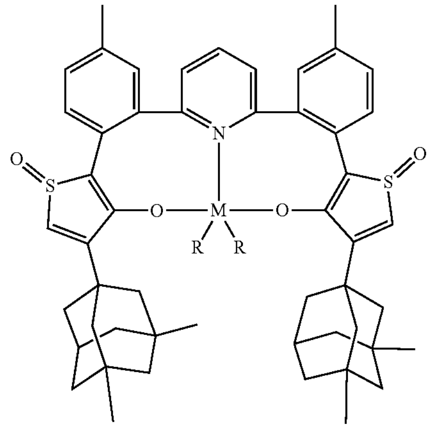
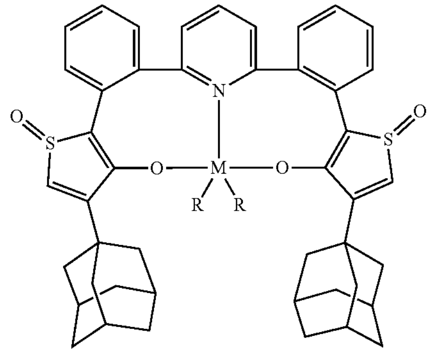
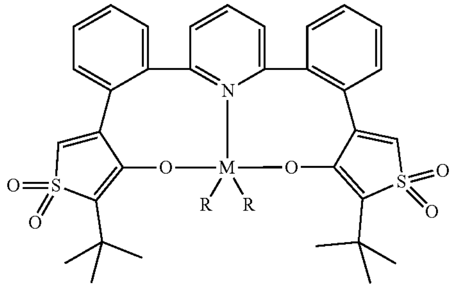

-continued

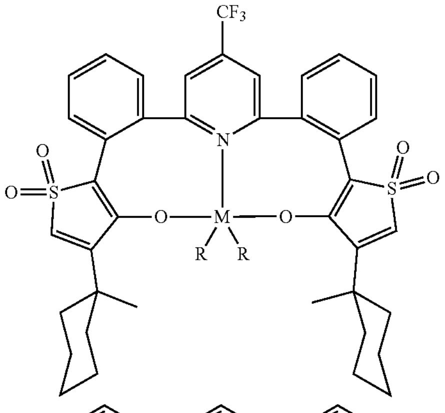

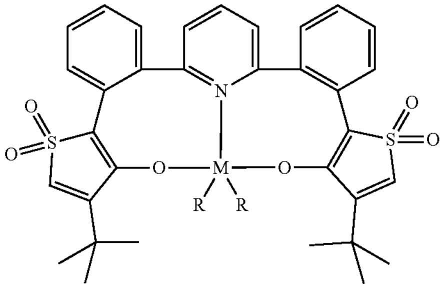

Chemicals and Reagents:

Methyl 4-bromo-3-hydroxythiophene-2-carboxylate [95201-93-7] may be prepared using procedures described in WO 2002/38572 and *Tetrahedron Letters* 2011, 52, 1288-1291 and *Tetrahedron Letters* 2017, 58, 2537-2541. 4-Bromothiophen-3-ol (compound A) may be prepared from methyl 4-bromo-3-hydroxythiophene-2-carboxylate using the procedure described in WO2018/236863. $Zr(NMe_2)Cl_2$ (DME) may be prepared using the method described in Organometallies (2000), 19(2), 127-134. Solvents and the following chemicals may be purchased from commercial sources (Sigma Aldrich, Alfa Aesar, TCI). 4-bromothiophen-3-ol, 1,2-dimethoxyethane (DME), sodium hydride, chloro (methoxy)methane (MOM-Cl), phenylboronic acid, sodium carbonate, 2-isopropoxy-4,4,5,5-tetramethyl-1,3,2-dioxaborolane ($^{i}$PrOB(pin)), tetrakis(triphenylphosphine)palladium, 2-bromoiodobenzene, butyllithium, methylmagnesium bromide, hydrochloric acid.

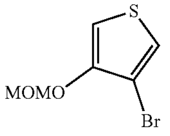

Prophetic synthesis of 3-bromo-4-(methoxymethoxy) thiophene (compound B). Sodium hydride (13.4 mmol) is added over 30 minutes to a stirred mixture of tetrahydrofuran (100 mL) and 4-bromothiophen-3-ol (compound A) (2.00 g, 11.2 mmol). After stirring overnight chloro (methoxy)methane (1.08 g, 13.4 mmol) is added dropwise. After a couple of hours the volatiles are evaporated and the residue is extracted with ethyl ether (100 mL). The solution is filtered through Celite, then evaporated to yield the product. Yield: 95%.

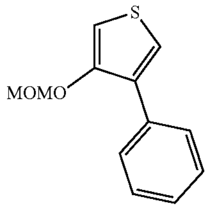

Prophetic synthesis of 3-(methoxymethoxy)-4-phenylthiophene (compound C). A round-bottomed flask is loaded with 3-bromo-4-(methoxymethoxy)thiophene (3.36 g, 15.1 mmol), phenylboronic acid (1.91 g, 15.7 mmol), sodium carbonate (4.15 g, 39.2 mmol), dioxane (180 mL) and water (90 mL). The mixture is sparged with nitrogen for 50 minutes then solid $Pd(PPh_3)_4$ (0.905 g, 0.783 mmol) is added. The mixture is sparged for an additional 40 minutes, then stirred rapidly and heated in an oil bath maintained at 100° C. After 20 hours the volatiles are evaporated to afford crude product, which is purified using column chromatography. Yield: 70%.

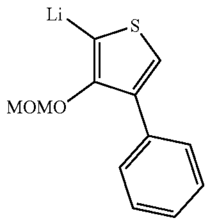

Prophetic synthesis of (3-(methoxymethoxy)-4-phenylthiophen-2-yl)lithium (compound D). Hexanes (50 mL) is added to 3-(methoxymethoxy)-4-phenylthiophene (2.90 g, 13.2 mmol) to form a mixture. A hexane solution of butyllithium (13.2 mmol, ca. 8 mL) is added dropwise over 15 minutes. 1,2-Dimethoxyethane (1.5 mL) is then added. Evaporation of the volatiles affords the product. Yield: 90%.

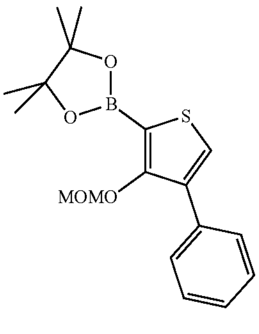

Prophetic synthesis of 2-(3-(methoxymethoxy)-4-phenylthiophen-2-yl)-4,4,5,5-tetramethyl-1,3,2-dioxaborolane (compound E). Toluene (100 mL) and (3-(methoxymethoxy)-4-phenylthiophen-2-yl)lithium (1.86 g, 8.24 mmol) are combined to form mixture. The mixture is cooled to −40° C. and iPrOB(pin) (2.41 g, 13.0 mmol) is added. The mixture is allowed to warm slowly to ambient temperature. After 16 hours the mixture is transferred to a separatory funnel and extracted with water (4×50 mL), then brine (20 mL). The organics are dried over $MgSO_4$, filtered, and evaporated to afford the product. The product is purified using column chromatography. Yield: 85%.

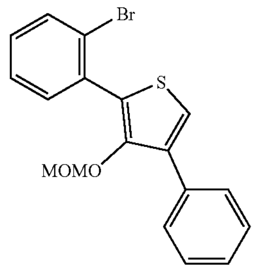

Prophetic synthesis of 2-(2-bromophenyl)-3-(methoxymethoxy)-4-phenylthiophene (compound F, method 1). Toluene (50 mL) is added to (3-(methoxymethoxy)-4-phenylthiophen-2-yl)lithium (2.18 g, 9.64 mmol) to form a suspension. A toluene solution (25 mL) of 1-bromo-2-chlorobenzene (1.87 g 9.74 mol) is added dropwise over 2 hours. After an additional 2 hours have passed, the mixture is transferred to a separatory funnel and extracted with water (3×50 mL), then brine (20 mL). The organics are dried over $MgSO_4$, filtered, and evaporated to afford the product. The product is purified using column chromatography. Yield: 85%.

Prophetic synthesis of 2-(2-bromophenyl)-3-(methoxymethoxy)-4-phenylthiophene (compound F, method 2). A round-bottomed flask is loaded with 2-(3-(methoxymethoxy)-4-phenylthiophen-2-yl)-4,4,5,5-tetramethyl-1,3,2-dioxaborolane (5.23 g, 15.1 mmol), 2-bromoiodobenzene (6.41 g, 22.7 mmol), sodium carbonate (4.15 g, 39.2 mmol), dioxane (180 mL) and water (90 mL). The mixture is sparged with nitrogen for 50 minutes then solid $Pd(PPh_3)_4$ (0.905 g, 0.783 mmol) is added. The mixture is sparged for an additional 40 minutes, then stirred rapidly and heated in an oil bath maintained at 100° C. After 20 hours the volatiles are evaporated to afford crude product, which is purified using column chromatography. Yield: 70%.

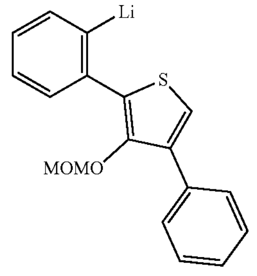

Prophetic synthesis of (2-(3-(methoxymethoxy)-4-phenylthiophen-2-yl)phenyl)lithium (compound G). Hexane (100 mL) and 2-(2-bromophenyl)-3-(methoxymethoxy)-4-phenylthiophene (3.09 g, 8.24 mmol) are combined to form a mixture. The mixture is cooled to −20° C. then a hexane solution of butyllithium (about 3.3 mL, 8.65 mmol) is added dropwise over 10 minutes. The mixture is warmed slowly to 0° C. over an hour. The mixture is stirred for an additional hour then the volatiles are evaporated to afford the product. Yield: 90%.

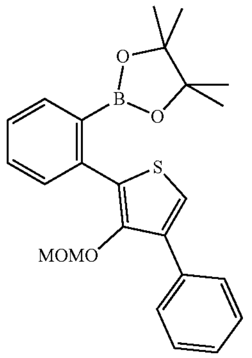

Prophetic synthesis of 2-(2-(3-(methoxymethoxy)-4-phenylthiophen-2-yl)phenyl)-4,4,5,5-tetramethyl-1,3,2-dioxaborolane (compound H). Toluene (100 mL) and (2-(3-(methoxymethoxy)-4-phenylthiophen-2-yl)phenyl)lithium (2.49 g, 8.24 mmol) are combined to form mixture. The mixture is cooled to −40° C. and iPrOB(pin) (2.41 g, 13.0 mmol) is added. The mixture is allowed to warm slowly to ambient temperature. After 16 hours the mixture is transferred to a separatory funnel and extracted with water (4×50 mL), then brine (20 mL). The organics are dried over $MgSO_4$, filtered, and evaporated to afford the product. The product is purified using column chromatography. Yield: 85%.

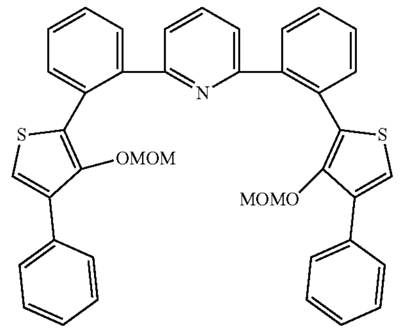

Prophetic synthesis of 2,6-bis(2-(3-(methoxymethoxy)-4-phenylthiophen-2-yl)phenyl)pyridine (compound I). A round-bottomed flask is loaded with 2-(2-(3-(methoxymethoxy)-4-phenylthiophen-2-yl)phenyl)-4,4,5,5-tetramethyl-1,3,2-dioxaborolane (2.98 g, 7.06 mmol), 2,6-dibromopyridine (0.794 g, 3.35 mmol), $Na_2CO_3$ (1.87 g, 17.6 mmol), dioxane (100 mL) and water (50 mL). The mixture is sparged with nitrogen for 30 minutes then solid $Pd(PPh_3)_4$ (0.407 g, 0.353 mmol) is added. The mixture is sparged for an additional 30 minutes, then stirred and heated in an oil bath maintained at 100° C. After 17 hours the mixture is cooled to ambient temperature and the volatiles are evaporated to a residue. The residue is extracted with ethyl ether (200 mL) and the mixture is transferred to a separatory funnel and extracted with water (4×50 mL), then brine (20 mL). The organics are dried over $MgSO_4$, filtered, and evaporated to afford the product. Yield: 90%.

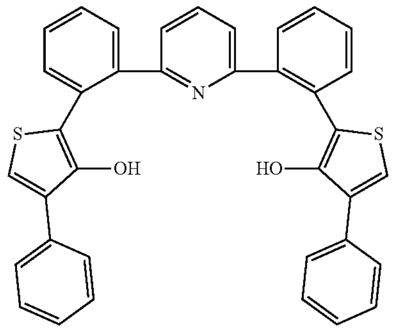 [SMILES: Oc1c(-c2ccccc2)csc1-c1ccccc1-c1cccc(-c2ccccc2-c2scc(-c3ccccc3)c2O)n1]

Prophetic synthesis of 2,2'-(pyridine-2,6-diylbis(2,1-phenylene))bis(4-phenylthiophen-3-ol) (compound J). Methanol (60 mL), tetrahydrofuran (60 mL), concentrated HCl (5 mL), and 2,6-bis(2-(3-(methoxymethoxy)-4-phenylthiophen-2-yl)phenyl)pyridine (3.35 mmol) are combined, and the mixture is heated to 60° C. for 16 hours. The volatiles are then evaporated and the residue is extracted with ether (100 mL) and water (50 mL) and then loaded into a separatory funnel. The aqueous layer is removed and the organics are extracted with water (4×50 mL), then brine (2×10 mL). The organics are dried over $MgSO_4$ then evaporated to yield the product. The product is purified using column chromatography. Yield: 70%.

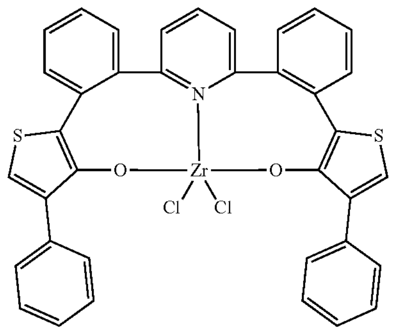

Prophetic synthesis of Dichlorozirconium[2,2'-(pyridine-2,6-diylbis(2,1-phenylene))bis(4-phenylthiophen-3-olate)] (compound K). Toluene (60 mL) is added to $ZrCl_2(NMe_2)_2$(dimethoxyethane) (0.696 g, 2.04 mmol) to form solution. A solution of 2,2'-(pyridine-2,6-diylbis(2,1-phenylene))bis(4-phenylthiophen-3-ol) (1.18 g, 2.04 mmol) dissolved in toluene (20 mL) is then added dropwise over 20 minutes. The mixture is heated to 80° C. for 4 hours then cooled to ambient temperature. The mixture is filtered and then evaporated to afford the product. Yield: 80%.

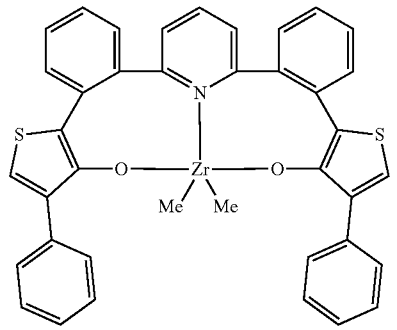

Prophetic synthesis of Dimethylzirconium[2,2'-(pyridine-2,6-diylbis(2,1-phenylene))bis(4-phenylthiophen-3-olate)] (compound L). Toluene (80 mL) is added to dichlorozirconium[2,2'-(pyridine-2,6-diylbis(2,1-phenylene))bis(4-phenylthiophen-3-olate)](compound K, 1.27 g, 1.71 mmol) to form a mixture. The mixture is cooled to −20° C. and MeMgBr (1.6 mL in ethyl ether, 5.14 mmol) is added over 10 minutes. The mixture is allowed to warm slowly to ambient temperature over an hour. After an additional 12 hours the volatiles are evaporated under reduced pressure. The solid is extracted with toluene (50 mL) and filtered. The volatiles are evaporated to afford the product. Purification may by performed by trituration with cold hexanes. Yield: 80%.

General Olefin Polymerization Method

Solvents, polymerization grade toluene and/or isohexanes are supplied by ExxonMobil Chemical Co. and are purified by passing through a series of columns: two 500 $cm^3$ Oxyclear cylinders in series from Labclear (Oakland, California), followed by two 500 $cm^3$ columns in series packed with dried 3 Å molecular sieves (8 mesh-12 mesh; Aldrich Chemical Company), and two 500 $cm^3$ columns in series packed with dried 5 Å molecular sieves (8 mesh-12 mesh; Aldrich Chemical Company).

1-Octene (98%) (Aldrich Chemical Company) is dried by stirring over Na—K alloy overnight followed by filtration through basic alumina (Aldrich Chemical Company, Brockman Basic 1). Tri-(n-octyl)aluminum (TNOA) are purchased from either Aldrich Chemical Company or Akzo Nobel and are used as received.

Polymerization grade ethylene is further purified by passing it through a series of columns: 500 $cm^3$ Oxyclear cylinder from Labclear (Oakland, California) followed by a 500 $cm^3$ column packed with dried 3 Å molecular sieves (8 mesh-12 mesh; Aldrich Chemical Company), and a 500 $cm^3$ column packed with dried 5 Å molecular sieves (8 mesh-12 mesh; Aldrich Chemical Company).

Polymerization grade propylene is further purified by passing it through a series of columns: 2250 $cm^3$ Oxiclear cylinder from Labclear followed by a 2250 $cm^3$ column packed with 3 Å molecular sieves (8 mesh-12 mesh; Aldrich Chemical Company), then two 500 $cm^3$ columns in series packed with 5 Å molecular sieves (8 mesh-12 mesh; Aldrich Chemical Company), a 500 $cm^3$ column packed with Selexsorb CD (BASF), and finally a 500 $cm^3$ column packed with Selexsorb COS (BASF).

N,N-Dimethyanilinium tetrakis(pentafluorophenyl)borate, also referred to as Activator 1, is purchased from W. R. Grace and Co. Methylalumoxane (MAO), also referred to as Activator 2, is purchased from W. R. Grace and Co. as a 10 wt % solution in toluene. All complexes and the activators are added to the reactor as dilute solutions in toluene. The concentrations of the solutions of activator, scavenger, and complexes that are added to the reactor are chosen so that between 40 microliters-200 microliters of the solution are added to the reactor to ensure accurate delivery.

Reactor Description and Preparation. Polymerizations are conducted in an inert atmosphere ($N_2$) drybox using autoclaves equipped with an external heater for temperature control, glass inserts (internal volume of reactor=23.5 mL for $C_2$ and $C_2/C_8$ runs; 22.5 mL for $C_3$ runs), septum inlets, regulated supply of nitrogen, ethylene and propylene, and equipped with disposable polyether ether ketone mechanical stirrers (800 RPM). The autoclaves are prepared by purging with dry nitrogen at 110° C. or 115° C. for 5 hours and then at 25° C. for 5 hours.

Ethylene Polymerization (PE) or Ethylene/1-Octene Copolymerization (EO)

The reactor is prepared as described above, and then is purged with ethylene. Toluene (solvent unless stated otherwise), optional 1-octene (0.1 mL when used), and optional MAO are added via syringe at room temperature and atmospheric pressure. The reactor is then brought to process temperature (typically 80° C.) and charged with ethylene to process pressure (typically 75 psig=618.5 kPa or 200 psig=1480.3 kPa) while stirring at 800 RPM. An optional scavenger solution (e.g., TNOA in isohexane) is then added via syringe to the reactor at process conditions. An optional non-coordinating activator (e.g., N,N-dimethylanilinium tetrakis(pentafluorophenyl)borate) solution (in toluene) is added via syringe to the reactor at process conditions, followed by a pre-catalyst (i.e., complex or catalyst) solution (in toluene) via syringe to the reactor at process conditions. Ethylene is allowed to enter (through the use of computer controlled solenoid valves) the autoclaves during polymerization to maintain reactor gauge pressure (+/−2 psi). Reactor temperature is monitored and typically maintained within +/−1° C. Polymerizations are halted by addition of approximately 50 psi $O_2$/Ar (5 mol % 02) gas mixture (over the reactor pressure) to the autoclaves for approximately 30 seconds. The polymerizations are quenched after a predetermined cumulative amount of ethylene is added or for a maximum of 30 minutes polymerization time. The reactors are cooled and vented. The polymer is isolated after the solvent is removed under reduced pressure. Yields to be reported include total weight of polymer and residual catalyst. Catalyst activity is reported as grams of polymer per mmol transition metal compound per hour of reaction time (g/mmol/hr).

Propylene Polymerization

The reactor is prepared as described above, then heated to 40° C. and purged with propylene gas at atmospheric pressure. Toluene (solvent unless stated otherwise), optional MAO, and liquid propylene (1.0 mL) are added via syringe. The reactor is then heated to process temperature (70° C. or 100° C.) while stirring at 800 RPM. Then optional scavenger solution (e.g., TNOA in isohexane) is added via syringe to the reactor at process conditions. Optional non-coordinating activator (e.g., N,N-dimethylanilinium tetrakis(pentafluorophenyl)borate) solution (in toluene) is then added via syringe to the reactor at process conditions, followed by a pre-catalyst (i.e., complex or catalyst) solution (in toluene) via syringe to the reactor at process conditions. Reactor temperature is monitored and typically maintained within +/−1° C. Polymerizations are halted by addition of approximately 50 psi $O_2$/Ar (5 mol % $O_2$) gas mixture (over the reactor pressure) to the autoclaves for approximately 30 seconds. The polymerizations are quenched based on a predetermined pressure loss of approximately 8 psi or for a maximum of 30 minutes polymerization time. The reactors are cooled and vented. The polymer is isolated after the solvent is removed under reduced pressure. Yields to be reported include total weight of polymer and residual catalyst. Catalyst activities are typically reported as grams of polymer per mmol transition metal compound per hour of reaction time (g/mmol/hr).

Polymer Characterization

For analytical testing, polymer sample solutions are prepared by dissolving the polymer in 1,2,4-trichlorobenzene (TCB, 99+% purity from Sigma-Aldrich) containing 2,6-di-tert-butyl-4-methylphenol (BHT, 99% from Aldrich) at 165° C. in a shaker oven for approximately 3 hours. The typical concentration of polymer in solution is between 0.1 mg/mL to 0.9 mg/mL with a BHT concentration of 1.25 mg BHT/mL of TCB. Samples are cooled to 135° C. for testing.

High temperature size exclusion chromatography is performed using an automated "Rapid GPC" system as described in U.S. Pat. Nos. 6,491,816; 6,491,823; 6,475,391; 6,461,515; 6,436,292; 6,406,632; 6,175,409; 6,454,947; 6,260,407; and 6,294,388; each of which is incorporated herein by reference. Molecular weights (weight average molecular weight (Mw) and number average molecular weight (Mn)) and molecular weight distribution (MWD=Mw/Mn), which is also sometimes referred to as the polydispersity index (PDI) of the polymer, are measured by Gel Permeation Chromatography using a Symyx Technology GPC equipped with evaporative light scattering detector and calibrated using polystyrene standards (Polymer Laboratories: Polystyrene Calibration Kit S-M-10: Mp (peak Mw) between 5,000 and 3,390,000). Samples (250 μL of a polymer solution in TCB are injected into the system) are run at an eluent flow rate of 2.0 mL/minute (135° C. sample temperatures, 165° C. oven/columns) using three Polymer Laboratories: PLgel 10 μm Mixed-B 300×7.5 mm columns in series. No column spreading corrections are employed. Numerical analyses are performed using Epoch® software available from Symyx Technologies or Automation Studio software available from Freeslate. The molecular weights obtained are relative to linear polystyrene standards.

Rapid Differential Scanning Calorimetry (Rapid-DSC) measurements are performed on a TA-Q100 instrument to determine the melting point of the polymers. Samples are pre-annealed at 220° C. for 15 minutes and then allowed to cool to room temperature overnight. The samples are then heated to 220° C. at a rate of 100° C./minute and then cooled at a rate of 50° C./minute. Melting points are collected during the heating period.

Samples for infrared analysis are prepared by depositing the stabilized polymer solution onto a silanized wafer (Part number S10860, Symyx). By this method, approximately between 0.12 mg and 0.24 mg of polymer is deposited on the wafer cell. The samples are subsequently analyzed on a Bruker Equinox 55 FTIR spectrometer equipped with Pikes' MappIR specular reflectance sample accessory. Spectra, covering a spectral range of 5,000 $cm^{-1}$ to 500 $cm^{-1}$, are collected at a 2 $cm^{-1}$ resolution with 32 scans.

For ethylene-1-octene copolymers, the wt % copolymer is determined via measurement of the methyl deformation band at ~1,375 $cm^{-1}$. The peak height of this band is normalized by the combination and overtone band at ~4,321 $cm^{-1}$, which corrects for path length differences. The normalized peak height is correlated to individual calibration curves from $^1$H NMR data to predict the wt % copolymer content within a concentration range of ~2 wt % to 35 wt % for octene. Typically, $R^2$ correlations of 0.98 or greater are achieved. Reported values below 4.1 wt % are outside the calibration range.

Polymerization Examples

Below are described specific conditions for prophetic polymerizations using inventive catalysts, such as Catalyst L. Catalyst L is an active catalyst for olefin polymerization upon activation with N,N-dimethylanilinium tetrakis(pentafluorophenyl)borate (Activator 1) or MAO (Activator 2), respectively.

General conditions for ethylene homopolymerizations using Activator 1: catalyst complex=25 nmol, Activator 1=27.5 nmol, ethylene=75 psig, $Al(n\text{-}octyl)_3$=500 nmol, temperature=80° C., total volume=5 mL, solvent=toluene. Complex L, when activated with Activator 1, forms an active catalyst capable of polymerizing ethylene to form polyethylene. The melting point of the polyethylene samples is in the range of 123-138° C.

General conditions for ethylene homopolymerizations using Activator 2: catalyst complex=25 nmol, Activator 2=0.0125 mmol, ethylene=75 psig, total volume=5 mL, solvent=toluene. Complex L, when activated with Activator 2, forms an active catalyst capable of polymerizing ethylene to form polyethylene. The melting point of the polyethylene samples is in the range of 123-138° C.

General conditions for ethylene-octene copolymerizations using Activator 1: catalyst complex=25 nmol, Activator 1=27.5 nmol, 0.1 mL octene, $Al(n\text{-}octyl)_3$=500 nmol, temperature=80° C., total volume=5 mL, solvent=toluene. Complex L, when activated with Activator 1, forms an active catalyst capable of polymerizing ethylene and octene to form an ethylene-octene copolymer. The melting point of the ethylene-octene copolymer samples is in the range of 60-125° C.

General conditions for ethylene-octene copolymerizations using Activator 2: complex=25 nmol, Activator 2=0.0125 mmol, 0.1 mL octene, temperature=80° C., total volume=5 mL, solvent=toluene. Complex L, when activated with Activator 2, forms an active catalyst capable of polymerizing ethylene and octene to form an ethylene-octene copolymer. The melting point of the ethylene-octene copolymer samples is in the range of 60-125° C.

General conditions for propylene homopolymerizations using Activator 1: catalyst complex=25 nmol, Activator 1=27.5 nmol, propylene=1 mL, $Al(n\text{-}octyl)_{3=500}$ nmol, total volume=5 mL, solvent=isohexane. Complex L, when activated with Activator 1, forms an active catalyst capable of polymerizing propylene to form polypropylene. The melting point of the polypropylene samples is in the range of 85-165° C.

General conditions for propylene homopolymerizations using Activator 2: catalyst complex=40 nmol, Activator 2=0.025 mmol, propylene=1 mL, total volume=5 mL, solvent=toluene. Complex L, when activated with Activator 2, forms an active catalyst capable of polymerizing propylene to form polypropylene. The melting point of the polypropylene samples is in the range of 85-165° C.

Non-Prophetic Examples

Following are examples of complexes embodying the present technological advancement:

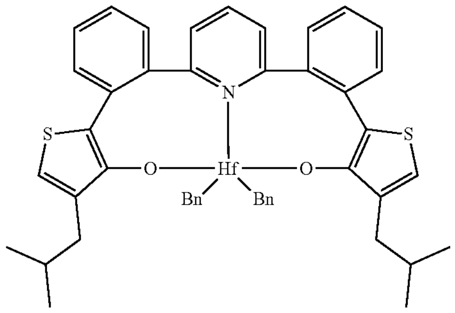

Catalyst 1

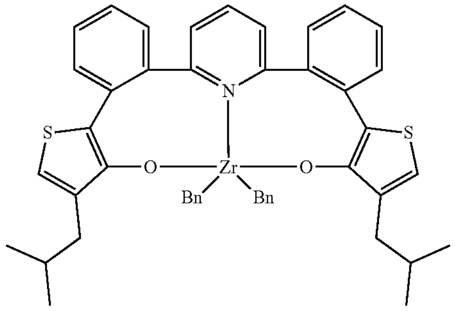

Catalyst 2

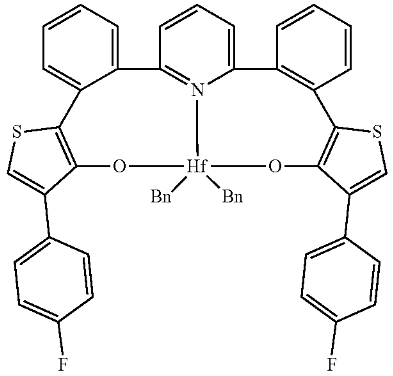

Catalyst 3

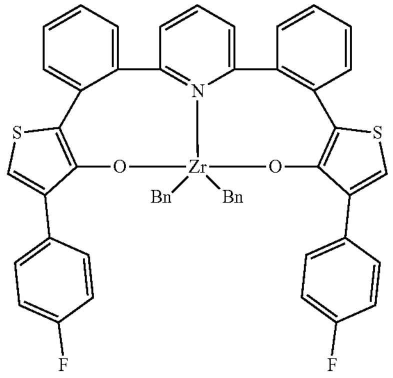

Catalyst 4

-continued

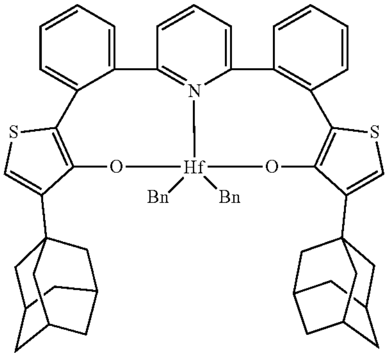

Catalyst 5

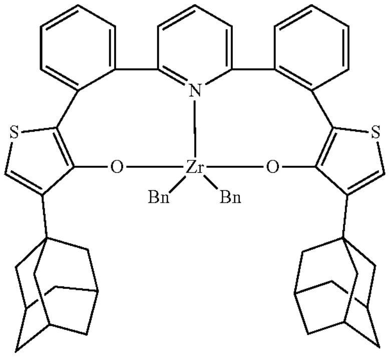

Catalyst 6

General Considerations for Synthesis:

All reagents were purchased from commercial vendors (Sigma Aldrich) and used as received unless otherwise noted. 3-Bromo-4-(ethoxymethoxy)thiophene was prepared using the procedure described in WO2018/236863. 2,6-bis (2-Bromophenyl)pyridine was prepared using the procedure described in WO2020/167821. Solvents were sparged with $N_2$ and dried over 3 Å molecular sieves. All chemical manipulations were performed in a nitrogen environment unless otherwise stated. Flash column chromatography was carried out with Sigma Aldrich silica gel 60 Å (70 Mesh-230 Mesh) using solvent systems specified. NMR spectra were recorded on a Bruker 400 and/or 500 NMR with chemical shifts referenced to residual solvent peaks. All anhydrous solvents were purchased from Fisher Chemical and were degassed and dried over molecular sieves prior to use. Deuterated solvents were purchased from Cambridge Isotope Laboratories and were degassed dried over molecular sieves prior to use. $^1$H NMR spectroscopic data were acquired at 400 MHz, or 500 MHz using solutions prepared by dissolving approximately 10 mg of a sample in either $C_6D_6$, $CD_2Cl_2$, $CDCl_3$, $D_8$-toluene, or other deuterated solvent. The chemical shifts (6) presented are relative to the residual protium in the deuterated solvent at 7.15 ppm, 5.32 ppm, 7.24 ppm, and 2.09 ppm for $C_6D_6$, $CD_2Cl_2$, $CDCl_3$, and $D_8$-toluene, respectively.

Synthesis of Ligands and Catalysts

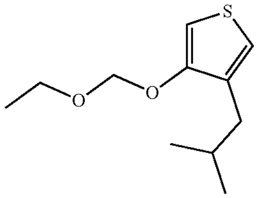

3-(ethoxymethoxy)-4-isobutylthiophene. To a solution of $ZnCl_2$ (0.69 g, 5 mmol) in tetrahydrofuran (10 mL) was slowly added a pentane solution of tert-butyllithium (2.98 mL, 1.7 M, 5 mmol). The reaction mixture was stirred at ambient temperature for 5 minutes. 3-Bromo-4-(ethoxymethoxy)thiophene (0.8 g, 3.4 mmol) and $Pd(P^tBu_3)_2$ (140 mg, 0.17 mmol) were subsequently added. The reaction mixture was stirred overnight at 70° C., then concentrated to dryness. The resulting mixture was slurried into toluene and hexane. The supernatant was then purified by flash chromatography on silica gel (10%-20% dichloromethane in hexane). Yield 0.54 g (75%) of a clear oil. $^1$H NMR ($CDCl_3$, 400 MHz): δ 6.80 (d, J=3.3 Hz, 1H), 6.50 (d, J=3.2 Hz, 1H), 5.16 (s, 2H), 3.71 (q, J=7.1 Hz, 2H), 2.38 (d, J=7.1 Hz, 2H), 1.90 (dt, J=13.5, 6.7 Hz, 1H), 1.24 (t, J=7.1 Hz, 3H), 0.91 (d, J=6.7 Hz, 6H).

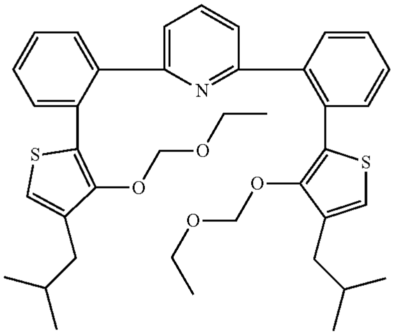 [SMILES: CCOCOc1c(CC(C)C)csc1-c1ccccc1-c1cccc(-c2ccccc2-c2scc(CC(C)C)c2OCOCC)n1]

2,6-bis(2-(3-(ethoxymethoxy)-4-isobutylthiophen-2-yl) phenyl)pyridine. To a solution of 3-(ethoxymethoxy)-4-isobutylthiophene (0.52 g, 2.43 mmol) in tetrahydrofuran (10 mL) was added a hexanes solution of n-butyllithium (0.22 mL, 11 M, 2.43 mmol). The reaction mixture was stirred at ambient temperature for 30 minutes. $ZnCl_2$ (0.35 g, 2.43 mmol) was then added and the reaction was stirred for 5 minutes. 2,6-bis(2-Bromophenyl)pyridine (0.45 g, 1.16 mmol) and $Pd(P^tBu_3)_2$ (78 mg, 0.09 mmol) were subsequently added. The reaction mixture was stirred overnight at 70° C., then concentrated to dryness. The mixture was then slurried into toluene. The supernatant was then purified by flash chromatography on silica gel (25% dichloromethane and 2%-5% acetone in hexane). Yield 0.6 g (79%) of a clear oil. $^1$H NMR ($CDCl_3$, 400 MHz): δ 7.66-7.58 (m, 2H), 7.55-7.49 (m, 2H), 7.44-7.34 (m, 4H), 7.28-7.21 (m, 1H), 7.02 (d, J=7.7 Hz, 2H), 6.77 (s, 2H), 4.75 (s, 4H), 3.42 (q, J=7.0 Hz, 4H), 2.32 (d, J=7.1 Hz, 4H), 1.82 (dt, J=13.5, 6.8 Hz, 2H), 0.95 (t, J=7.2 Hz, 6H), 0.86 (d, J=6.6 Hz, 12H).

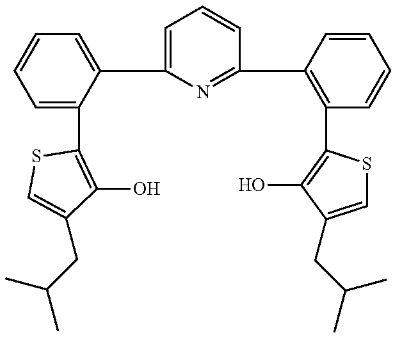 [SMILES: CC(C)Cc1csc(-c2ccccc2-c2cccc(-c3ccccc3-c3scc(CC(C)C)c3O)n2)c1O]

2,2'-(pyridine-2,6-diylbis(2,1-phenylene))bis(4-isobutylthiophen-3-ol). To a solution of 2,6-bis(2-(3-(ethoxymethoxy)-4-isobutylthiophen-2-yl)phenyl)pyridine (0.6 g, 0.9 mmol) in 1,4-dioxane/$CH_2Cl_2$ (180 mL, 1:2) under nitrogen was added concentrated HCl (40 mL). The reaction mixture was stirred for 24 hours and then basified using NaOH (aq). Organics were extracted from the aqueous layer using $CH_2Cl_2$ (2×50 mL), combined, and dried over solid $MgSO_4$. All solvent was subsequently removed under vacuum in an inert atmosphere ($N_2$) drybox. The resultant dark red amorphous foam was dissolved in $CH_2C_{12}$ (5 mL), suction filtered over a pad of silica gel, and rinsed with $CH_2Cl_2$ (4×20 mL). The dichloromethane was then removed under vacuum. The product was slurried into 5 mL of pentane for 10 minutes. The pure product was collected by filtration as a white solid (0.22 g, 45%). $^1H$ NMR ($CDCl_3$, 400 MHz) δ 8.73 (s, 2H), 7.76 (t, J=7.8 Hz, 1H), 7.55-7.37 (m, 8H), 7.33 (d, J=7.8 Hz, 2H), 6.63 (s, 2H), 2.10 (d, J=7.0 Hz, 4H), 1.45 (dt, J=13.5, 6.7 Hz, 2H), 0.64 (d, J=6.5 Hz, 12H).

Dibenzylhafnium[2,2'-(pyridine-2,6-diylbis(2,1-phenylene))bis(4-isobutylthiophen-3-olate)](Catalyst 1). Toluene (3 mL) was added to tetrabenzylhafnium (40 mg, 0.07 mmol) and 2,2'-(pyridine-2,6-diylbis(2,1-phenylene))bis(4-isobutylthiophen-3-ol) (40 mg, 0.07 mmol). The reaction mixture was stirred for 1 hour. The volatiles were evaporated, and the crude product was stirred in pentane (2 mL) for 15 minutes. The product was collected by filtration as a yellow solid (42 mg, 62%). $^1H$ NMR ($CD_2Cl_2$, 400 MHz) a 7.83 (t, J=7.8 Hz, 1H), 7.74-7.49 (m, 6H), 7.28 (d, J=7.8 Hz, 2H), 7.21-7.13 (m, 2H), 6.99-6.89 (m, 4H), 6.82 (s, 2H), 6.69 (t, J=7.3 Hz, 2H), 6.43 (d, J=7.6 Hz, 4H), 2.25 (d, J=7.0 Hz, 4H), 1.87 (dt, J=13.5, 6.7 Hz, 2H), 0.97 (d, J=11.8 Hz, 2H), 0.92 (d, J=6.6 Hz, 6H), 0.85 (d, J=6.4 Hz, 6H), 0.77 (d, J=12.2 Hz, 2H).

Dibenzylzirconium[2,2'-(pyridine-2,6-diylbis(2,1-phenylene))bis(4-isobutylthiophen-3-olate)](Catalyst 2). Toluene (3 mL) was added to tetrabenzylzirconium (59 mg, 0.13 mmol) and 2,2'-(pyridine-2,6-diylbis(2,1-phenylene))bis(4-isobutylthiophen-3-ol) (70 mg, 0.13 mmol). The reaction mixture was stirred for 1 hour. The volatiles were evaporated, and the crude product was stirred in pentane (2 mL) for 15 minutes. The product was collected by filtration as a yellow solid (80 mg, 76%). $^1H$ NMR ($CD_2Cl_2$, 400 MHz) δ 7.82 (t, J=7.8 Hz, 1H), 7.69-7.49 (m, 6H), 7.25 (d, J=7.5 Hz, 2H), 7.16 (d, J=7.8 Hz, 2H), 6.92 (t, J=7.5 Hz, 4H), 6.81 (s, 2H), 6.71 (t, J=7.4 Hz, 2H), 6.42 (d, J=7.6 Hz, 4H), 2.30 (d, J=7.0 Hz, 4H), 1.90 (dt, J=13.4, 6.8 Hz, 2H), 1.31 (d, J=11.1 Hz, 2H), 1.00 (d, J=11.2 Hz, 2H), 0.93 (d, J=6.7 Hz, 6H), 0.87 (d, J=6.6 Hz, 6H).

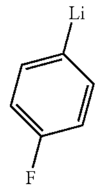

p-fluorophenyl lithium. To a solution of p-fluorophenyl bromide (0.875 g, 5 mmol) in diethyl ether (20 mL) was added a hexanes solution of n-butyllithium (0.45 mL, 11 M, 5 mmol). The reaction mixture was stirred for 30 minutes, then concentrated to dryness. The crude product was slurried into 5 mL of hexane and stirred for 15 minutes. The product was collected as a yellow solid (0.21 g, 41%) by filtration. $^1H$ NMR (THF-$d_8$, 400 MHz) δ 7.74 (s, 2H), 6.56 (s, 2H).

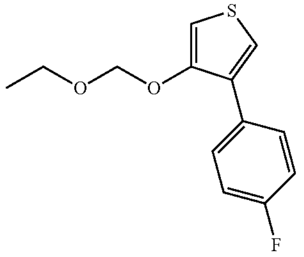 [SMILES: CCOCOc1cscc1-c1ccc(F)cc1]

3-(ethoxymethoxy)-4-(4-fluorophenyl)thiophene. To a solution of p-fluorophenyl lithium (0.20 g, 1.8 mmol) in tetrahydrofuran (10 mL) was slowly added $ZnCl_2$ (0.24 g, 1.8 mmol). The reaction mixture was stirred at ambient temperature for 5 minutes. 3-Bromo-4-(ethoxymethoxy)thiophene (0.39 g, 1.6 mmol) and $Pd(P^tBu_3)_2$ (42 mg, 0.09 mmol) were subsequently added. The resulting mixture was stirred overnight at 70° C., then concentrated to dryness. The mixture was then slurried into toluene and hexane. The supernatant was then purified by flash chromatography on silica gel (20% dichloromethane in hexane). Yield 0.41 g (75%) of a clear oil. 1H NMR ($CDCl_3$, 400 MHz) δ 7.58 (dd, J=8.7, 5.5 Hz, 2H), 7.20 (d, J=3.5 Hz, 1H), 7.08 (t, J=8.8 Hz, 2H), 6.71 (d, J=3.5 Hz, 1H), 5.20 (s, 2H), 3.72 (q, J=7.1 Hz, 2H), 1.24 (t, J=7.1 Hz, 3H). $^{19}F$ NMR ($CDCl_3$, 376 MHz) δ −115.33.

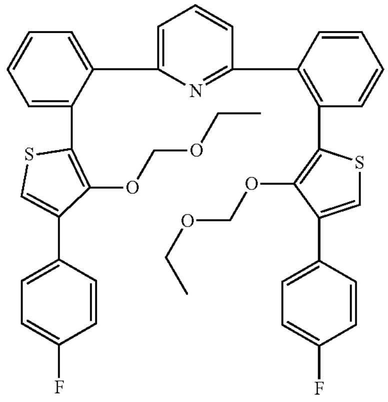 [SMILES: CCOCOc1c(-c2ccc(F)cc2)csc1-c1ccccc1-c1cccc(-c2ccccc2-c2scc(-c3ccc(F)cc3)c2OCOCC)n1]

2,6-bis(2-(3-(ethoxymethoxy)-4-(4-fluorophenyl)thiophen-2-yl)phenyl)pyridine. To a solution of 3-(ethoxymethoxy)-4-(4-fluorophenyl)thiophene (0.30 g, 1.2 mmol) in tetrahydrofuran (5 mL) was added a hexanes solution of n-butyllithium (0.11 mL, 11 M, 1.2 mmol). The reaction mixture was stirred at ambient temperature for 30 minutes. $ZnCl_2$ (0.24 g, 1.8 mmol) was then added and the reaction was stirred for 5 minutes. 2,6-bis(2-Bromophenyl) pyridine (0.21 g, 0.54 mmol) and $Pd(P^tBu_3)_2$ (54 mg, 0.06 mmol) were subsequently added. The resulting mixture was stirred overnight at 70° C., then concentrated to dryness. The mixture was then slurried into toluene. The supernatant was then purified by flash chromatography on silica gel. Yield 0.19 g (21%) of a clear oil. $^1H$ NMR ($CDCl_3$, 400 MHz) δ 7.66-7.57 (m, 4H), 7.52-7.39 (m, 9H), 7.23 (d, J=7.8 Hz, 2H), 7.14 (s, 2H), 7.05 (t, J=8.5 Hz, 4H), 4.62 (s, 4H), 3.11 (q, J=7.0 Hz, 4H), 0.72 (t, J=7.0 Hz, 6H). $^{19}F$ NMR ($CDCl_3$, 376 MHz) δ −115.07.

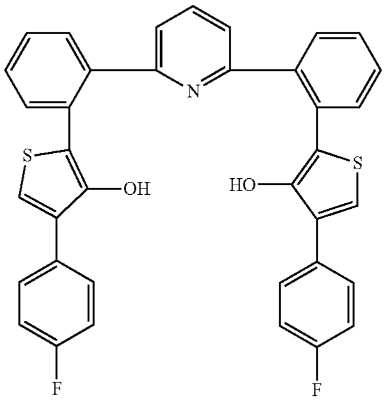 [SMILES: Oc1c(-c2ccc(F)cc2)csc1-c1ccccc1-c1cccc(-c2ccccc2-c2scc(-c3ccc(F)cc3)c2O)n1]

2,2'-(pyridine-2,6-diylbis(2,1-phenylene))bis(4-(4-fluorophenyl)thiophen-3-01). To a solution of 2,6-bis(2-(3-(ethoxymethoxy)-4-(4-fluorophenyl)thiophen-2-yl)phenyl) pyridine (0.19 g, 0.26 mmol) in 1,4-dioxane/$CH_2Cl_2$ (60 ml, 1:2) under nitrogen was added concentrated HCl (15 mL). The reaction mixture was stirred for 24 hours and then basified using NaOH (aq). Organics were extracted from the aqueous layer using $CH_2Cl_2$ (2×30 mL), combined, and dried over solid $MgSO_4$. All solvent was subsequently removed under vacuum in an inert atmosphere ($N_2$) drybox. The resultant dark red amorphous foam was dissolved in $CH_2Cl_2$ (5 mL), suction filtered over a pad of silica gel, and rinsed with $CH_2Cl_2$ (4×5 mL). The dichloromethane was then removed under vacuum. The product was slurried into 2 mL of pentane for 10 minutes. The pure product was collected by filtration as a white solid (0.15 g, 94%). $^1H$ NMR ($CDCl_3$, 400 MHz) δ 8.71 (s, 2H), 7.78 (t, J=7.8 Hz, 1H), 7.53 (t, J=3.7 Hz, 6H), 7.43 (td, J=7.9, 6.7, 3.8 Hz, 2H), 7.36 (d, J=7.8 Hz, 2H), 7.19-7.09 (m, 4H), 7.02 (s, 2H), 6.90 (t, J=8.7 Hz, 4H). $^{19}F$ NMR ($CDCl_3$, 376 MHz) δ −115.67.

Dibenzylhafnium[2,2'-(pyridine-2,6-diylbis(2,1-phenylene))bis(4-fluorophenylthiophen-3-olate)](Catalyst 3). Toluene (3 mL) was added to tetrabenzylhafnium (44 mg, 0.08 mmol) and 2,2'-(pyridine-2,6-diylbis(2,1-phenylene)) bis(4-(4-fluorophenyl)thiophen-3-ol) (50 mg, 0.08 mmol). The reaction mixture was stirred for 4 hours, then concentrated to dryness. The crude product was dissolved in a minimal amount of dichloromethane. Pentane (2 mL) was added, and the resulting mixture was stirred for 15 minutes. The product was collected by filtration as a yellow solid. $^1H$ NMR ($CD_2Cl_2$, 400 MHz) δ 7.83 (t, J=7.8 Hz, 1H), 7.67 (dd, J=8.9, 3.4 Hz, 4H), 7.60 (td, J=7.6, 1.3 Hz, 2H), 7.33-7.02 (m, 14H), 6.94-6.84 (m, 4H), 6.68 (t, J=7.3 Hz, 2H), 6.34 (d, J=7.6 Hz, 4H), 1.40 (d, J=12.0 Hz, 2H), 0.15 (d, J=12.3 Hz, 2H). $^{19}F$ NMR ($CD_2Cl_2$, 376 MHz) δ −116.15.

Dibenzylzirconium[2,2'-(pyridine-2,6-diylbis(2,1-phenylene))bis(4-fluorophenylthiophen-3-olate)](Catalyst 4). Toluene (3 mL) was added to tetrabenzylzirconium (37 mg, 0.08 mmol) and 2,2'-(pyridine-2,6-diylbis(2,1-phenylene)) bis(4-(4-fluorophenyl)thiophen-3-ol) (50 mg, 0.08 mmol). The reaction mixture was stirred for 4 hours, then concentrated to dryness. The crude product was dissolved in a minimal amount of dichloromethane. Pentane (2 mL) was added, and the resulting mixture was stirred for 15 minutes. The product was collected by filtration as a yellow solid. $^1H$ NMR ($CD_2Cl_2$, 400 MHz) δ 7.79 (t, J=7.8 Hz, 1H), 7.71-7.58 (m, 4H), 7.53 (t, J=7.6 Hz, 2H), 7.29-6.98 (m, 14H), 6.89-6.77 (m, 4H), 6.65 (t, J=7.4 Hz, 2H), 6.28 (d, J=7.8 Hz, 4H), 1.56 (d, J=11.3 Hz, 2H), 0.42 (d, J=11.3 Hz, 2H). $^{19}F$ NMR ($CD_2Cl_2$, 376 MHz) δ −116.14.

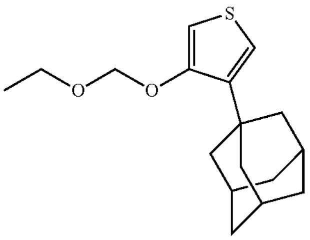 [SMILES: CCOCOc1cscc1C12CC3CC(CC(C3)C1)C2]

3-(1-adamantyl)-4-(ethoxymethoxy)thiophene. Tetrahydrofuran (7 mL) was added to anhydrous lithium chloride (108 mg, 2.6 mmol) and magnesium power (113 mg, 4.6 mmol). 1,2-Dibromoethane (5 mol %) and TMSCl (5 mol %) were added to activate the magnesium power. Zinc dichloride (350 mg, 2.6 mmol) in tetrahydrofuran (2.6 ml) and 1-bromoadamantane (0.5 g, 2.3 mmol) were subsequently added. The reaction mixture was then stirred overnight at ambient temperature. 3-Bromo-4-(ethoxymethoxy) thiophene (0.5 g, 2.1 mmol) and $Pd(P^tBu_3)_2$ (85 mg, 0.1 mmol) were then added. The resulting mixture was stirred overnight at 70° C. The crude product was purified by flash chromatography on silica gel (30% dichloromethane and 2% acetone in hexane). Yield 0.19 g (29%) of a white solid. $^1H$ NMR ($CDCl_3$, 400 MHz) δ 6.76 (d, J=3.4 Hz, 1H), 6.53 (d, J=3.5 Hz, 1H), 5.18 (s, 2H), 3.73 (q, J=7.1 Hz, 2H), 2.01 (br, 8H), 1.75 (br, 6H), 1.25 (t, J=7.0 Hz, 3H).

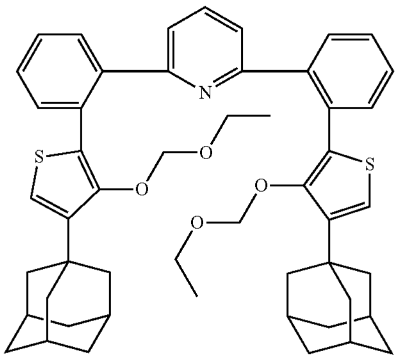 [SMILES: CCOCOc1c(C23CC4CC(CC(C4)C2)C3)csc1-c1ccccc1-c1cccc(-c2ccccc2-c2scc(C34CC5CC(CC(C5)C3)C4)c2OCOCC)n1]

2,6-bis[2-[4-(1-adamantyl)-3-(ethoxymethoxy)-2-thienyl]phenyl]pyridine. To a solution of 3-(1-adamantyl)-4-(ethoxymethoxy)thiophene (0.25 g, 0.8 mmol) in diethyl ether (5 ml) was added a hexanes solution of n-butyllithium (0.078 mL, 11 M, 0.8 mmol). The reaction mixture was stirred at ambient temperature for 1 hour, then concentrated to dryness. $ZnCl_2$ (93 mg, 0.7 mmol) and tetrahydrofuran (5 mL) were then added, and the reaction mixture was stirred for 5 minutes. 2,6-bis(2-Bromophenyl)pyridine (0.12 g, 0.3 mmol) and $Pd(P^tBu_3)_2$ (30 mg, 0.03 mmol) were subsequently added. The resulting mixture was stirred overnight at 70° C. The crude product was purified by flash chromatography on silica gel (25% dichloromethane and 3% acetone in hexane). Yield 0.20 g (57%) of a white solid. $^1H$ NMR ($CDCl_3$, 400 MHz) δ 7.52 (s, 2H), 7.39 (s, 2H), 7.32 (t, J=7.8 Hz, 1H), 6.94 (d, J=7.8 Hz, 2H), 6.74 (s, 2H), 4.74 (s, 4H), 3.44 (q, J=7.2 Hz, 4H), 1.93 (s, 6H), 1.71 (s, 8H), 0.98 (t, J=7.1 Hz, 6H).

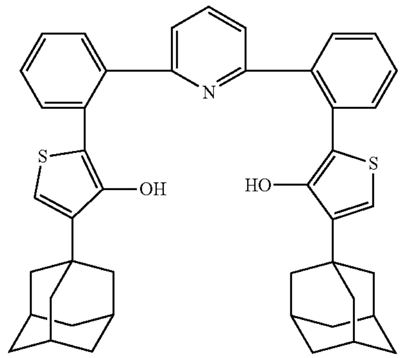 [SMILES: Oc1c(C23CC4CC(CC(C4)C2)C3)csc1-c1ccccc1-c1cccc(-c2ccccc2-c2scc(C34CC5CC(CC(C5)C3)C4)c2O)n1]

2,2'-(pyridine-2,6-diylbis(2,1-phenylene))bis(4-(1-adamantyl)thiophen-3-ol). To a solution of 2,6-bis[2-[4-(1-adamantyl)-3-(ethoxymethoxy)-2-thienyl]phenyl]pyridine (0.20 g, 0.25 mmol) in 1,4-dioxane/$CH_2Cl_2$ (60 ml, 1:2) under nitrogen was added concentrated HCl (15 mL). The reaction mixture was stirred for 24 hours and then basified using NaOH (aq). Organics were extracted from the aqueous layer using $CH_2Cl_2$ (2×30 mL), combined, and dried over solid $MgSO_4$. All solvent was subsequently removed under vacuum in an inert atmosphere ($N_2$) drybox. The resultant dark red amorphous foam was dissolved in $CH_2C_{12}$ (5 mL), suction filtered over a pad of silica gel, and rinsed with $CH_2Cl_2$ (4×5 mL). The dichloromethane was then removed under vacuum. The product was slurried into 2 mL of pentane for 10 minutes. The pure product was collected by filtration as a white solid (0.15 g, 94%). $^1H$ NMR ($CDCl_3$, 400 MHz) δ 8.82 (s, 2H), 7.77 (t, J=7.8 Hz, 1H), 7.57-7.37 (m, 8H), 7.32 (d, J=7.8 Hz, 2H), 6.58 (s, 2H), 1.86 (s, 6H), 1.60 (s, 24H).

Dibenzylhafnium[2,2'-(pyridine-2,6-diylbis(2,1-phenylene))bis(4-(1-adamantyl)thiophen-3-olate)](Catalyst 5). Toluene (3 mL) was added to tetrabenzylhafnium (39 mg, 0.07 mmol) and 2,2'-(pyridine-2,6-diylbis(2,1-phenylene)) bis(4-(1-adamantyl)thiophen-3-ol) (50 mg, 0.07 mmol). The reaction mixture was stirred for 4 hours, then concentrated to dryness. The crude product was dissolved in a minimal amount of dichloromethane. Pentane (2 mL) was added, and the resulting mixture was stirred for 15 minutes. The product was collected by filtration as a yellow solid.

Dibenzylzirconium[2,2'-(pyridine-2,6-diylbis(2,1-phenylene))bis(4-(1-adamantyl)thiophen-3-olate)](Catalyst 6). Toluene (3 mL) was added to tetrabenzylzirconium (33 mg, 0.07 mmol) and 2,2'-(pyridine-2,6-diylbis(2,1-phenylene)) bis(4-(1-adamantyl)thiophen-3-ol) (50 mg, 0.07 mmol). The reaction mixture was stirred for 4 hours, then concentrated to dryness. The crude product was dissolved in a minimal amount of dichloromethane. Pentane (2 mL) was added, and the resulting mixture was stirred for 15 minutes. The product was collected by filtration as a yellow solid.

General Olefin Polymerization Method

Solvents, polymerization grade toluene and/or isohexanes were supplied by ExxonMobil Chemical Co. and were purified by passing through a series of columns: two 500 $cm^3$ Oxyclear cylinders in series from Labclear (Oakland, California), followed by two 500 $cm^3$ columns in series packed with dried 3 Å molecular sieves (8 mesh-12 mesh; Aldrich Chemical Company), and two 500 $cm^3$ columns in series packed with dried 5 Å molecular sieves (8 mesh-12 mesh; Aldrich Chemical Company).

1-Octene (98%) (Aldrich Chemical Company) was dried by stirring over Na—K alloy overnight followed by filtration through basic alumina (Aldrich Chemical Company, Brockman Basic 1). Tri-(n-octyl)aluminum (TNOA) was purchased from either Aldrich Chemical Company or Akzo Nobel and used as received.

Polymerization grade ethylene was further purified by passing it through a series of columns: 500 $cm^3$ Oxyclear cylinder from Labclear (Oakland, California) followed by a 500 $cm^3$ column packed with dried 3 Å molecular sieves (8 mesh-12 mesh; Aldrich Chemical Company), and a 500 $cm^3$ column packed with dried 5 Å molecular sieves (8 mesh-12 mesh; Aldrich Chemical Company).

Polymerization grade propylene was further purified by passing it through a series of columns: 2250 $cm^3$ Oxiclear cylinder from Labclear followed by a 2250 $cm^3$ column packed with 3 Å molecular sieves (8 mesh-12 mesh; Aldrich Chemical Company), then two 500 $cm^3$ columns in series packed with 5 Å molecular sieves (8 mesh-12 mesh; Aldrich Chemical Company), a 500 $cm^3$ column packed with Selexsorb CD (BASF), and finally a 500 $cm^3$ column packed with Selexsorb COS (BASF).

N,N-Dimethyanilinium tetrakis(pentafluorophenyl)borate, also referred to as Activator 1, was purchased from W. R. Grace and Co. All complexes and the activators were added to the reactor as dilute solutions in toluene. The concentrations of the solutions of activator, scavenger, and complexes that were added to the reactor were chosen so that between 40 microliters-200 microliters of the solution were added to the reactor to ensure accurate delivery.

Reactor Description and Preparation. Polymerizations were conducted in an inert atmosphere ($N_2$) drybox using autoclaves equipped with an external heater for temperature control, glass inserts (internal volume of reactor=23.5 mL for $C_2$ and $C_2/C_8$ runs; 22.5 mL for $C_3$ runs), septum inlets, regulated supply of nitrogen, ethylene and propylene, and equipped with disposable polyether ether ketone mechanical stirrers (800 RPM). The autoclaves were prepared by purging with dry nitrogen at 110° C. or 115° C. for 5 hours and then at 25° C. for 5 hours.

Ethylene Polymerization (PE) or Ethylene/1-Octene Copolymerization (EO)

The reactor was prepared as described above, and then purged with ethylene. Toluene (solvent unless stated otherwise), optional 1-octene (0.1 mL when used), and optional MAO were added via syringe at room temperature and atmospheric pressure. The reactor was then brought to process temperature (typically 80° C.) and charged with ethylene to process pressure (typically 75 psig=618.5 kPa or 200 psig=1480.3 kPa) while stirring at 800 RPM. An optional scavenger solution (e.g., TNOA in isohexane) was then added via syringe to the reactor at process conditions. An optional non-coordinating activator (e.g., N,N-dimethylanilinium tetrakis(pentafluorophenyl)borate) solution (in toluene) was added via syringe to the reactor at process conditions, followed by a pre-catalyst (i.e., complex or catalyst) solution (in toluene) via syringe to the reactor at process conditions. Ethylene was allowed to enter (through the use of computer controlled solenoid valves) the autoclaves during polymerization to maintain reactor gauge pressure (+/−2 psi). Reactor temperature was monitored and typically maintained within +/−1° C. Polymerizations were halted by addition of approximately 50 psi 02/Ar (5 mol % 02) gas mixture (over the reactor pressure) to the autoclaves for approximately 30 seconds. The polymerizations were quenched after a predetermined cumulative amount of ethylene had been added or for a maximum of 30 minutes polymerization time. The reactors were cooled and vented. The polymer was isolated after the solvent was removed under reduced pressure. Yields reported include total weight of polymer and residual catalyst. Catalyst activity is reported as grams of polymer per mmol transition metal compound per hour of reaction time (g/mmol/hr).

Propylene Polymerization

The reactor was prepared as described above, then heated to 40° C. and purged with propylene gas at atmospheric pressure. Toluene (solvent unless stated otherwise) and liquid propylene (1.0 mL) were added via syringe. The reactor was then heated to process temperature (70° C. or 100° C.) while stirring at 800 RPM. Then optional scavenger solution (e.g., TNOA in isohexane) was added via syringe to the reactor at process conditions. Optional non-coordinating activator (e.g., N,N-dimethylanilinium tetrakis(pentafluorophenyl)borate) solution (in toluene) was then added via syringe to the reactor at process conditions, followed by a pre-catalyst (i.e., complex or catalyst) solution (in toluene) via syringe to the reactor at process conditions. Reactor temperature was monitored and typically maintained within +/−1° C. Polymerizations were halted by addition of approximately 50 psi $O_2$/Ar (5 mol % $O_2$) gas mixture (over the reactor pressure) to the autoclaves for approximately 30 seconds. The polymerizations were quenched based on a predetermined pressure loss of approximately 8 psi or for a maximum of 30 minutes polymerization time. The reactors were cooled and vented. The polymer was isolated after the solvent was removed under reduced pressure. Yields reported include total weight of polymer and residual catalyst. Catalyst activities are typically reported as grams of polymer per mmol transition metal compound per hour of reaction time (g/mmol/hr).

Polymer Characterization

For analytical testing, polymer sample solutions were prepared by dissolving the polymer in 1,2,4-trichlorobenzene (TCB, 99+% purity from Sigma-Aldrich) containing 2,6-di-tert-butyl-4-methylphenol (BHT, 99% from Aldrich) at 165° C. in a shaker oven for approximately 3 hours. The typical concentration of polymer in solution was between 0.1 mg/mL to 0.9 mg/mL with a BHT concentration of 1.25 mg BHT/mL of TCB. Samples were cooled to 135° C. for testing.

High temperature size exclusion chromatography was performed using an automated "Rapid GPC" system as described in U.S. Pat. Nos. 6,491,816; 6,491,823; 6,475,391; 6,461,515; 6,436,292; 6,406,632; 6,175,409; 6,454,947; 6,260,407; and 6,294,388; each of which is incorporated herein by reference. Molecular weights (weight average molecular weight (Mw) and number average molecular weight (Mn)) and molecular weight distribution (MWD=Mw/Mn), which is also sometimes referred to as the polydispersity index (PDI) of the polymer, were measured by Gel Permeation Chromatography using a Symyx Technology GPC equipped with evaporative light scattering detector and calibrated using polystyrene standards (Polymer Laboratories: Polystyrene Calibration Kit S-M-10: Mp (peak Mw) between 5,000 and 3,390,000). Samples (250 μL of a polymer solution in TCB are injected into the system) were run at an eluent flow rate of 2.0 mL/minute (135° C. sample temperatures, 165° C. oven/columns) using three Polymer Laboratories: PLgel 10 μm Mixed-B 300×7.5 mm columns in series. No column spreading corrections were employed. Numerical analyses were performed using Epoch® software available from Symyx Technologies or Automation Studio software available from Freeslate. The molecular weights obtained are relative to linear polystyrene standards.

Rapid Differential Scanning Calorimetry (Rapid-DSC) measurements were performed on a TA-Q100 instrument to determine the melting point of the polymers. Samples were pre-annealed at 220° C. for 15 minutes and then allowed to cool to room temperature overnight. The samples were then heated to 220° C. at a rate of 100° C./minute and then cooled at a rate of 50° C./minute. Melting points were collected during the heating period.

Samples for infrared analysis were prepared by depositing the stabilized polymer solution onto a silanized wafer (Part number S10860, Symyx). By this method, approximately between 0.12 mg and 0.24 mg of polymer was deposited on the wafer cell. The samples were subsequently analyzed on a Bruker Equinox 55 FTIR spectrometer equipped with Pikes' MappIR specular reflectance sample accessory. Spectra, covering a spectral range of 5,000 $cm^{-1}$ to 500 $cm^{-1}$, were collected at a 2 $cm^{-1}$ resolution with 32 scans.

For ethylene-1-octene copolymers, the wt % copolymer was determined via measurement of the methyl deformation band at ~1,375 $cm^{-1}$. The peak height of this band was normalized by the combination and overtone band at ~4,321 $cm^{-1}$, which corrects for path length differences. The normalized peak height was correlated to individual calibration curves from $^1H$ NMR data to predict the wt % copolymer content within a concentration range of ~2 wt % to 35 wt % for octene. Typically, $R^2$ correlations of 0.98 or greater were achieved. Reported values below 4.1 wt % are outside the calibration range.

Polymerization Examples

Below Table 1 illustrates ethylene polymerization results obtained using catalyst complexes 1 through 4. General conditions: catalyst complex=25 nmol, N,N-dimethylanilinium tetrakis(pentafluorophenyl)borate activator=1.1 equiv, 75 psig ethylene, Al(n-octyl)$_3$=500 nmol, temperature=80° C., total volume=5 mL.

TABLE 1

| Run | Catalyst | Quench t (s) | Yield (g) | Activity (gP · $mmolcat^{-1}$ · $h^{-1}$) |
|---|---|---|---|---|
| 1 | 1 | 1,801 | 0.0057 | 456 |
| 2 | 1 | 1,801 | 0.0099 | 792 |
| 3 | 1 | 1,801 | 0.004 | 320 |
| 4 | 2 | 1,801 | 0.0085 | 680 |
| 5 | 2 | 1,801 | 0.0073 | 584 |
| 6 | 2 | 1,801 | 0.0075 | 600 |
| 7 | 3 | 1,801 | 0.0021 | 168 |
| 8 | 3 | 1,800 | 0.0052 | 416 |
| 9 | 3 | 1,801 | 0.0065 | 520 |
| 10 | 4 | 72 | 0.0356 | 71,498 |
| 11 | 4 | 68 | 0.0373 | 79,105 |
| 12 | 4 | 82 | 0.0334 | 58,941 |

TABLE 1-continued

| Run | Mn (g/mol) | Mw (g/mol) | Mz (g/mol) | PDI | Tm (° C.) |
|---|---|---|---|---|---|
| 1 | | | | | |
| 2 | 1,581 | 2,699 | 5,768 | 1.7 | 125 |
| 3 | | | | | |
| 4 | | | | | |
| 5 | | | | | |
| 6 | | | | | |
| 7 | | | | | |
| 8 | | | | | |
| 9 | | | | | |
| 10 | 2,930 | 5,369 | 11,614 | 1.8 | 123 |
| 11 | 3,021 | 5,802 | 14,461 | 1.9 | 122 |
| 12 | 3,190 | 5,640 | 12,820 | 1.8 | 123 |

Table 2 illustrates ethylene-octene copolymerization results obtained using Catalysts 1 through 4. General conditions: catalyst complex=25 nmol, N,N-dimethylanilinium tetrakis(pentafluorophenyl)borate activator=27.5 nmol, 0.1 mL octene, Al(n-octyl)$_3$=500 nmol, temperature=80° C., total volume=5 mL, ethylene=75 psi.

TABLE 2

| Run | Catalyst | Quench t (s) | Yield (g) | Activity (gP · mmolcat$^{-1}$ · h$^{-1}$) |
|---|---|---|---|---|
| 1 | 1 | 1,801 | 0.0016 | 128 |
| 2 | 1 | 1,801 | 0.0008 | 64 |
| 3 | 1 | 1,801 | 0.0001 | 8 |
| 4 | 2 | 1,800 | 0.0082 | 656 |
| 5 | 2 | 1,801 | 0.0064 | 512 |
| 6 | 2 | 1,801 | 0.008 | 640 |
| 7 | 3 | 1,803 | 0.0056 | 447 |
| 8 | 3 | 1,800 | 0.0052 | 416 |
| 9 | 3 | 1,801 | 0.006 | 480 |
| 10 | 4 | 130 | 0.0287 | 31,864 |
| 11 | 4 | 109 | 0.0338 | 44,571 |
| 12 | 4 | 105 | 0.0333 | 45,538 |

| Run | Mn (g/mol) | Mw (g/mol) | Mz (g/mol) | PDI | Tm (° C.) |
|---|---|---|---|---|---|
| 1 | | | | | |
| 2 | | | | | |
| 3 | | | | | |
| 4 | | | | | |
| 5 | | | | | |
| 6 | | | | | |
| 7 | | | | | |
| 8 | | | | | |
| 9 | | | | | |
| 10 | 2,653 | 4,574 | 10,053 | 1.7 | 119 |
| 11 | 2,668 | 4,699 | 9,789 | 1.8 | 119 |
| 12 | 2,823 | 5,111 | 12,522 | 1.8 | 119 |

Table 3 illustrates ethylene-octene copolymerization results obtained using Catalysts 1 through 4. General conditions: catalyst complex=25 nmol, N,N-dimethylanilinium tetrakis(pentafluorophenyl)borate activator=27.5 nmol, 0.1 mL octene, Al(n-octyl)$_3$=500 nmol, temperature=80° C., total volume=5 mL, ethylene=200 psi.

TABLE 3

| Run | Catalyst | Quench t (s) | Yield (g) | Activity (gP · mmolcat$^{-1}$ · h$^{-1}$) |
|---|---|---|---|---|
| 1 | 1 | 1,801 | 0.0134 | 1,072 |
| 2 | 1 | 1,800 | 0.0077 | 616 |
| 3 | 1 | 1,801 | 0.0064 | 512 |
| 4 | 2 | 444 | 0.0161 | 5,222 |
| 5 | 2 | 191 | 0.0163 | 12,295 |

TABLE 3-continued

| Run | Catalyst | Quench t (s) | Yield (g) | Activity (gP · mmolcat$^{-1}$ · h$^{-1}$) |
|---|---|---|---|---|
| 6 | 2 | 526 | 0.0177 | 4,850 |
| 7 | 3 | 1,800 | 0.0044 | 352 |
| 8 | 3 | 519 | 0.0101 | 2,805 |
| 9 | 3 | 1,802 | 0.0081 | 647 |
| 10 | 4 | 27 | 0.0587 | 313,067 |
| 11 | 4 | 24 | 0.0663 | 402,835 |
| 12 | 4 | 25 | 0.0629 | 363,759 |

| Run | Mn (g/mol) | Mw (g/mol) | Mz (g/mol) | PDI | Tm (° C.) |
|---|---|---|---|---|---|
| 1 | 1,479 | 2,371 | 4,829 | 1.6 | 96 |
| 2 | | | | | |
| 3 | | | | | |
| 4 | 1,305 | 2,186 | 4,503 | 1.7 | 101 |
| 5 | 1,332 | 2,243 | 4,891 | 1.7 | 100 |
| 6 | 1,364 | 2,251 | 4,564 | 1.7 | 101 |
| 7 | | | | | |
| 8 | 2,926 | 5,592 | 11,880 | 1.9 | 122 |
| 9 | | | | | |
| 10 | 2,709 | 4,803 | 9,917 | 1.8 | 121 |
| 11 | 2,895 | 5,229 | 11,939 | 1.8 | 122 |
| 12 | 2,683 | 5,282 | 13,046 | 2.0 | 122 |

The blank cells in the tables above indicate that insufficient quantities of polymer (i.e., <0.01 g) did not allow for further characterization of molecular weight, PDI, T, etc.

Table 4 illustrates propylene polymerization results obtained for Catalysts 1 through 4. General conditions: catalyst complex=25 nmol, N,N-dimethylanilinium tetrakis (pentafluorophenyl)borate activator=1.1 molar equivalent relative to catalyst complex, propylene=1 mL, Al(n-octyl)$_3$=500 nmol, total volume=5 mL.

TABLE 4

| Run | Catalyst | Temperature (° C.) | Quench t (s) | Yield (g) | Activity (gP · mmolcat$^{-1}$ · h$^{-1}$) |
|---|---|---|---|---|---|
| 1 | 1 | 70 | 1,800 | 0 | 0 |
| 2 | 1 | 70 | 1,801 | 0 | 0 |
| 3 | 1 | 70 | 1,800 | 0 | 0 |
| 4 | 1 | 100 | 1,801 | 0 | 0 |
| 5 | 1 | 100 | 1,801 | 0.0004 | 32 |
| 6 | 1 | 100 | 1,801 | 0 | 0 |
| 7 | 2 | 70 | 1,800 | 0 | 0 |
| 8 | 2 | 70 | 1,800 | 0 | 0 |
| 9 | 2 | 70 | 1,801 | 0 | 0 |
| 10 | 2 | 100 | 1,800 | 0 | 0 |
| 11 | 2 | 100 | 1,800 | 0 | 0 |
| 12 | 2 | 100 | 1,800 | 0 | 0 |
| 13 | 3 | 70 | 1,800 | 0.0012 | 96 |
| 14 | 3 | 70 | 1,800 | 0.0018 | 144 |
| 15 | 3 | 70 | 1,801 | 0.0023 | 184 |
| 16 | 3 | 100 | 1,801 | 0.006 | 480 |
| 17 | 3 | 100 | 1,801 | 0.0045 | 360 |
| 18 | 3 | 100 | 1,801 | 0.0038 | 304 |
| 19 | 4 | 70 | 1,800 | 0.0004 | 32 |
| 20 | 4 | 70 | 1,802 | 0.0004 | 32 |
| 21 | 4 | 70 | 1,801 | 0.0003 | 24 |
| 22 | 4 | 100 | 1,800 | 0.0028 | 224 |
| 23 | 4 | 100 | 1,800 | 0.0009 | 72 |
| 24 | 4 | 100 | 1,801 | 0.001 | 80 |

Table 5 illustrates propylene polymerization results obtained for Catalysts 1 through 4. General conditions: catalyst complex=40 nmol, N,N-dimethylanilinium tetrakis (pentafluorophenyl)borate activator=1.1 molar equivalent relative to catalyst complex, propylene=1 mL, Al(n-octyl)$_3$=500 nmol, total volume=5 mL.

TABLE 5

| Run | Catalyst | Temperature (° C.) | Quench t (s) | Yield (g) | Activity (gP · mmolcat$^{-1}$ · h$^{-1}$) |
|---|---|---|---|---|---|
| 1 | 1 | 70 | 1,801 | 0.0003 | 15 |
| 2 | 1 | 70 | 1,801 | 0 | 0 |
| 3 | 1 | 70 | 1,800 | 0 | 0 |
| 4 | 1 | 100 | 1,800 | 0.0024 | 120 |
| 5 | 1 | 100 | 1,801 | 0.0027 | 135 |
| 6 | 1 | 100 | 1,800 | 0.0024 | 120 |
| 7 | 2 | 70 | 1,800 | 0 | 0 |
| 8 | 2 | 70 | 1,801 | 0 | 0 |
| 9 | 2 | 70 | 1,800 | 0 | 0 |
| 10 | 2 | 100 | 1,800 | 0 | 0 |
| 11 | 2 | 100 | 1,801 | 0 | 0 |
| 12 | 2 | 100 | 1,800 | 0 | 0 |
| 13 | 4 | 70 | 1,800 | 0.0036 | 180 |
| 14 | 4 | 70 | 1,801 | 0.0042 | 210 |
| 15 | 4 | 70 | 1,803 | 0.0033 | 165 |
| 16 | 4 | 100 | 1,801 | 0.0091 | 455 |
| 17 | 4 | 100 | 1,801 | 0.0056 | 280 |
| 18 | 4 | 100 | 1,801 | 0.0057 | 285 |

Overall, catalysts, catalyst systems, and processes of the present disclosure can provide high temperature ethylene polymerization, propylene polymerization, or ethylene-alpha olefin copolymerization as the bis(heterocyclic-olate) Lewis base catalysts will be stable at high polymerization temperatures and have good activity at the high polymerization temperatures. The stable catalysts with good activity will provide formation of polymers having high molecular weights, polymers having low to very low molecular weights, and the ability to make an increased amount of polymer in a given reactor, as compared to conventional catalysts.

Hence, the present disclosure demonstrates highly active catalysts capable of operating at high reactor temperatures while producing polymers with controlled molecular weights and/or robust isotacticity.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the present disclosure, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

While the present disclosure has been described with respect to a number of embodiments and examples, those skilled in the art, having benefit of this disclosure, will appreciate that other embodiments can be devised which do not depart from the scope and spirit of the present disclosure.

What is claimed is:

1. A catalyst compound represented by Formula (I):

(I)

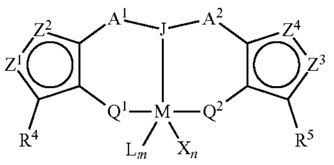

wherein:

M is a group 3, 4, or 5 metal;

each $A^1$ and $A^2$ is independently an aromatic, a substituted aromatic, or alkenediyl group;

heterocyclic ring fragments —($Z^1Z^2$)— and —($Z^3Z^4$)— are independently selected from —($Z^5Z^6$)— or —($Z^6Z^5$)—, with $Z^5$ being selected from oxygen, sulfur, S(O), $S(O)_2$, and N($R^{50}$), and $Z^6$ being selected from nitrogen and C($R^{51}$), wherein each $R^{50}$ and $R^{51}$ is independently hydrogen, $C_1$-$C_{40}$ hydrocarbyl, $C_1$-$C_{40}$ substituted hydrocarbyl, a monovalent heteroatom, or a heteroatom-bonded monovalent group;

each of $R^4$ and $R^5$ is independently hydrogen, $C_1$-$C_{40}$ hydrocarbyl, $C_1$-$C_{40}$ substituted hydrocarbyl, a monovalent heteroatom, or a heteroatom-bonded monovalent group;

J is a heterocyclic Lewis base;

each $Q^1$ and $Q^2$ is independently selected from oxygen, sulfur, N($R^{30}$), or P($R^{30}$), wherein $R^{30}$ is $C_1$-$C_{40}$ hydrocarbyl, substituted $C_1$-$C_{40}$ hydrocarbyl, a monovalent heteroatom, or a heteroatom-bonded monovalent group;

L is a Lewis base, optionally any two L groups join together to form a bidentate Lewis base;

X is an anionic ligand, optionally an X group is joined to an L group to form a monoanionic bidentate group, or optionally, any two X groups are joined together to form a dianionic ligand;

n is 1, 2 or 3;

m is 0, 1, or 2; and n+m is not greater than 4.

2. The catalyst compound of claim 1, wherein $A^1$ is represented by the formula:

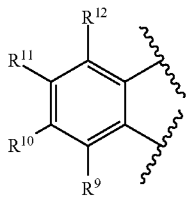

wherein  indicates a connection to the catalyst compound, and each of $R^9$, $R^{10}$, $R^{11}$, and $R^{12}$ is independently hydrogen, $C_1$-$C_{40}$ hydrocarbyl, $C_1$-$C_{40}$ substituted hydrocarbyl, a monovalent heteroatom, or a heteroatom-bonded monovalent group, or one or more of $R^9$ and $R^{10}$, $R^{10}$ and $R^{11}$, or $R^{11}$ and $R^{12}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms.

3. The catalyst compound of claim 1, wherein $A^2$ is represented by the formula:

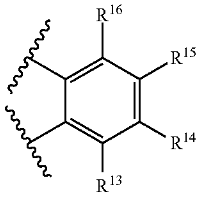

wherein  indicates a connection to the catalyst compound, and each of $R^{13}$, $R^{14}$, $R^{15}$, and $R^{16}$ is independently hydrogen, $C_1$-$C_{40}$ hydrocarbyl, $C_1$-$C_{40}$ substituted hydrocarbyl, a monovalent heteroatom, or a heteroatom-bonded monovalent group, or one or more of $R^{13}$ and $R^{14}$, $R^{14}$ and $R^{15}$, or $R^{15}$ and $R^{16}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms.

4. The catalyst compound of claim 1, wherein the catalyst compound features a tridentate dianionic ligand that is coordinated to the metal to form a pair of 8-membered metallocycle rings.

5. The catalyst compound of claim 1, wherein J is a group 15-containing heterocycle, or a group 16-containing heterocycle.

6. The catalyst compound of claim 1, wherein J is a nitrogen-containing heterocycle, an oxygen-containing heterocycle, a phosphorus-containing heterocycle, or a sulfur-containing heterocycle.

7. The catalyst compound of claim 1, wherein J is selected from a pyridine, a pyrimidine, a pyrazine, a thiazole, an oxazole, an oxazoline, an imidazole, a furan, or a thiofuran.

8. The catalyst compound of claim 1, wherein J is represented by the formula:

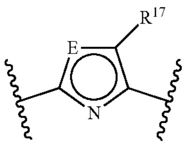

or

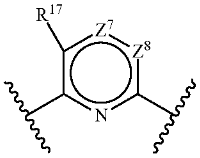

wherein  indicates a connection to the catalyst compound; E is oxygen, sulfur, or $N(R^{20})$; $Z^7$ is selected from nitrogen or $C(R^{18})$; $Z^8$ is selected from nitrogen and $C(R^{19})$; and each of $R^{17}$, $R^{18}$, $R^{19}$, and $R^{20}$ is independently selected from hydrogen, $C_1$-$C_{40}$ hydrocarbyl, $C_1$-$C_{40}$ substituted hydrocarbyl, a monovalent heteroatom, or a heteroatom-bonded monovalent group.

9. The catalyst compound of claim 1, wherein the catalyst compound represented by Formula (I) is represented by Formula (II) or Formula (III):

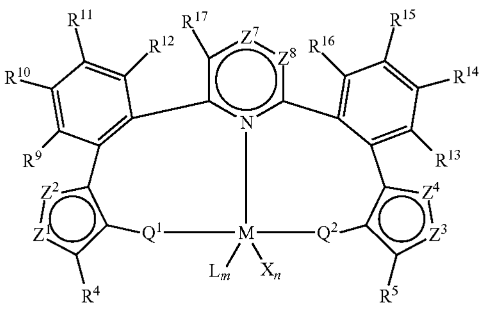

(II)

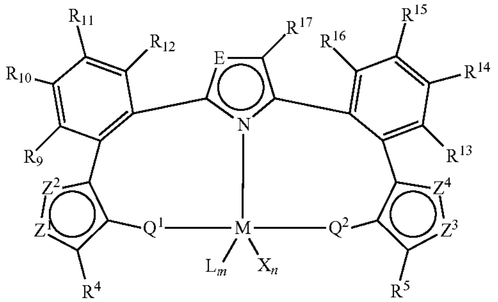

(III)

wherein:

each $Q^1$ and $Q^2$ are independently selected from oxygen, sulfur, $N(R^{30})$, or $P(R^{30})$, wherein $R^{30}$ is $C_1$-$C_{40}$ hydrocarbyl, substituted $C_1$-$C_{40}$ hydrocarbyl, a monovalent heteroatom, or a heteroatom-bonded monovalent group;

heterocyclic ring fragments —$(Z^1Z^2)$— and —$(Z^3Z^4)$— are selected from —$(Z^5Z^6)$— or —$(Z^6Z^5)$—, with $Z^5$ selected from oxygen, sulfur, S(O), $S(O)_2$, and $N(R^{50})$, and $Z^6$ selected from nitrogen and $C(R^{51})$, wherein each $R^{50}$ and $R^{51}$ is independently hydrogen, $C_1$-$C_{40}$ hydrocarbyl, $C_1$-$C_{40}$ substituted hydrocarbyl, a monovalent heteroatom, or a heteroatom-bonded monovalent group;

$Z^7$ is selected from nitrogen and $C(R^{18})$;

$Z^8$ is selected from nitrogen and $C(R^{19})$;

E is oxygen, sulfur, or $N(R^{20})$;

each of $R^4$ and $R^5$ is independently hydrogen, $C_1$-$C_{40}$ hydrocarbyl, $C_1$-$C_{40}$ substituted hydrocarbyl, a monovalent heteroatom, or a heteroatom-bonded monovalent group;

each of $R^9$, $R^{10}$, $R^{11}$, and $R^{12}$ is independently hydrogen, $C_1$-$C_{40}$ hydrocarbyl, $C_1$-$C_{40}$ substituted hydrocarbyl, a monovalent heteroatom, or a heteroatom-bonded monovalent group, or one or more of $R^9$ and $R^{10}$, $R^{10}$ and $R^{11}$, or $R^{11}$ and $R^{12}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms;

each of $R^{13}$, $R^{14}$, $R^{15}$, and $R^{16}$ is independently hydrogen, $C_1$-$C_{40}$ hydrocarbyl, $C_1$-$C_{40}$ substituted hydrocarbyl, a monovalent heteroatom, or a heteroatom-bonded monovalent group, or one or more of $R^{13}$ and $R^{14}$, $R^{14}$ and $R^{15}$, or $R^{15}$ and $R^{16}$ may be joined to form one or more substituted hydrocarbyl rings, unsubstituted hydrocarbyl rings, substituted heterocyclic rings, or unsubstituted heterocyclic rings each having 5, 6, 7, or 8 ring atoms;

each of $R^{17}$, $R^{18}$, $R^{19}$ and $R^{20}$ is hydrogen, $C_1$-$C_{40}$ hydrocarbyl, $C_1$-$C_{40}$ substituted hydrocarbyl, a monovalent heteroatom, or a heteroatom-bonded monovalent group, or one or more of $R^{17}$ and $R^{18}$, $R^{18}$ and $R^{19}$ may be joined together to form one or more substituted hydrocarbyl rings, unsubstituted hydrocarbyl rings, substituted heterocyclic rings, or unsubstituted heterocyclic rings each having 5, 6, 7, or 8 ring atoms;

M is a group 3, 4, or 5 metal;

L is a Lewis base;

X is an anionic ligand;

n is 1, 2 or 3;

m is 0, 1, or 2;

n+m is not greater than 4;

any two L groups may be joined together to form a bidentate Lewis base;

an X group may be joined to an L group to form a monoanionic bidentate group; and any two X groups may be joined together to form a dianionic ligand.

10. The catalyst compound of claim 9, wherein M is zirconium or hafnium.

11. The catalyst compound of claim 10, wherein $R^9$ through $R^{17}$ are hydrogen.

12. The catalyst compound of claim 11, wherein $R^4$ and $R^5$ are each selected from $C_1$-$C_{40}$ hydrocarbyl, $C_1$-$C_{40}$ substituted hydrocarbyl, or a heteroatom-bonded monovalent group containing up to 40 atoms, wherein $—(Z^1Z^2)—$ and $—(Z^3Z^4)—$ are selected from $—(Z^5Z^6)—$ or $—(Z^6Z^5)—$, with $Z^5$ is oxygen or sulfur, and wherein $R^4$ and $R^5$ are each selected from $C_4$-$C_{40}$ cyclic tertiary hydrocarbyl groups.

13. The catalyst compound of claim 9, wherein $Z^7$ is $C(R^{18})$, wherein $R^{18}$ is selected from hydrogen, trifluoromethyl, methoxy, $Me_2N$, or halogen atom, wherein $Z^8$ is $C(R^{19})$, wherein $R^{18}$ is hydrogen, wherein $R^4$ and $R^5$ are each selected from $C_4$-$C_{20}$ hydrocarbyl, tertiary hydrocarbyl, or cyclic tertiary hydrocarbyl, and wherein each of $R^9$, $R^{10}$, $R^{11}$, $R^{12}$, $R^{13}$, $R^{14}$, $R^{15}$, $R^{16}$, and $R^{17}$ is independently hydrogen or $C_1$-$C_{10}$ alkyl.

14. The catalyst compound of claim 13, wherein $R^4$ and $R^5$ are each selected from $C_6$-$C_{20}$ aryl, tertiary hydrocarbyl, cyclic tertiary hydrocarbyl, adamantan-1-yl, 3,5-dimethyladamantan-1-yl, or 3,5,7-trimethyladamantan-1-yl.

15. The catalyst compound of claim 1, wherein the catalyst compound is selected from the following, with M=Zr or Hf; and R=$C_1$-$C_{20}$ hydrocarbyl, a monovalent heteroatom, or a heteroatom-bonded monovalent group:

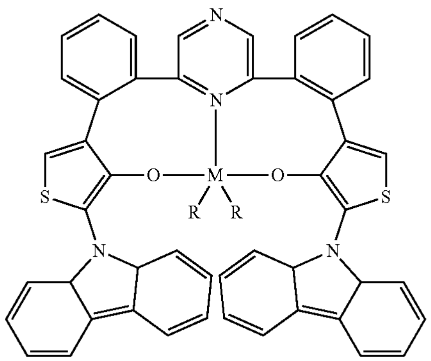
,

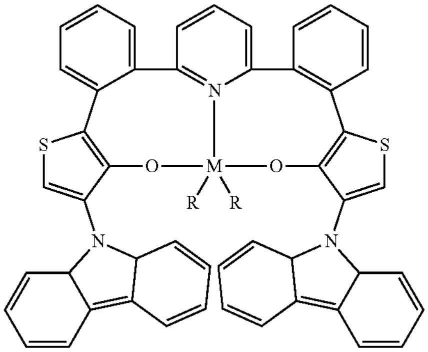
,

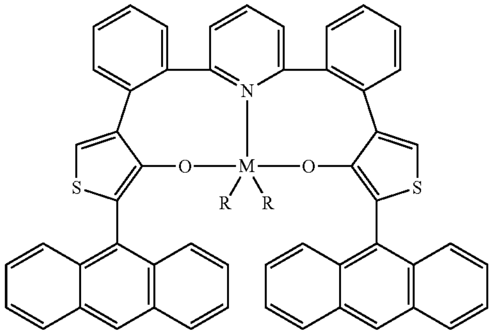
,

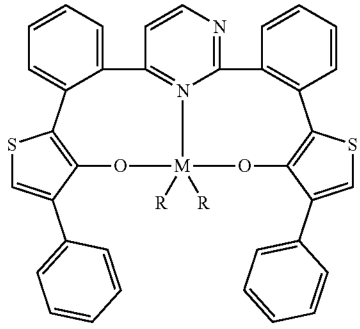
,

-continued
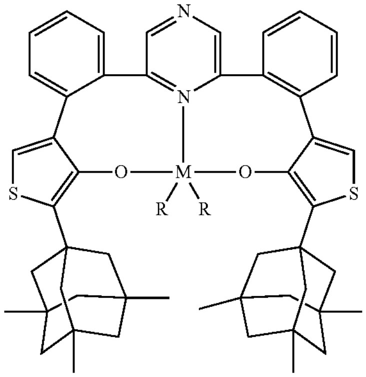
,
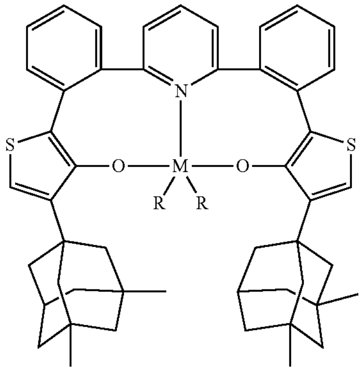
,
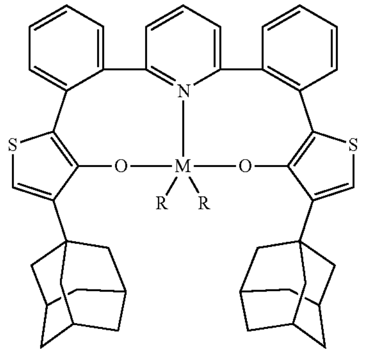
,
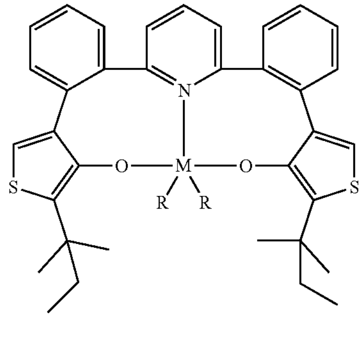
,
-continued
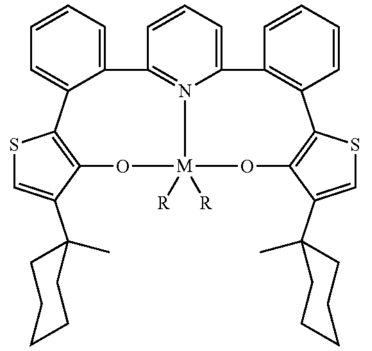
,
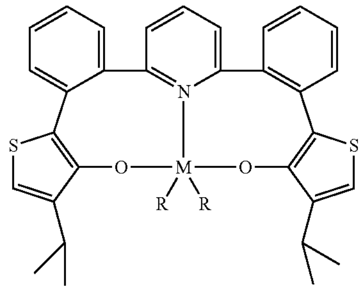
,
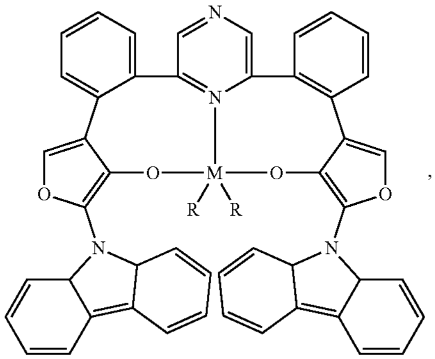
,
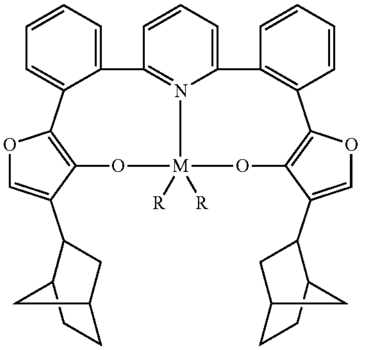
,
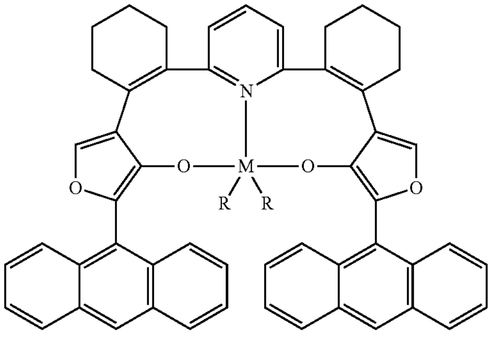
, -continued
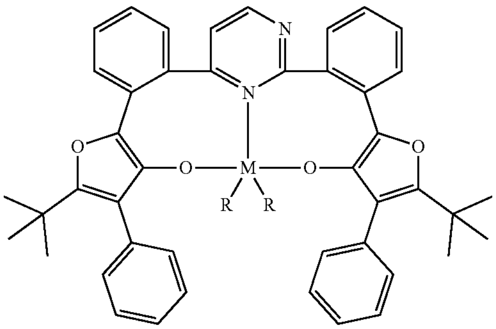
,
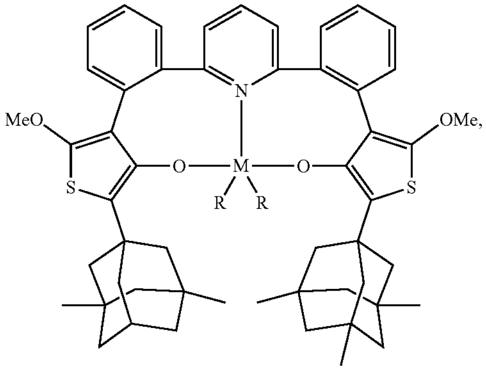
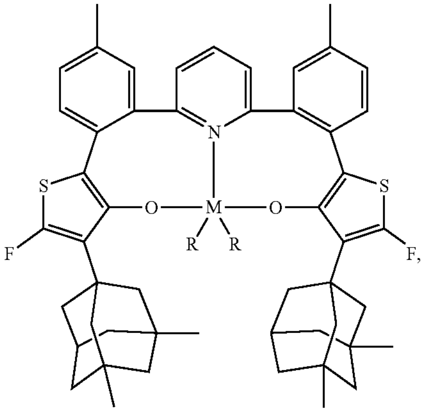
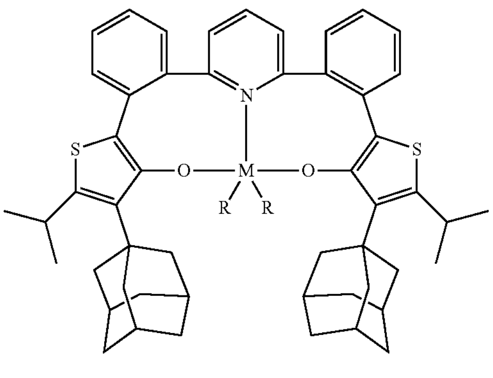
,
-continued
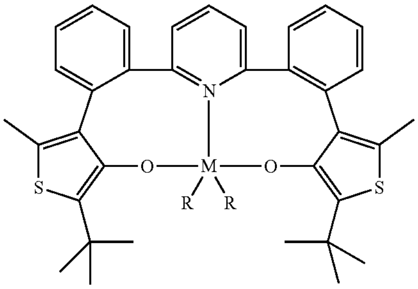
,
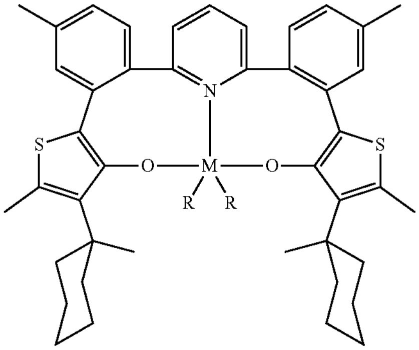
,
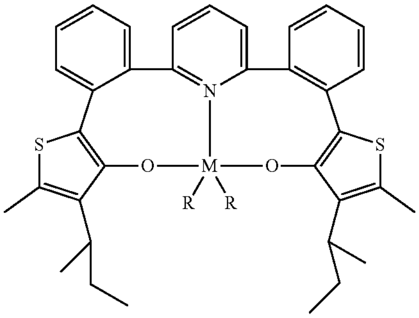
,
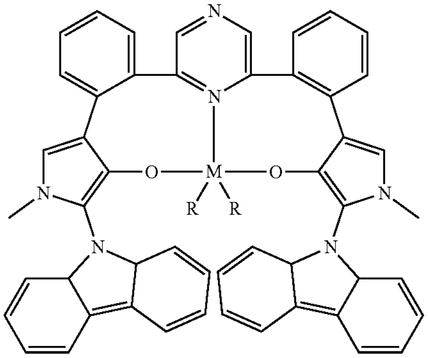
,
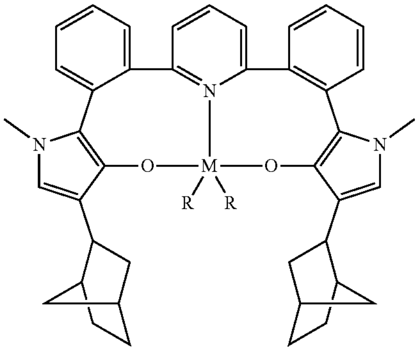
, -continued
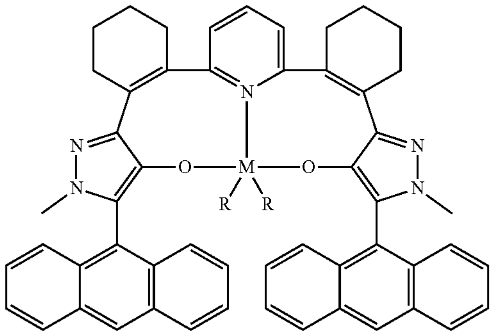
,
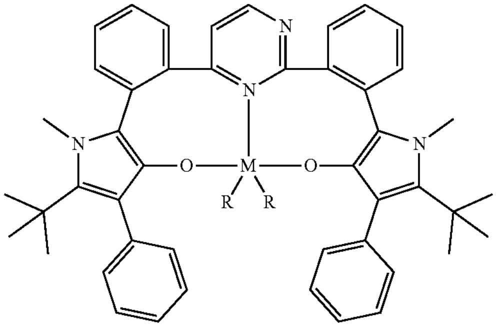
.
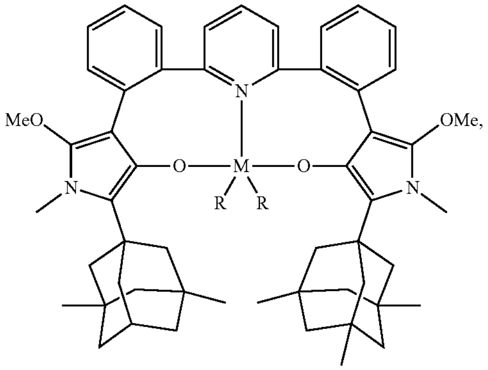
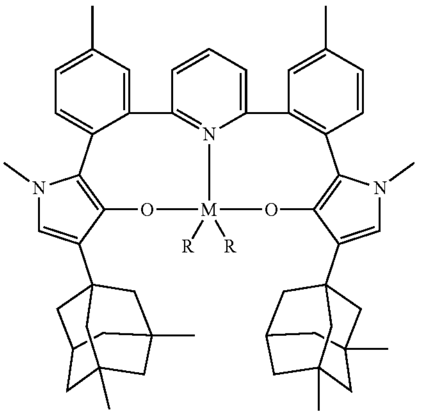
,
-continued
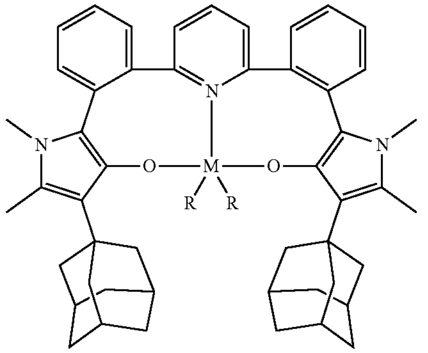
,
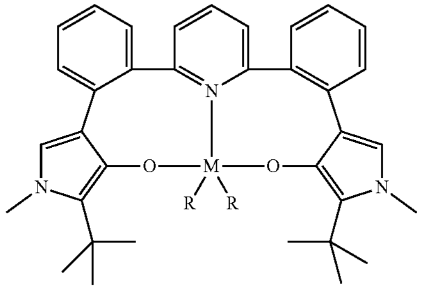
,
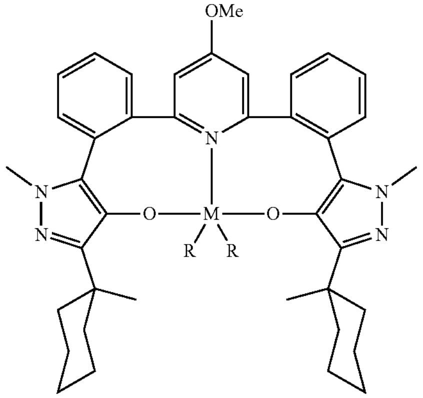
,
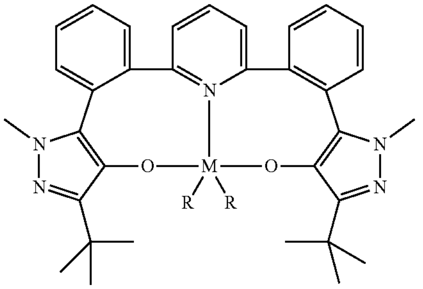
,
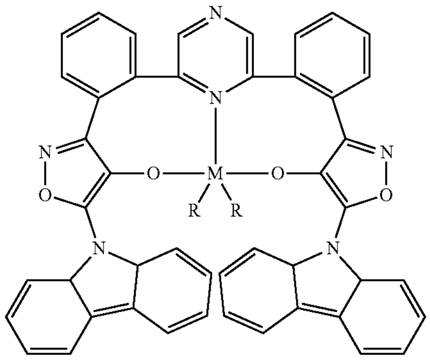
, -continued
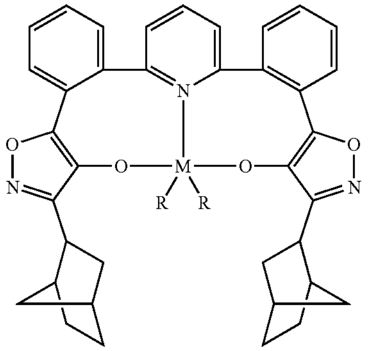
,
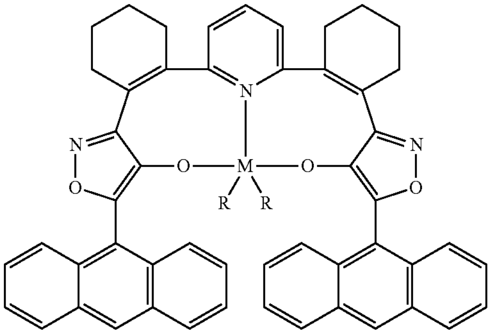
,
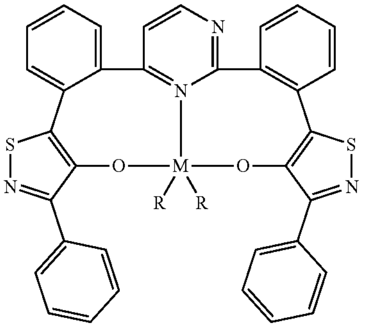
,
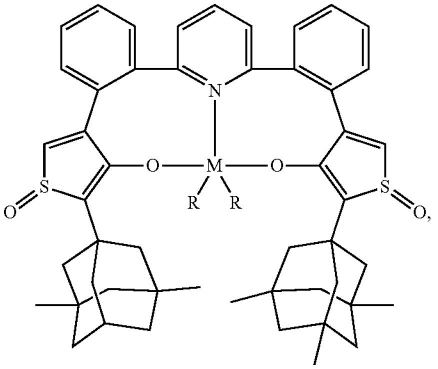
-continued
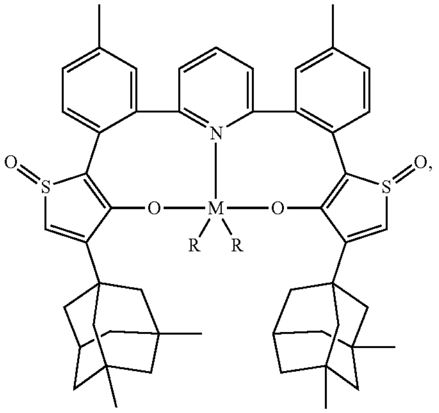
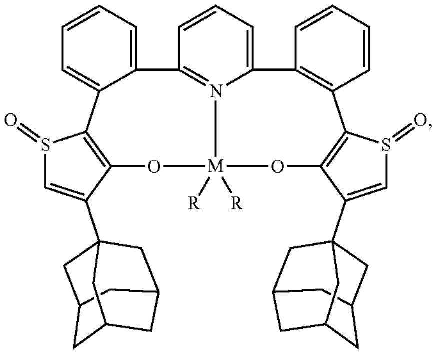
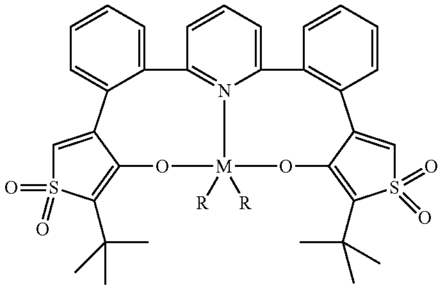
,
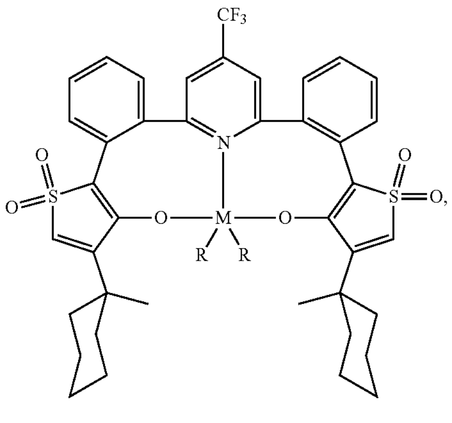

-continued
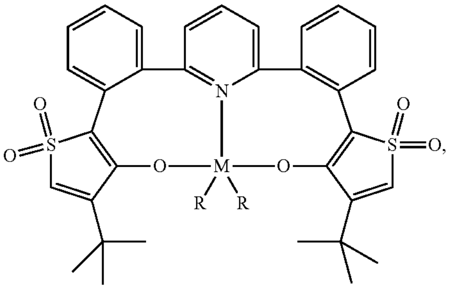
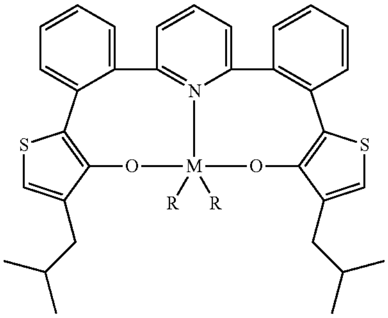
, or
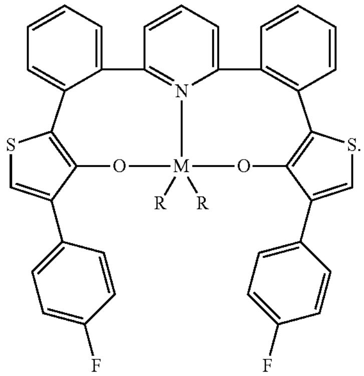
16. The catalyst compound of claim 1, wherein the catalyst compound is selected from the following, with M=Zr or Hf; and R=$C_1$-$C_{20}$ hydrocarbyl, a monovalent heteroatom, or a heteroatom-bonded monovalent group:
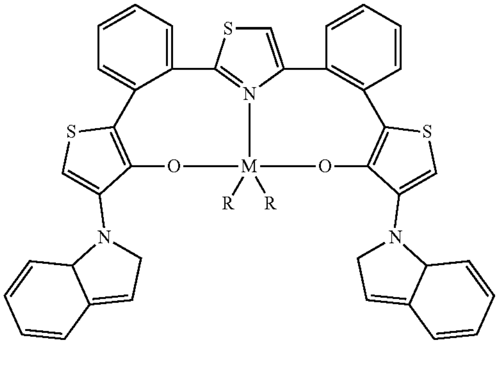
,
-continued
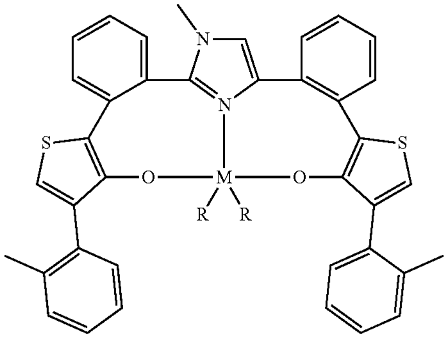
,
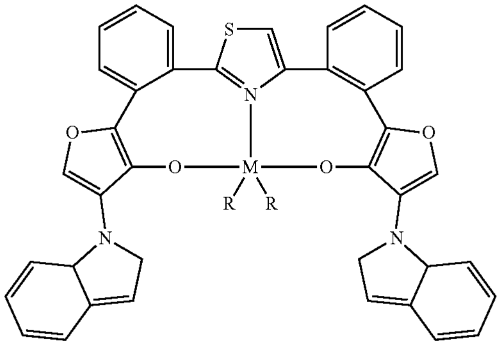
,
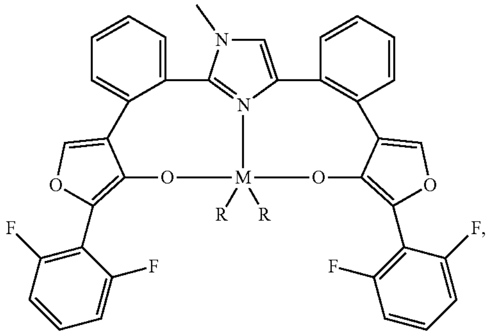
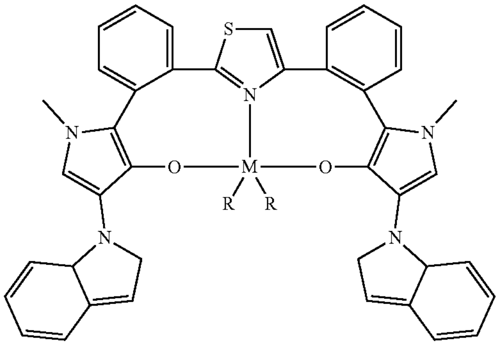
,
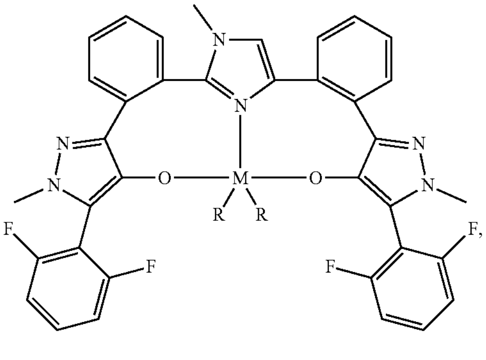

-continued

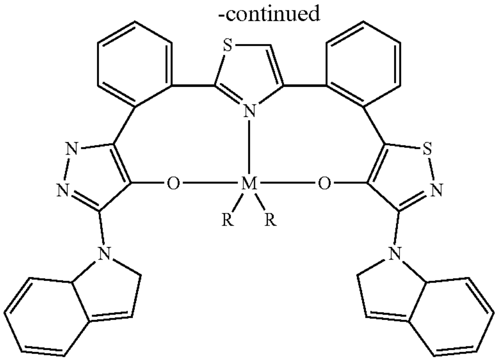

, or

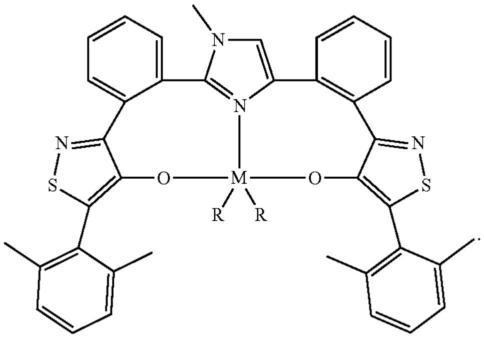

.

17. A catalyst system comprising an activator and the catalyst compound of claim 1.

18. A process for the production of an ethylene based polymer comprising: polymerizing ethylene by contacting the ethylene with a catalyst system of claim 17, in one or more continuous stirred tank reactors or loop reactors, in series or in parallel, at a reactor pressure of from 0.05 MPa to 1,500 MPa and a reactor temperature of from 30° C. to 230° C.

19. The process of claim 18, wherein the ethylene based polymer has an Mw value of from 2,000 g/mol to 3,000,000 g/mol, Mn value of from 1,000 g/mol to 2,000,000 g/mol, Mz value of from 10,000 g/mol to 10,000,000 g/mol, and an Mw/Mn of from 1 to 5.

20. The process of claim 18, wherein the ethylene based polymer has a melting point of from 110° C. to 150° C.

21. A process for the production of a propylene based polymer comprising: polymerizing propylene by contacting the propylene with a catalyst system of claim 17, in one or more continuous stirred tank reactors or loop reactors, in series or in parallel, at a reactor pressure of from 0.05 MPa to 1,500 MPa and a reactor temperature of from 30° C. to 230° C.

22. The process of claim 21, wherein the propylene based polymer has an Mw value of from 500 g/mol to 15,000 g/mol, Mn value of from 500 g/mol to 15,000 g/mol, Mz value of from 500 g/mol to 20,000 g/mol, and an Mw/Mn of from 1 to 5.

23. The process of claim 21, wherein the propylene based polymer has a melting point of from 50° C. to 150° C.

24. A process for the production of an ethylene alpha-olefin copolymer comprising: polymerizing ethylene and at least one $C_3$-$C_{20}$ alpha-olefin by contacting the ethylene and the at least one $C_3$-$C_{20}$ alpha-olefin with a catalyst system of claim 17, in one or more continuous stirred tank reactors or loop reactors, in series or in parallel, at a reactor pressure of from 0.05 MPa to 1,500 MPa and a reactor temperature of from 30° C. to 230° C.

25. The process of claim 24, wherein the ethylene alpha-olefin copolymer has a comonomer content of 0.1 wt % to 50 wt %, an Mw value of from 1,000 g/mol to 3,000,000 g/mol, and Mz value of from 1,000 g/mol to 10,000,000 g/mol, an Mn value of from 1,000 g/mol to 1,000,000 g/mol, and an Mw/Mn of from 1 to 5.

26. The process of claim 24, wherein the ethylene alpha-olefin copolymer has a melting point of from 100° C. to 140° C.

27. A process for the production of a propylene alpha-olefin copolymer comprising: polymerizing propylene and ethylene or at least one $C_4$-$C_{20}$ alpha-olefin by contacting the propylene and the ethylene or at least one $C_3$-$C_{20}$ alpha-olefin with a catalyst system of claim 17, in one or more continuous stirred tank reactors or loop reactors, in series or in parallel, at a reactor pressure of from 0.05 MPa to 1,500 MPa and a reactor temperature of from 30° C. to 230° C.

28. The process of claim 27, wherein the propylene alpha-olefin copolymer has a comonomer content of 0.1 wt % to 35 wt %, an Mw value of from 1,000 g/mol to 3,000,000 g/mol, and Mz value of from 1,000 g/mol to 10,000,000 g/mol, an Mn value of from 1,000 g/mol to 1,000,000 g/mol, and an Mw/Mn of from 1 to 5.

29. The process of claim 27, wherein the propylene alpha-olefin copolymer has a melting point of from 100° C. to 140° C.

* * * * *